United States Patent
Mortensen et al.

(10) Patent No.: US 11,902,296 B2
(45) Date of Patent: *Feb. 13, 2024

(54) USING A SECURITY ANALYTICS MAP TO TRACE ENTITY INTERACTION

(71) Applicant: Forcepoint, LLC, Austin, TX (US)

(72) Inventors: Andrew Mortensen, Ann Arbor, MI (US); Assaf Almaz, Ra'anana (IL); David Coffey, Austin, TX (US); Ofir Arkin, Tel Aviv (IL)

(73) Assignee: Forcepoint LLC, Austin, TX (US)

( * ) Notice: Subject to any disclaimer, the term of this patent is extended or adjusted under 35 U.S.C. 154(b) by 635 days.

This patent is subject to a terminal disclaimer.

(21) Appl. No.: 17/139,058

(22) Filed: Dec. 31, 2020

(65) Prior Publication Data

US 2021/0152570 A1 May 20, 2021

Related U.S. Application Data

(63) Continuation of application No. 16/557,560, filed on Aug. 30, 2019, now Pat. No. 10,999,296, which is a
(Continued)

(51) Int. Cl.
*H04L 9/40* (2022.01)
*G06F 21/56* (2013.01)
(Continued)

(52) U.S. Cl.
CPC ............ *H04L 63/14* (2013.01); *G06F 21/566* (2013.01); *G06F 21/577* (2013.01);
(Continued)

(58) Field of Classification Search
CPC ... H04L 63/14; H04L 63/102; H04L 63/1416; H04L 63/1425; H04L 63/1433;
(Continued)

(56) References Cited

U.S. PATENT DOCUMENTS 6,072,875 A 6/2000 Tsudik
6,678,693 B1 1/2004 Shiraishi
(Continued)

FOREIGN PATENT DOCUMENTS

WO 2019153581 A1 8/2019

OTHER PUBLICATIONS

Sean Barnum, Standardized Cyber Threat Intelligence Information with the Structured Threat Information eXpression (STIX) Whitepaper v1.1 (Feb. 20, 2014).
(Continued)

*Primary Examiner* — Darren B Schwartz
(74) *Attorney, Agent, or Firm* — Terrile, Cannatti & Chambers, LLP; Stephen A. Terrile

(57) ABSTRACT

A system, method, and computer-readable medium are disclosed for performing a security operation. The security operation includes monitoring a plurality of electronically-observable actions of a first entity, the plurality of electronically-observable actions of the first entity corresponding to a respective first plurality of events enacted by the first entity; monitoring a plurality of electronically-observable actions of a second entity, the plurality of electronically-observable actions of the second entity corresponding to a respective second plurality of events enacted by the second entity; determining whether a first event of the respective first plurality of events and a second event of the respective second plurality of events comprise an entity interaction between the first entity and the second entity; generating an entity interaction map, the entity interaction map providing a representation of the entity interaction between the first entity and the second entity; and, using the entity interaction map to trace the entity interaction between the first entity and the second entity.

20 Claims, 18 Drawing Sheets

Related U.S. Application Data continuation-in-part of application No. 16/415,726, filed on May 17, 2019, now Pat. No. 10,834,097, which is a continuation-in-part of application No. 16/162,655, filed on Oct. 17, 2018, now Pat. No. 10,530,786, which is a continuation of application No. 15/963,729, filed on Apr. 26, 2018, now Pat. No. 10,129,269, which is a continuation-in-part of application No. 15/878,898, filed on Jan. 24, 2018, now Pat. No. 10,063,568, which is a continuation of application No. 15/720,788, filed on Sep. 29, 2017, now Pat. No. 9,882,918.

(60) Provisional application No. 63/119,116, filed on Nov. 30, 2020, provisional application No. 63/072,566, filed on Aug. 31, 2020, provisional application No. 63/017,400, filed on Apr. 29, 2020, provisional application No. 62/964,372, filed on Jan. 22, 2020, provisional application No. 62/839,060, filed on Apr. 26, 2019, provisional application No. 62/506,300, filed on May 15, 2017.

(51) Int. Cl.
*G06F 21/57* (2013.01)
*H04L 67/306* (2022.01)

(52) U.S. Cl.
CPC ........ *H04L 63/102* (2013.01); *H04L 63/1416* (2013.01); *H04L 63/1425* (2013.01); *H04L 63/1433* (2013.01); *H04L 63/205* (2013.01); *H04L 67/306* (2013.01); *G06F 2221/034* (2013.01)

(58) Field of Classification Search
CPC ..... H04L 63/205; H04L 67/306; H04L 63/20; G06F 21/566; G06F 21/577; G06F 2221/034
See application file for complete search history.

(56) References Cited

U.S. PATENT DOCUMENTS

| | | |
|---|---|---|
| 7,107,447 B2 | 9/2006 | Sanin et al. |
| 7,694,150 B1 | 4/2010 | Kirby |
| 7,725,565 B2 | 5/2010 | Li et al. |
| 7,813,944 B1 | 10/2010 | Luk et al. |
| 7,933,960 B2 | 4/2011 | Chen et al. |
| 8,181,253 B1 | 5/2012 | Zaitsev et al. |
| 8,312,064 B1 | 11/2012 | Gauvin |
| 8,424,061 B2 | 4/2013 | Rosenoer |
| 8,484,066 B2 | 7/2013 | Miller et al. |
| 8,490,163 B1 | 7/2013 | Harsell et al. |
| 8,713,633 B2 | 4/2014 | Thomas |
| 8,776,168 B1 | 7/2014 | Gibson et al. |
| 8,826,443 B1 | 9/2014 | Raman et al. |
| 8,892,690 B2 | 11/2014 | Liu et al. |
| 8,990,930 B2 | 3/2015 | Burrell et al. |
| 9,015,812 B2 | 4/2015 | Plattner et al. |
| 9,015,847 B1 | 4/2015 | Kaplan et al. |
| 9,043,905 B1 | 5/2015 | Allen et al. |
| 9,053,124 B1 | 6/2015 | Dornquast et al. |
| 9,128,995 B1 | 9/2015 | Fletcher et al. |
| 9,137,318 B2 | 9/2015 | Hong |
| 9,166,997 B1 * | 10/2015 | Guo ................. G06F 21/554 |
| 9,166,999 B1 | 10/2015 | Kulkarni et al. |
| 9,223,972 B1 | 12/2015 | Vincent et al. |
| 9,246,941 B1 | 1/2016 | Gibson et al. |
| 9,262,722 B1 | 2/2016 | Daniel |
| 9,298,726 B1 | 3/2016 | Mondal et al. |
| 9,342,553 B1 | 5/2016 | Fuller |
| 9,369,433 B1 | 6/2016 | Paul et al. |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,609,010 B2 | 3/2017 | Sipple |
| 9,665,854 B1 | 5/2017 | Burger et al. |
| 9,692,762 B2 | 6/2017 | Barkan et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,108,544 B1 | 10/2018 | Duggal et al. |
| 10,187,369 B2 | 1/2019 | Caldera et al. |
| 10,210,283 B2 | 2/2019 | Broz et al. |
| 10,235,285 B1 | 3/2019 | Wallace |
| 10,237,298 B1 | 3/2019 | Nguyen et al. |
| 10,270,794 B1 | 4/2019 | Mukerji et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,425,435 B1 * | 9/2019 | Kayyoor ............... H04L 63/104 |
| 10,432,669 B1 | 10/2019 | Badhwar et al. |
| 10,545,738 B1 | 1/2020 | Jaeger et al. |
| 10,579,281 B2 | 3/2020 | Cherubini et al. |
| 10,581,891 B1 * | 3/2020 | Kapoor ................... G06F 9/545 |
| 10,713,934 B2 | 7/2020 | Sayavong et al. |
| 10,769,908 B1 | 9/2020 | Burris et al. |
| 10,917,319 B2 | 2/2021 | Scheib et al. |
| 11,061,874 B1 | 7/2021 | Funk et al. |
| 2002/0112015 A1 | 8/2002 | Haynes |
| 2002/0123865 A1 | 9/2002 | Whitney et al. |
| 2004/0034582 A1 | 2/2004 | Gilliam et al. |
| 2004/0044613 A1 | 3/2004 | Murakami et al. |
| 2005/0120025 A1 | 6/2005 | Rodriguez et al. |
| 2005/0198099 A1 | 9/2005 | Motsinger et al. |
| 2005/0273850 A1 | 12/2005 | Freund |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1 | 6/2006 | Zhang et al. |
| 2006/0129382 A1 | 6/2006 | Anand et al. |
| 2006/0195905 A1 | 8/2006 | Fudge |
| 2006/0206449 A1 | 9/2006 | Fletcher et al. |
| 2006/0225124 A1 | 10/2006 | Kolawa et al. |
| 2007/0043703 A1 | 2/2007 | Bhattacharya et al. |
| 2007/0121522 A1 | 5/2007 | Carter |
| 2007/0225995 A1 | 9/2007 | Moore |
| 2007/0234409 A1 | 10/2007 | Eisen |
| 2008/0168002 A1 | 7/2008 | Kagarlis et al. |
| 2008/0168135 A1 | 7/2008 | Redlich et al. |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0006888 A1 | 1/2009 | Bernhard et al. |
| 2009/0177979 A1 | 7/2009 | Garbow et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0024014 A1 | 1/2010 | Kailash et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0205224 A1 | 8/2010 | Palanisamy et al. |
| 2010/0228656 A1 | 9/2010 | Wasserblat et al. |
| 2010/0235495 A1 | 9/2010 | Petersen et al. |
| 2010/0275263 A1 | 10/2010 | Bennett et al. |
| 2011/0061093 A1 | 3/2011 | Korkus et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |

(56) References Cited

U.S. PATENT DOCUMENTS

| | | |
|---|---|---|
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1 | 8/2012 | Akiyama et al. |
| 2012/0259807 A1 | 10/2012 | Dymetman |
| 2012/0290215 A1 | 11/2012 | Adler et al. |
| 2013/0013550 A1 | 1/2013 | Kerby |
| 2013/0054433 A1 | 2/2013 | Giard et al. |
| 2013/0055367 A1 | 2/2013 | Kshirsagar et al. |
| 2013/0081141 A1 | 3/2013 | Anurag |
| 2013/0097662 A1 | 4/2013 | Pearcy et al. |
| 2013/0102283 A1 | 4/2013 | Lau et al. |
| 2013/0104236 A1 | 4/2013 | Ray et al. |
| 2013/0132551 A1 | 5/2013 | Bose et al. |
| 2013/0174259 A1 | 7/2013 | Pearcy et al. |
| 2013/0205366 A1 | 8/2013 | Luna et al. |
| 2013/0238422 A1 | 9/2013 | Saldanha |
| 2013/0290598 A1 | 10/2013 | Fiske et al. |
| 2013/0297729 A1 | 11/2013 | Suni et al. |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0173727 A1 | 6/2014 | Lingafelt et al. |
| 2014/0199663 A1 | 7/2014 | Sadeh-Koniecpol et al. |
| 2014/0205099 A1 | 7/2014 | Christodorescu et al. |
| 2014/0214938 A1 | 7/2014 | Bhatt et al. |
| 2014/0283075 A1 | 9/2014 | Drissel et al. |
| 2014/0325634 A1 | 10/2014 | Iekel-Johnson et al. |
| 2014/0356445 A1 | 12/2014 | Little |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0215325 A1 | 7/2015 | Ogawa |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0286819 A1 | 10/2015 | Coden et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0326613 A1 | 11/2015 | Devarajan et al. |
| 2015/0350902 A1 | 12/2015 | Baxley et al. |
| 2015/0356488 A1 | 12/2015 | Eden et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0105334 A1 | 4/2016 | Boe et al. |
| 2016/0117937 A1 | 4/2016 | Penders et al. |
| 2016/0147380 A1 | 5/2016 | Coates et al. |
| 2016/0164922 A1 | 6/2016 | Boss et al. |
| 2016/0224803 A1 | 8/2016 | Frank et al. |
| 2016/0226914 A1 | 8/2016 | Doddy et al. |
| 2016/0232353 A1 | 8/2016 | Gupta et al. |
| 2016/0247158 A1 | 8/2016 | Kolotinsky |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1 | 10/2016 | Weilbacher |
| 2016/0330219 A1 | 11/2016 | Hasan |
| 2016/0330746 A1 | 11/2016 | Mehrabanzad et al. |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1 | 3/2017 | Muddu et al. |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0171609 A1 | 6/2017 | Koh |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2017/0149815 A1 | 12/2017 | Bolgert |
| 2018/0004948 A1 | 1/2018 | Martin et al. |
| 2018/0007069 A1 | 1/2018 | Hunt et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0027006 A1 | 1/2018 | Zimmermann et al. |
| 2018/0081661 A1 | 3/2018 | Gonzalez del Solar et al. |
| 2018/0082307 A1 | 3/2018 | Ochs et al. |
| 2018/0091520 A1 | 3/2018 | Camenisch et al. |
| 2018/0107528 A1 | 4/2018 | Vizer et al. |
| 2018/0121514 A1 | 5/2018 | Reisz et al. |
| 2018/0139227 A1 | 5/2018 | Martin et al. |
| 2018/0145995 A1 | 5/2018 | Roeh et al. |
| 2018/0150570 A1 | 5/2018 | Broyd et al. |
| 2018/0191745 A1 | 7/2018 | Moradi et al. |
| 2018/0191766 A1 | 7/2018 | Holeman et al. |
| 2018/0191857 A1 | 7/2018 | Schooler et al. |
| 2018/0204215 A1 | 7/2018 | Hu et al. |
| 2018/0232111 A1 | 8/2018 | Jones et al. |
| 2018/0232426 A1 | 8/2018 | Gomez et al. |
| 2018/0234434 A1 | 8/2018 | Viljoen |
| 2018/0248863 A1 | 8/2018 | Kao et al. |
| 2018/0276541 A1 | 9/2018 | Studnitzer et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0332062 A1 | 11/2018 | Ford |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349221 A1 | 12/2018 | Harutyunyan et al. |
| 2018/0349684 A1 | 12/2018 | Bapat et al. |
| 2019/0014153 A1 | 1/2019 | Lang et al. |
| 2019/0034625 A1 | 1/2019 | Ford et al. |
| 2019/0034813 A1 | 1/2019 | Das et al. |
| 2019/0036969 A1 | 1/2019 | Swafford et al. |
| 2019/0052660 A1 | 2/2019 | Cassidy et al. |
| 2019/0095478 A1 | 3/2019 | Tankersley et al. |
| 2019/0158503 A1 | 5/2019 | Bansal et al. |
| 2019/0174319 A1 | 6/2019 | Backholm et al. |
| 2019/0222603 A1 | 7/2019 | Yang |
| 2019/0260371 A1* | 8/2019 | Mehrotra ............... H04L 63/08 |
| 2019/0289021 A1 | 9/2019 | Ford |
| 2019/0294482 A1 | 9/2019 | Li et al. |
| 2019/0311105 A1 | 10/2019 | Beiter et al. |
| 2019/0354703 A1 | 11/2019 | Ford |
| 2019/0356688 A1 | 11/2019 | Ford |
| 2019/0356699 A1 | 11/2019 | Ford |
| 2019/0387002 A1 | 12/2019 | Ford et al. |
| 2019/0387003 A1 | 12/2019 | Ford et al. |
| 2019/0392419 A1 | 12/2019 | DeLuca et al. |
| 2020/0034462 A1 | 1/2020 | Narayanaswamy et al. |
| 2020/0036740 A1 | 1/2020 | Ford |
| 2020/0065728 A1 | 2/2020 | Wilson et al. |
| 2020/0077265 A1 | 3/2020 | Singh et al. |
| 2020/0089692 A1 | 3/2020 | Tripathi et al. |
| 2020/0117546 A1 | 4/2020 | Wong et al. |
| 2020/0334025 A1 | 10/2020 | Wang et al. |

OTHER PUBLICATIONS

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

(56) References Cited

OTHER PUBLICATIONS

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

Github, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 https://d1.awsstatic.com/Security/pdfs/Semantic_Based_Automated_Reasoning_for_AWS_Access_Policies_Using_SMT.pdf.

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wikipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

S. Chambi et al., Better bitmap performance with Roaring bitmaps, arXiv:1402.6407v10 [cs.DB] (Mar. 15, 2016).

Jianguo Wang et al., An Experimental Study of Bitmap Compression vs. Inverted List Compression, SIGMOD 2017: Proceedings of the 2017 ACM Int'l Conf. on Management of Data, pp. 993-1008 (May 2017).

Singh et al., Container-Based Microservice Architecture for Cloud Applications, International Conference on Computing, Communication and Automation (ICCCA2017), 2017.

Sanjeev Goyal et al., Attack, Defence and Contagion in Networks, the Review of Economic Studies, vol. 81, Issue 4, Oct. 2014, pp. 1518-1542, https://doi.org/10.1093/restud/rdu013 (2014).

Barrere et al., Vulnerability Assessment in Autonomic Networks and Services: A Survey, IEEE, Aug. 30, 2013, vol. 16, issue. 2, pp. 988-1004.

Burns et al., Automatic Management of Network Security Policy, IEEE, Jun. 14, 2001, pp. 12-26.

\* cited by examiner

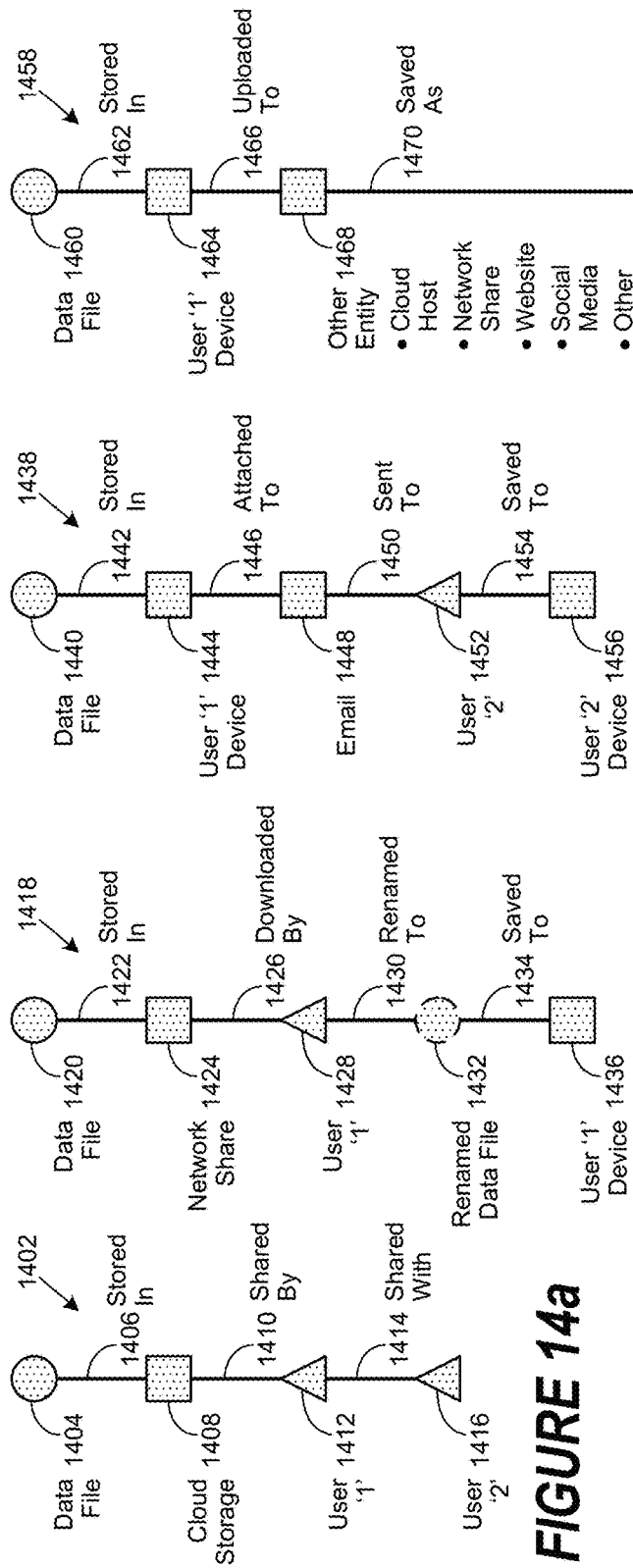
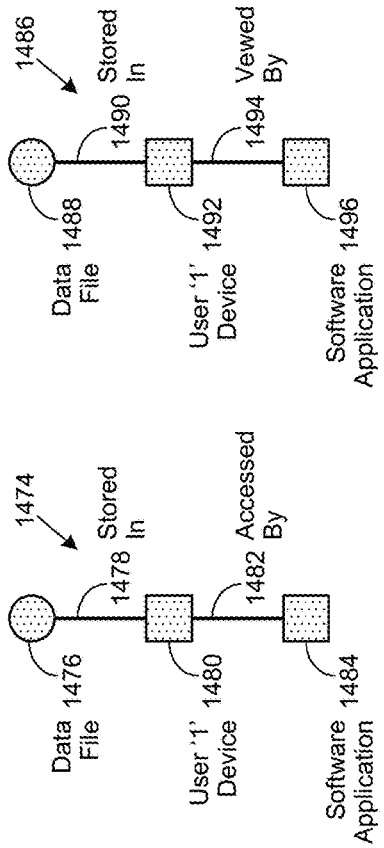
FIGURE 14a FIGURE 14b FIGURE 14c FIGURE 14d FIGURE 14e FIGURE 14f

USING A SECURITY ANALYTICS MAP TO TRACE ENTITY INTERACTION

BACKGROUND OF THE INVENTION

Field of the Invention

The present invention relates in general to the field of computers and similar technologies, and in particular to software utilized in this field. Still more particularly, it relates to a method, system and computer-usable medium for mapping entity interactions with data.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult. In particular, ensuring that an entity is who they claim to be can be challenging.

As an example, a first user may attempt to pose as a second user to gain access to certain confidential information. In this example, the first user may be prevented from accessing the confidential information if it can be determined that they are illegitimately posing as the second user. More particularly, access to the confidential information may be prevented if the identity of the first user is resolved prior to the confidential information actually being accessed. Likewise, the first user's access to the confidential information may be prevented if their identity cannot be resolved to the identity of the second user.

SUMMARY OF THE INVENTION

In one embodiment the invention relates to a method for performing a security operation comprising: monitoring a plurality of electronically-observable actions of a first entity, the plurality of electronically-observable actions of the first entity corresponding to a respective first plurality of events enacted by the first entity; monitoring a plurality of electronically-observable actions of a second entity, the plurality of electronically-observable actions of the second entity corresponding to a respective second plurality of events enacted by the second entity; determining whether a first event of the respective first plurality of events and a second event of the respective second plurality of events comprise an entity interaction between the first entity and the second entity; generating an entity interaction map, the entity interaction map providing a representation of the entity interaction between the first entity and the second entity; and, using the entity interaction map to trace the entity interaction between the first entity and the second entity.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring a plurality of electronically-observable actions of a first entity, the plurality of electronically-observable actions of the first entity corresponding to a respective first plurality of events enacted by the first entity; monitoring a plurality of electronically-observable actions of a second entity, the plurality of electronically-observable actions of the second entity corresponding to a respective second plurality of events enacted by the second entity; determining whether a first event of the respective first plurality of events and a second event of the respective second plurality of events comprise an entity interaction between the first entity and the second entity; generating an entity interaction map, the entity interaction map providing a representation of the entity interaction between the first entity and the second entity; and, using the entity interaction map to trace the entity interaction between the first entity and the second entity.

In another embodiment the invention relates to a computer-readable storage medium embodying computer program code, the computer program code comprising computer executable instructions configured for: monitoring a plurality of electronically-observable actions of a first entity, the plurality of electronically-observable actions of the first entity corresponding to a respective first plurality of events enacted by the first entity; monitoring a plurality of electronically-observable actions of a second entity, the plurality of electronically-observable actions of the second entity corresponding to a respective second plurality of events enacted by the second entity; determining whether a first event of the respective first plurality of events and a second event of the respective second plurality of events comprise an entity interaction between the first entity and the second entity; generating an entity interaction map, the entity interaction map providing a representation of the entity interaction between the first entity and the second entity; and, using the entity interaction map to trace the entity interaction between the first entity and the second entity.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 14a through 14f show examples of entity interaction maps resulting from the performance of one or more security analytics mapping operations;

DETAILED DESCRIPTION

Figure 1:
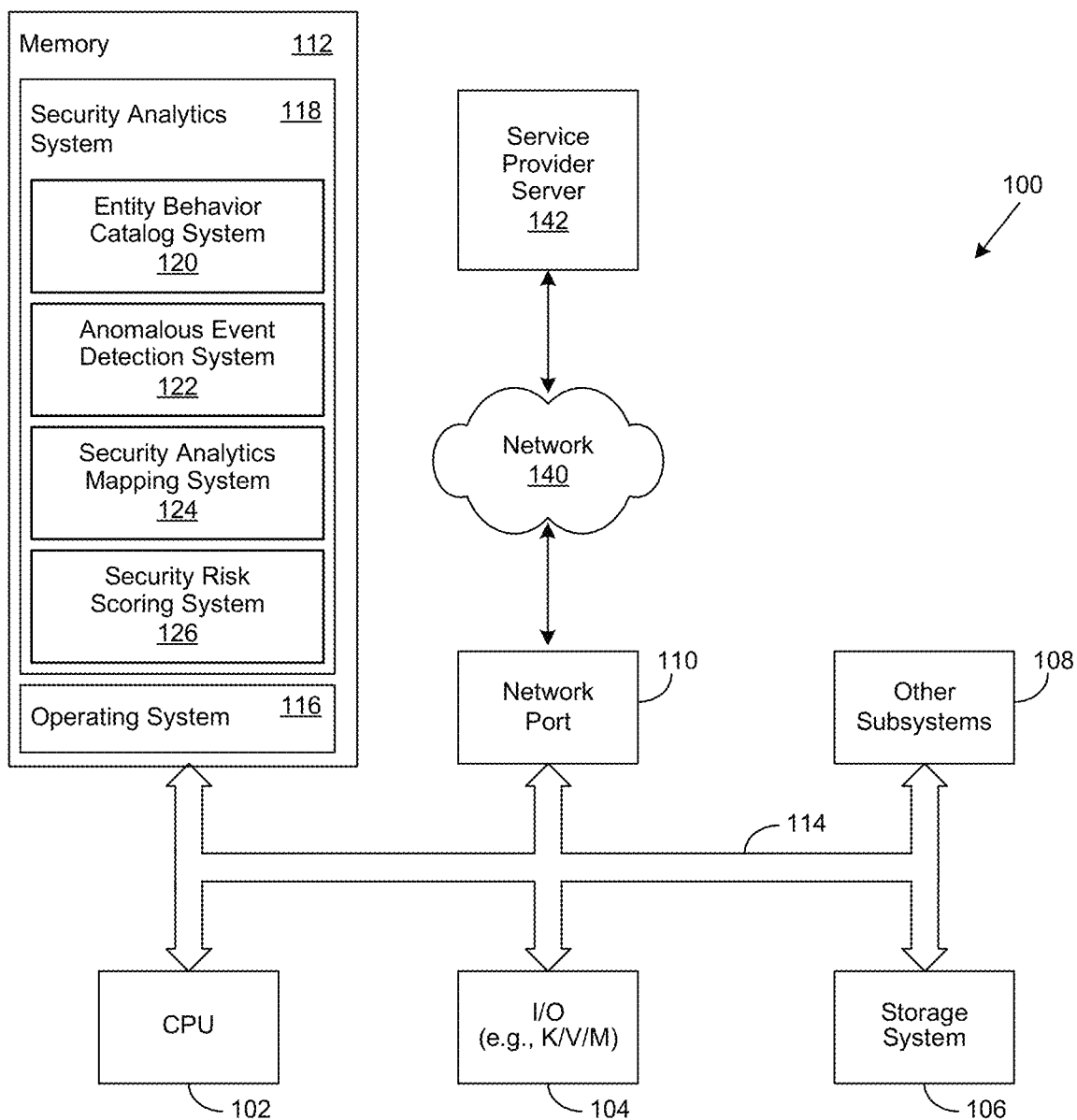
FIG. 1 depicts an exemplary client computer in which the present invention may be implemented.

A method, system and computer-usable medium are disclosed for mapping entity interactions with data. Certain aspects of the invention reflect an appreciation that the existence of any entity, whether it is an individual user, a group of users, an organization, a device, a system, a network, an account, a domain, an operation, a process, a software application, or a service, represents some degree of security risk. Certain aspects of the invention likewise reflect an appreciation that observation and analysis of one or more events, described in greater detail herein, may provide an indication of possible anomalous, abnormal, unexpected, or malicious behavior, any or all of which may represent a security risk.

Certain aspects of the invention reflect an appreciation that known approaches to anomalous event detection include the use of rule sets that are not based upon statistics. Certain aspects of the invention likewise reflect an appreciation that typical general-purpose anomalous event detection generally requires a learning period (e.g., thirty days) to collect counters and build a statistical behavioral baseline. Likewise, certain aspects of the invention reflect an appreciation that a proven statistical behavior baseline implemented for one event, or class of events, may be used as an initial statistical behavior baseline for similar events. Accordingly, the initial detection of an anomalous events associated with a particular entity may be facilitated prior to the collection of event data directly associated with the entity itself. In particular, certain aspects of the invention reflect an appreciation that such an initial detection may be particularly advantageous when an endpoint device is first implemented, such as its initial use by a new member of an organization.

Certain aspects of the invention likewise reflect an appreciation that malicious behavior by an entity, such as a user, may be difficult to detect when anomalous events associated with the entity take place over an extended period of time. For an example, an employee may believe they become a potential security risk only after they give their notice, and only thereafter will their activities will be tracked. As a result, the employee may begin stockpiling and exfiltrating data long before an actual resignation occurs (e.g., 60 days) in an attempt to reduce suspicion. Furthermore, such activities may be performed intermittently in an attempt to further reduce suspicion.

Certain aspects of the invention reflect an appreciation that a user may use two or more endpoint devices, either directly or indirectly, concurrently or at different times, as described in greater detail herein, to further mask malicious behavior. Certain aspects of the invention likewise reflect an appreciation that it is generally difficult to assess the security risk of such distributed entity activities, whether such behavior occurs concurrently or over time. Likewise, certain aspects of the invention reflect an appreciation that it can also be difficult to maintain a historical indicator of risk corresponding to past anomalous events associated with a particular entity.

Likewise, certain aspects of the invention reflect an appreciation that detection of malicious behavior is further hampered by the sheer volume of data generated as a result of various entity interactions. Furthermore, the challenges of tracking the movement of such volumes of data across endpoints, servers, and applications, whether on-premise or in the cloud, increases the possibility of critical data being placed at risk. Other challenges include the velocity and acceleration at which new data of all kinds is being created, the way it is shared and dispersed, often in real-time, using a multitude of applications, both sanctioned and unsanctioned. Additional challenges include the existence of multiple copies of the same data sets distributed across different systems and platforms with an increasing number of users and other entities having access to it. Certain aspects of the invention likewise reflect an appreciation that even when the movement of data may be tracked, it often lacks context, and by extension, creates impediments to identifying non-obvious malicious behavior.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions.

As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120, an anomalous event detection system 122, a security analytics mapping system 124, and a security risk scoring system 126, or a combination thereof. In various embodiments, the EBC system 120 may be implemented to perform certain entity behavior catalog operations, as described in greater detail herein. In various embodiments, the anomalous event detection system 122 may be implemented to perform certain anomalous event detection operations, as likewise described in greater detail herein. As likewise described in greater detail herein, the security analytics mapping system 124 may be implemented in various embodiments to perform certain security analytics mapping operations. Likewise, as described in greater detail herein, the security risk scoring system 126 may be implemented in various embodiments to perform certain security risk scoring operations.

Figure 2:
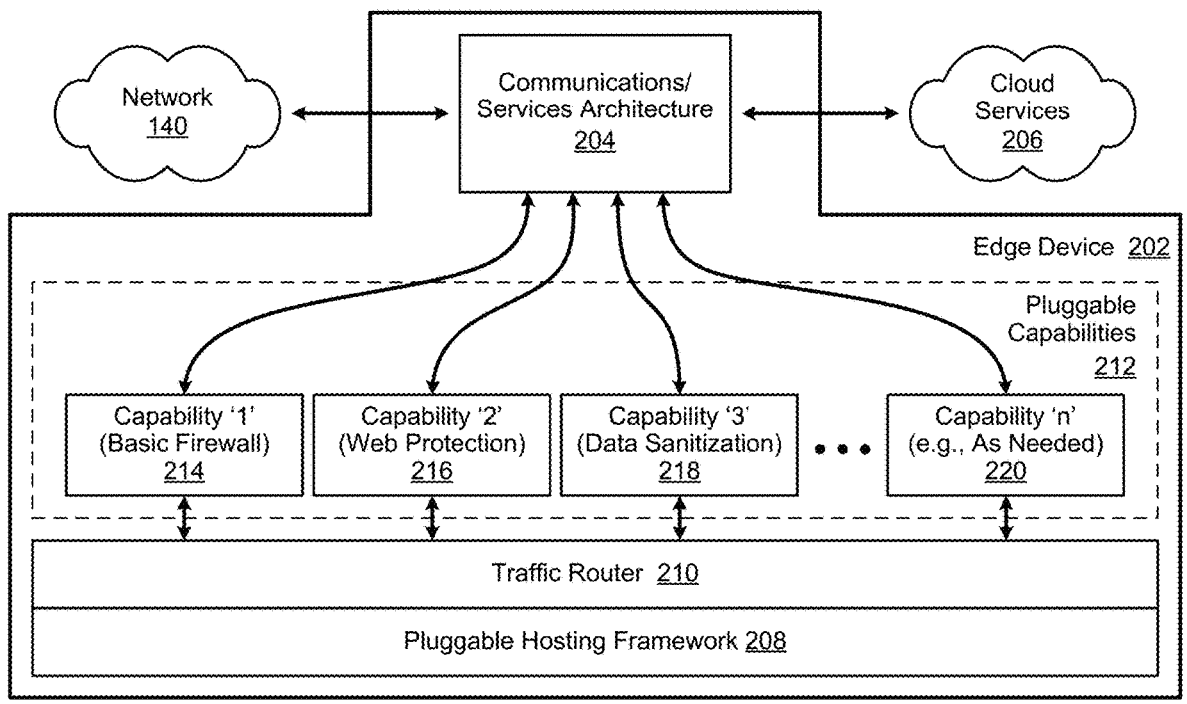
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with providing real-time resolution of the identity of an entity at a particular point in time. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
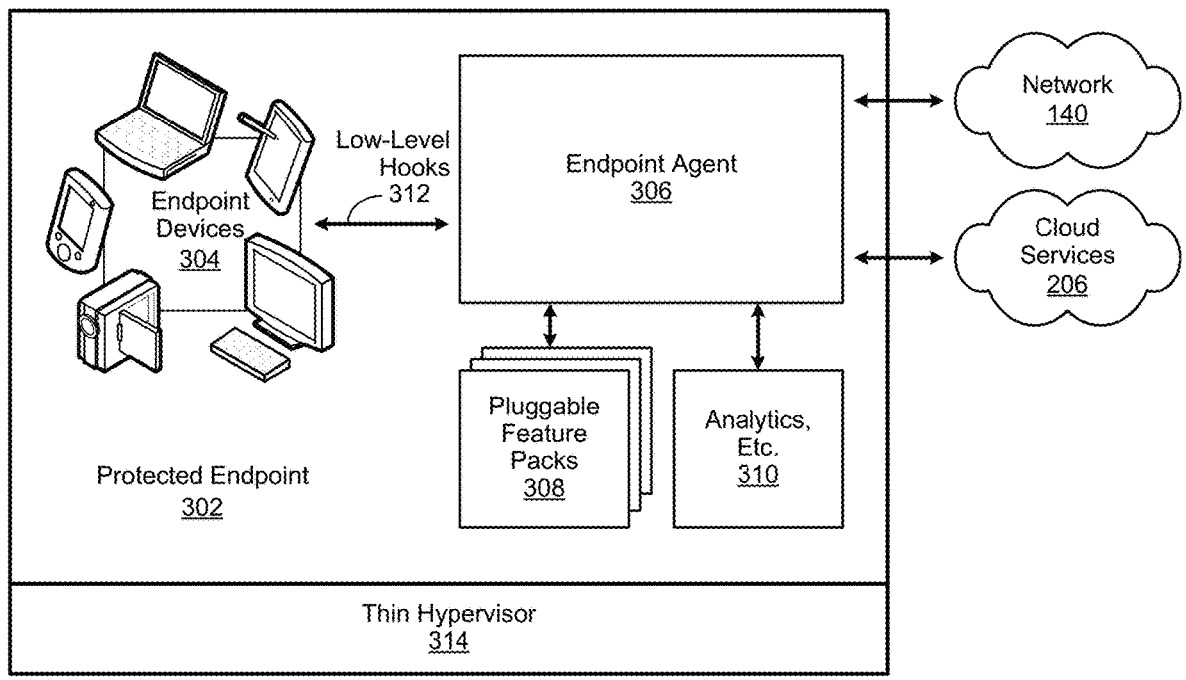
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed entity behavior, described in greater detail herein.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with particular criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as time-stamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically convey a document to a second user, which is captured by a video surveillance system. In this example, the physical conveyance of the document from the first user to the second user is the action. Likewise, the video record of the conveyance makes the first and second user's physical behavior electronically-observable. As used herein, electronically-observable user behavior broadly refers to any behavior exhibited or enacted by a user that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include an entity's authentication factors. Contextual information may likewise include various temporal identity resolution factors, such as identification factors associated with the entity, the date/time/frequency of various entity behaviors, the entity's location, the entity's role or position in an organization, their associated access rights, and certain user gestures employed by the user in the enactment of a user behavior. Other contextual information may likewise include various user interactions, whether the interactions are with an endpoint device 304, a network 140, a resource, or another user. In certain embodiments, user behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the operating system level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 may be invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-needed basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
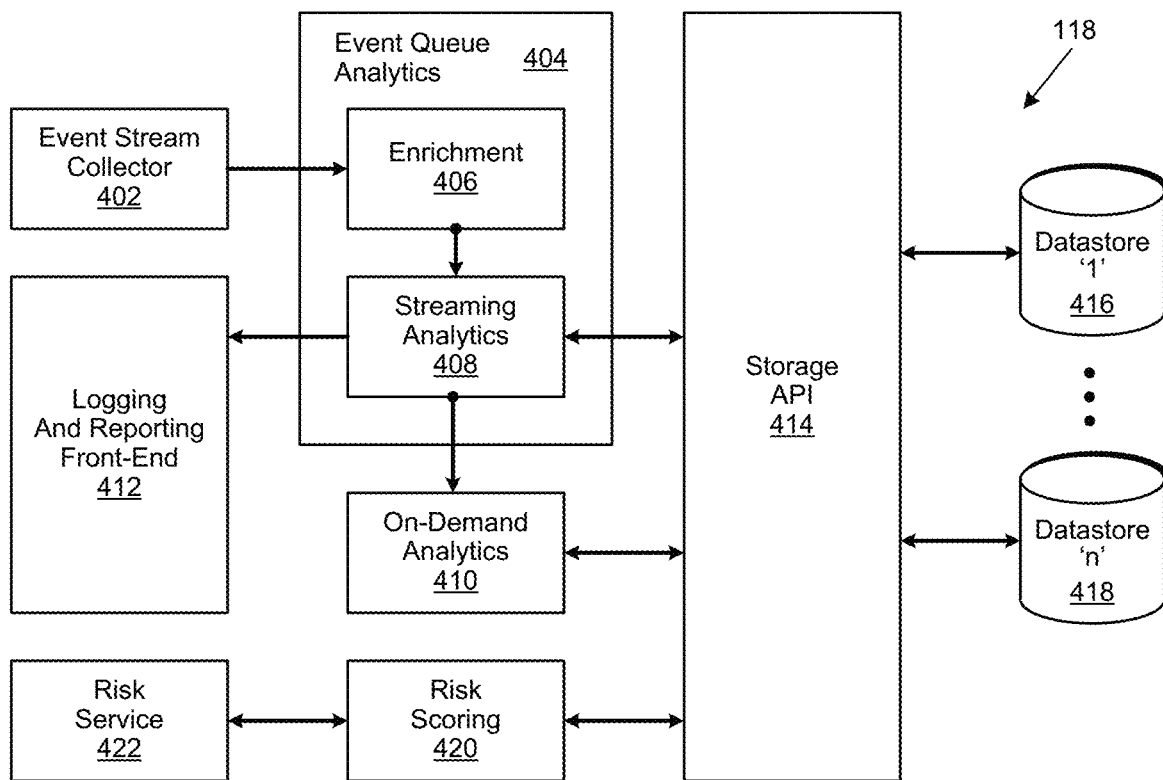
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing an entity behavior profile (EBP), described in greater detail herein. In certain embodiments, an EBP may be implemented as an adaptive trust profile (ATP). In certain embodiments, an EBP may be implemented to detect entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as likewise described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the user is attempting to access is proprietary, that it is stored in various locations, and the attempts are occurring in a brief period of time, in combination, may indicate the entity behavior enacted by the entity is suspicious. As another example, certain entity identifier information (e.g., a user name) associated with an entity may change over time. In this example, a change in the entity's user name, during a particular time period or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an entity behavior profile (EBP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
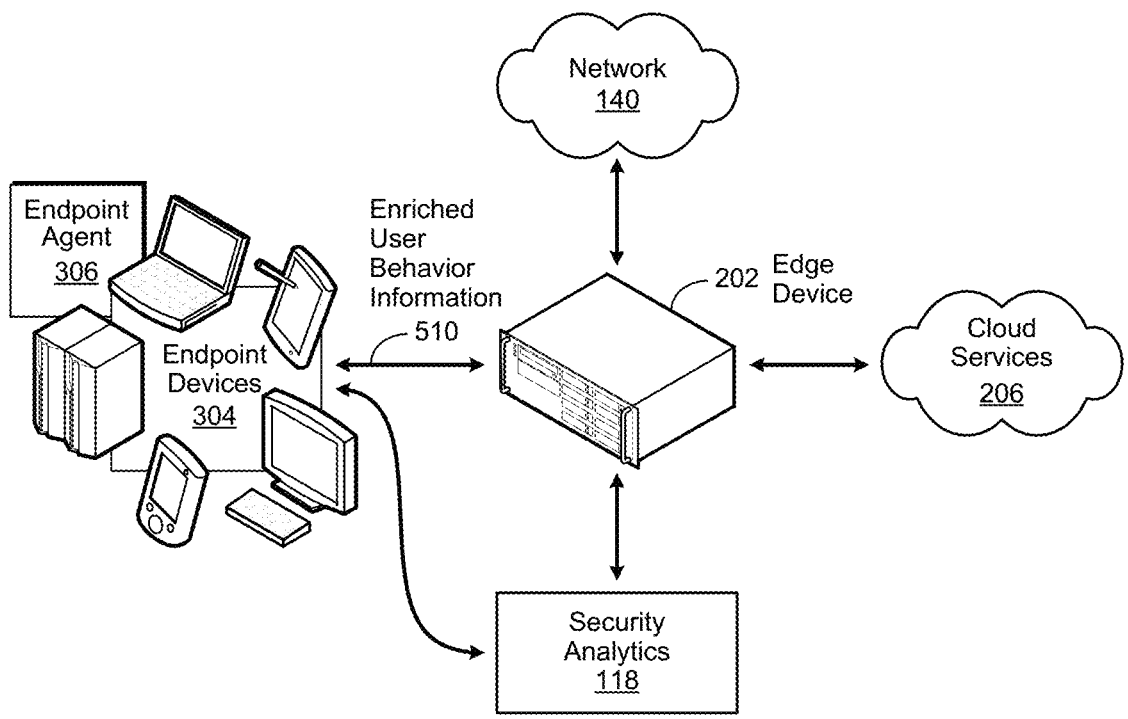
FIG. 5 is a simplified block diagram of the operation of a security analytics system.

FIG. 5 is a simplified block diagram of the operation of a security analytics system implemented in accordance with an embodiment of the invention. In certain embodiments, the security analytics system 118 may be implemented to perform operations associated with providing real-time resolution of the identity of an entity at a particular point in time. In certain embodiments, the security analytics system 118 may be implemented in combination with one or more endpoint agents 306, one or more edge devices 202, cloud services 206, and a security analytics system 118, and a network 140 to perform such operations.

In certain embodiments, the network edge device 202 may be implemented in a bridge, a firewall, or a passive monitoring configuration. In certain embodiments, the edge device 202 may be implemented as software running on an information processing system. In certain embodiments, the network edge device 202 may be implemented to provide integrated logging, updating and control. In certain embodiments, the edge device 202 may be implemented to receive network requests and context-sensitive cyber behavior information in the form of enriched cyber behavior information 510, described in greater detail herein, from an endpoint agent 306, likewise described in greater detail herein.

In certain embodiments, the security analytics system 118 may be implemented as both a source and a sink of entity behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality associated with operations associated with providing real-time resolution of the identity of an entity at a particular point in time.

In certain embodiments, a given user behavior may be enriched by an associated endpoint agent 306 attaching contextual information to a request. In one embodiment, the context is embedded within a network request, which is then provided as enriched user behavior information 510. In another embodiment, the contextual information is concatenated, or appended, to a request, which in turn is provided as enriched user behavior information 510. In these embodiments, the enriched user behavior information 510 is unpacked upon receipt and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests are accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores on a per-user basis may be requested. In certain embodiments, the service may be requested from the security analytics system 118. In certain embodiments, the service may be requested from various cloud services 206.

In certain embodiments, contextual information associated with a user behavior may be attached to various network service requests. In certain embodiments, the request may be wrapped and then handled by proxy. In certain embodiments, a small packet of contextual information associated with a user behavior may be sent with a service request. In certain embodiments, service requests may be related to Domain Name Service (DNS), web, email, and so forth, all of which are essentially requests for service by an endpoint device 304. In certain embodiments, such service requests may be associated with temporal event information, described in greater detail herein. Consequently, such requests can be enriched by the addition of user behavior contextual information (e.g., UserAccount, interactive/automated, data-touched, temporal event information, etc.). Accordingly, the edge device 202 can then use this information to manage the appropriate response to submitted requests. In certain embodiments, such requests may be associated with providing real-time resolution of the identity of an entity at a particular point in time.

In certain embodiments, the security analytics system 118 may be implemented in different operational configurations. In one embodiment, the security analytics system 118 may be implemented by using the endpoint agent 306. In another embodiment, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to user actions, program actions, data accesses, or a combination thereof. In certain embodiments, program actions may be treated as a proxy for the user.

In certain embodiments, the endpoint agent 306 may be implemented to update the security analytics system 118 with user behavior and associated contextual information, thereby allowing an offload of certain analytics processing overhead. In one embodiment, this approach allows for longitudinal risk scoring, which assesses risk associated with certain user behavior during a particular interval of time. In another embodiment, the security analytics system 118 may be implemented to perform risk-adaptive operations to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, the approach may be accomplished by providing additional contextual and user behavior information associated with user requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 202 and security analytics system 118 may be coupled such that requests can be contextualized and fitted into a framework that evaluates their associated risk. It will be appreciated that such an embodiment works well with web-based data loss protection (DLP) approaches, as each conveyance of data is no longer examined in isolation, but in the broader context of an identified user's actions, at a particular time, on the network 140.

As another example, the security analytics system 118 may be implemented to perform risk scoring processes to decide whether to block or allow unusual flows. It will be appreciated that such an approach is highly applicable to defending against point-of-sale (POS) malware, a breach technique that has become increasingly more common in recent years. It will likewise be appreciated that while various edge device 202 implementations may not stop all such exfiltrations, they may be able to complicate the task for the attacker.

In certain embodiments, the security analytics system 118 may be primarily oriented to maximally leverage contextual information associated with various user behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such user behavior on the network 140, the security analytics system 118 can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
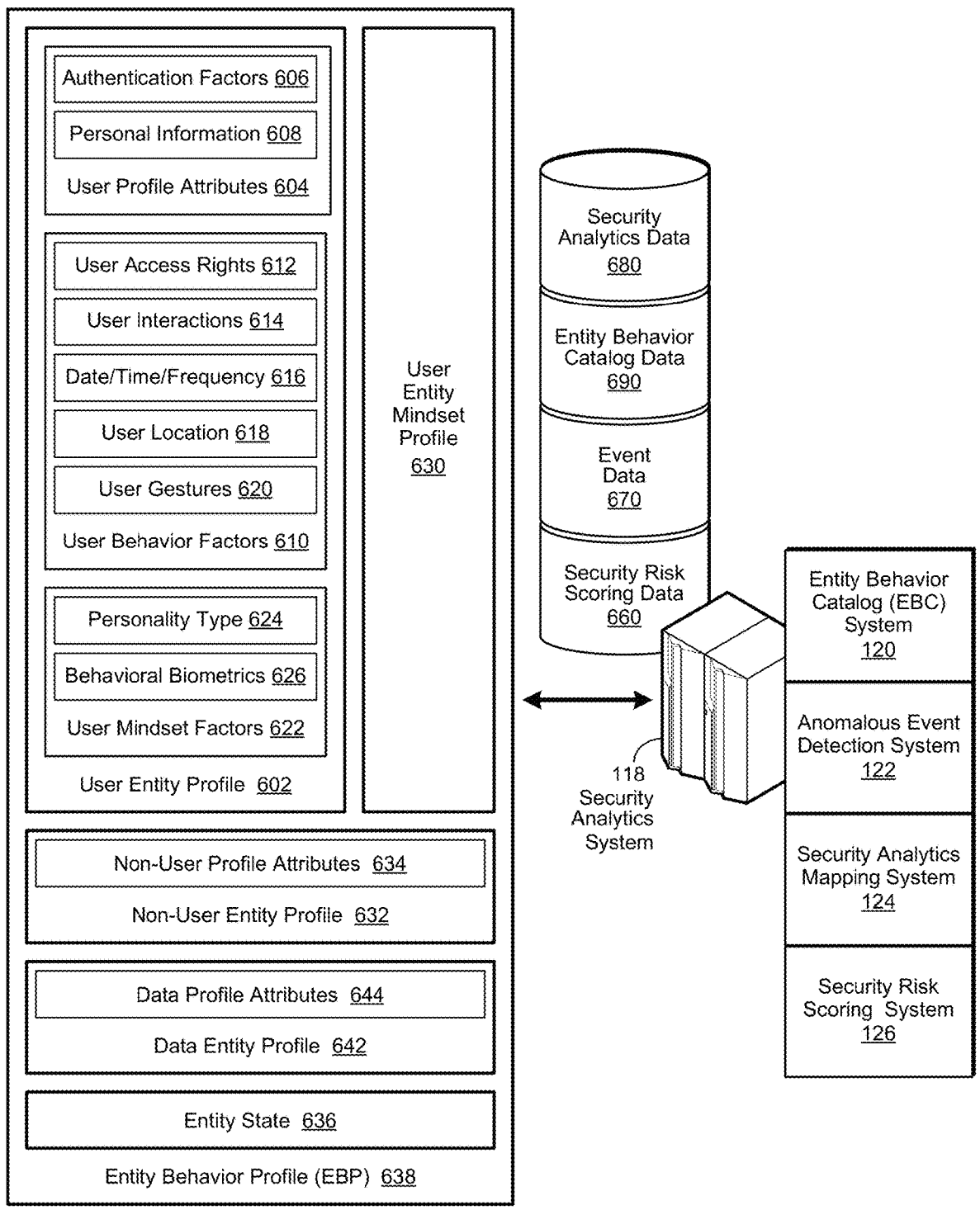
FIG. 6 shows a simplified block diagram of an entity behavior profile (EBP)

FIG. 6 shows a simplified block diagram of an entity behavior profile (EBP) implemented in accordance with an embodiment of the invention. As used herein, an entity behavior profile 638 broadly refers to a collection of information that uniquely describes a particular entity's identity and their associated behavior, whether the behavior occurs within a physical realm or cyberspace. In certain embodiments, an EBP 638 may be used to adaptively draw inferences regarding the trustworthiness of a particular entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that can be described, uniquely identified, and exists as itself, whether physically or abstractly. In certain embodiments, an entity may be a user entity, a non-user entity, or a data entity. In certain embodiments, the identity of an entity may be known or unknown.

As used herein, a user entity broadly refers to an entity capable of enacting certain user entity behavior, as described in greater detail herein, but is incapable of enacting a non-user entity or data entity behavior. Examples of a user entity include an individual person, a group of people, an organization, or a government. As likewise used herein, a non-user entity broadly refers to an entity capable of enacting certain non-user entity behavior, but is incapable of enacting a user entity or data entity behavior. Examples of a non-user entity include an item, a device, such as endpoint and edge devices, a network, an account, a domain, an operation, a process, and an event. Other examples of a non-user entity include a resource, such as a geographical location or formation, a physical facility, a venue, a system, a software application, a data store, and a service, such as a service operating in a cloud environment. Examples of non-user entity behavior include performing a mechanical, electrical, electronic, or computing operation. Other examples of non-user entity behavior included receiving, retrieving, processing, storing, and providing information.

As used herein, data broadly refers to information that has been translated into a form that is efficient for movement or processing. As likewise used herein, a data entity broadly refers to an entity capable of enacting certain data entity behavior, but is incapable of enacting a user entity or non-user entity behavior. Examples of a data entity include a data file, a dataset, an individual data element, an object, an audio or video recording, an image or graphics file, and a text or email message. Other examples of a data entity include metadata, a written or printed text, a graphical image recorded on a physical medium, and a recording of a human gesture or utterance. Examples of data entity behavior include the ingestion of data, the storage of data, the modification of data, the portioning of data, the aggregation of data, the provision of data, the persisting of data, and the deletion of data. In certain embodiments, a data entity may be involved in an entity interaction, as described in greater detail herein, with another entity.

Certain embodiments of the invention reflect an appreciation that being able to uniquely identity a device may assist in establishing whether or not a particular login is legitimate. As an example, user impersonations may not occur at the user's endpoint, but instead, from another device or system. Certain embodiments of the invention likewise reflect an appreciation that profiling the entity behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an EBP 638 may be implemented to include a user entity profile 602, an associated user entity mindset profile 630, a non-user entity profile 632, a data entity profile 642, and an entity state 636. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 604, user behavior factors 610, user mindset factors 622, or a combination thereof. In certain embodiments, the user profile attributes 604 may include certain user authentication factors 606, described in greater detail herein, and personal information 608.

As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 606, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 610 broadly refers to information associated with a user entity's behavior, whether the behavior occurs within a physical realm or cyberspace. In certain embodiments, user behavior factors 610 may include the user entity's access rights 612, the user entity's interactions 614, and the date/time/frequency 616 of when the interactions 614 are enacted. In certain embodiments, the user behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user mindset factors 622 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of an action performed by an entity. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user mindset factors 622 may include various behavioral biometrics 626. As used herein, a behavioral biometric 628 broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. Likewise, certain embodiments of the invention include an appreciation that certain user entity gestures 620 and behavioral biometrics 626 are reflective of an individual user's personality type 624. As an example, aggressive, forceful keystrokes combined with an increased heart rate may indicate normal behavior for a particular user when composing end-of-month performance reviews. In various embodiments, certain user entity behavior factors 610, such as user gestures 620, may be correlated with certain contextual information, as described in greater detail herein.

In certain embodiments, a security analytics system 118, described in greater detail herein, may be implemented to include an entity behavior catalog (EBC) system 120, an anomalous event detection system 122, a security analytics mapping system 124, and a security risk scoring system 126, or a combination thereof. In certain embodiments, the security analytics system 118 may be implemented to access a repository of event 670 data, a repository of security risk scoring data 660, a repository of EBC 690 data, and a repository of security analytics 680 data, or a combination thereof. In various embodiments, the security analytics system 118 may be implemented to use certain information stored in the repository of event 670 data, the repository of security risk scoring 660 data, the repository of EBC 690 data, and the repository of security analytics 680 data, or a combination thereof, to perform a security analytics operation, described in greater detail herein. In certain embodiments, the results of a particular security analytics operation may be stored in the repository of security analytics 680 data.

In certain embodiments, the EBC system 120 may be implemented to generate, manage, store, or some combination thereof, information related to the behavior of an associated entity. In certain embodiments, the information related to the behavior of a particular entity may be stored in the form of an EBP 638. In certain embodiments, the EBC system 120 may be implemented to store the information related to the behavior of a particular entity in the repository of EBC 690 data. In various embodiments, the EBC system 120 may be implemented to generate certain information related to the behavior of a particular entity from event information associated with the entity, as described in greater detail herein. In certain embodiments, event information associated with a particular entity may be stored in the repository of event 670 data.

In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog, may be related to cyber behavior enacted by a user entity, a non-user entity, or a combination thereof.

In certain embodiments, the anomalous event detection system 122 may be implemented to perform an anomalous event detection operation, likewise described in greater detail herein. In various embodiments, as likewise described in greater detail herein, the anomalous event detection system 122 may be implemented to use certain event information stored in the repositories of security risk scoring 660, event 670, EBC 690, and security analytics 680 data, or a combination thereof, to perform the anomalous event detection operation. As used herein, an anomalous event detection operation broadly refers to any operation that may be performed to detect an anomalous event associated with a particular user or non-user entity. In certain embodiments, a particular anomalous event detection operation may be performed as a security operation, described in greater detail herein.

In certain embodiments, the EBC system 120 may be implemented to use a user entity profile 602 in combination with an entity state 636 to generate a user entity mindset profile 630. As used herein, entity state 636 broadly refers to the context of a particular event or entity behavior. In certain embodiments, the entity state 636 may be a long-term entity state or a short-term entity state. As used herein, a long-term entity state 636 broadly relates to an entity state 636 that persists for an extended interval of time, such as six months or a year. As likewise used herein, a short-term entity state 636 broadly relates to an entity state 636 that occurs for a brief interval of time, such as a few minutes or a day. In various embodiments, the method by which an entity state's 636 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 618, whereas the presence of the user at either office corresponds to an entity state 636. To continue the example, the user may consistently work at their primary office Monday through Thursday, but at their company's corporate office on Fridays. To further continue the example, the user's presence at their primary work location may be a long-term entity state 636, while their presence at their secondary work location may be a short-term entity state 636. Accordingly, a date/time/frequency 616 user entity behavior factor 610 can likewise be associated with user behavior respectively enacted on those days, regardless of their corresponding locations. Consequently, the long-term user entity state 636 on Monday through Thursday will typically be "working at the branch office" and the short-term entity state 636 on Friday will likely be "working at the corporate office."

As likewise used herein, a user entity mindset profile 630 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 604. Likewise, it may be possible to observe a user entity's associated user behavior factors 610, such as their interactions with various systems, when they log-in and log-out, when they are active at the keyboard, the rhythm of their keystrokes, and which files they typically use.

Certain embodiments of the invention reflect an appreciation these behavior factors 610 can be considered to be a behavioral fingerprint. In certain embodiments, the user behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 610 may be implemented to ascertain the identity of a user entity. In certain embodiments, the user behavior factors 610 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be used in combination with an EBP 638 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 632 broadly refers to a collection of information that uniquely describes a non-user entity's identity and their associated behavior, whether the behavior occurs within a physical realm or cyberspace. In various embodiments, the non-user entity profile 632 may be implemented to include certain non-user profile attributes 634. As used herein, a non-user profile attribute 634 broadly refers to data or metadata that can be used, individually or in combination with other non-user profile attributes 634, to ascertain the identity of a non-user entity. In various embodiments, certain non-user profile attributes 634 may be uniquely associated with a particular non-user entity.

In certain embodiments, the non-user profile attributes 634 may be implemented to include certain identity information, such as a non-user entity's network, Media Access Control (MAC), or physical address, its serial number, associated configuration information, and so forth. In various embodiments, the non-user profile attributes 634 may be implemented to include non-user behavior information associated with interactions between certain user and non-user entities, the type of those interactions, the data exchanged during the interactions, the date/time/frequency of such interactions, and certain services accessed or provided.

A data entity profile 642, as used herein, broadly refers to a collection of information that uniquely identifies a data entity and its behavior, whether the behavior occurs within a physical realm or cyberspace. In various embodiments, the data entity profile 642 may be implemented to include certain data profile attributes 644. As used herein, a data profile attribute broadly refers to data or metadata that can be used, individually or in combination with other data profile attributes 644, to ascertain the identity of a data entity. In various embodiments, certain data profile attributes 644 may be uniquely associated with a particular data entity.

In certain embodiments, the data profile attributes 644 may be implemented to include certain identity information, such as a file name, a hash value, time and date stamps, a digital watermark familiar to those of skill in the art, and so forth. In various embodiments, the data profile attributes 644 may be implemented to include data entity behavior information associated with interactions between certain user and non-user entities, the type of those interactions, modifications to the data entity during a particular interaction, and the date/time/frequency of such interactions.

In various embodiments, the EBC system 120 may be implemented to use certain data associated with an EBP 638 to provide a probabilistic measure of whether a particular electronically-observable event is of analytic utility. In certain embodiments, an electronically-observable event that is of analytic utility may be determined to be anomalous, abnormal, unexpected, or malicious. In certain embodiments, an electronically-observable event determined to be anomalous, abnormal, unexpected, or malicious may be associated with an operation performed by a particular endpoint device, described in greater detail herein. To continue the prior example, a user may typically work out of their company's corporate office on Fridays. Furthermore, various user mindset factors 622 within their associated user entity profile 602 may indicate that the user is typically relaxed and methodical when working with customer data. Moreover, the user's user entity profile 602 indicates that such user interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 630 may reflect a nervous, fearful, or guilty mindset, which is inconsistent with the entity state 634 of dealing with customer data in general. More particularly, downloading customer data late at night on a day the user is generally not in their primary office results in an entity state 634 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 638 may have a direct bearing on its analytic utility when attempting to determine the trustworthiness of an associated entity and whether or not they represent a security risk. As used herein, the quantity of information contained in a particular EBP 638 broadly refers to the variety and volume of EBP elements it may contain, and the frequency of their respective instances, or occurrences, related to certain aspects of an associated entity's identity and behavior. As used herein, an EBP element broadly refers to any data element stored in an EBP 638, as described in greater detail herein. In various embodiments, an EBP element may be used to describe a particular aspect of an EBP, such as certain user profile attributes 604, user behavior factors 610, user mindset factors 622, user entity mindset profile 630, non-user profile attributes 634, and entity state 636.

In certain embodiments, statistical analysis may be performed on the information contained in a particular EBP 638 to determine the trustworthiness of its associated entity and whether or not they represent a security risk. For example, a particular authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 638 broadly refers to the pertinence of the EBP elements it may contain to certain aspects of an associated entity's identity and behavior. To continue the prior example, an EBP 638 associated with the procurement agent may contain certain user profile attributes 604 related to their title, position, role, and responsibilities, all or which may be pertinent to whether or not they have a legitimate need to access the sales forecast system. In certain embodiments, the user profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 638 is of sufficient quantity and relevancy is a matter of design choice.

Various embodiments of the invention likewise reflect an appreciation that accumulating sufficient information in an EBP 638 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior. Accordingly, various embodiments of the invention reflect an appreciation that a sparsely-populated EBP 638 may likewise result in exposure to certain security vulnerabilities. Furthermore, the relevance of such sparsely-populated information initially contained in an EBP 638 first implemented may not prove very useful when using an EBP 638 to determine the trustworthiness of an associated entity and whether or not they represent a security risk.

Figure 7A:
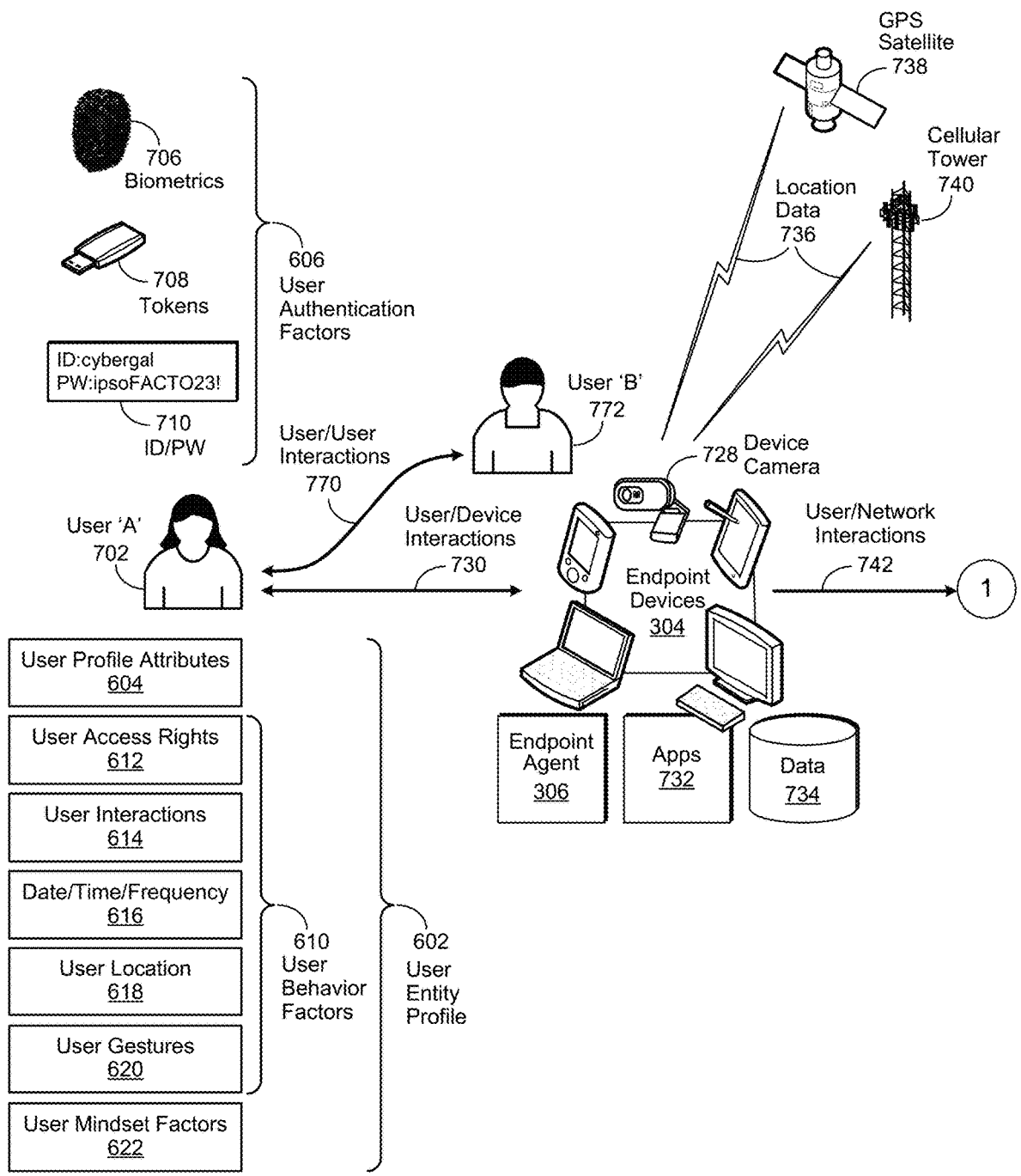
FIGS. 7a and 7b are a simplified block diagram of the operation of a security analytics system.
Figure 7B:
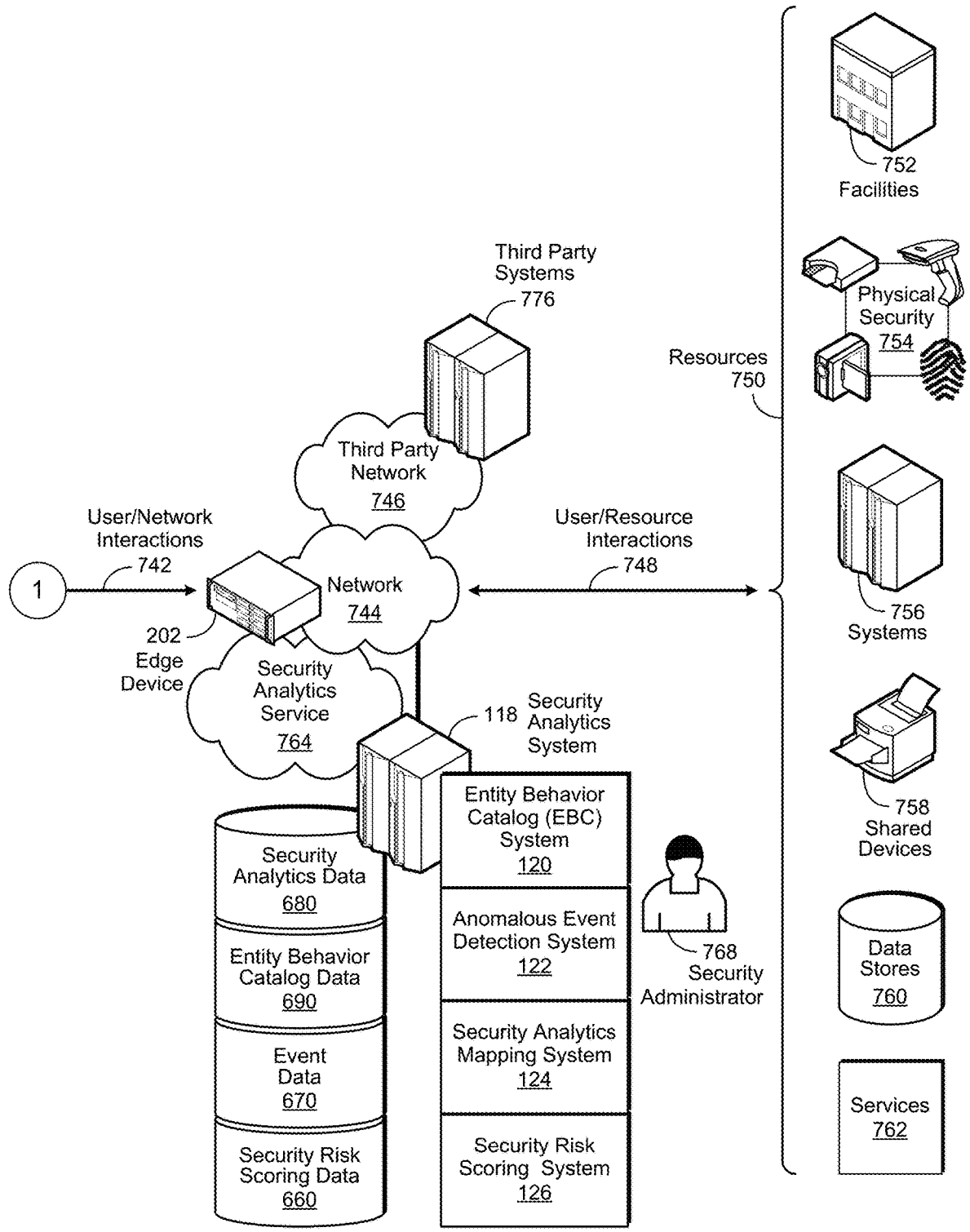

FIGS. 7*a* and 7*b* show a block diagram of a security analytics environment implemented in accordance with an embodiment of the invention. In certain embodiments, a security analytics system 118 may be implemented with an entity behavior catalog (EBC) system 120, an anomalous event detection system 122, a security analytics mapping system 124, and security risk scoring system 126, or a combination thereof. In certain embodiments, analyses performed by the security analytics system 118 may be used to identify behavior associated with a particular entity that may be of analytic utility.

In certain embodiments, as likewise described in greater detail herein, the EBC system 120, the anomalous event detection system 122, the security analytics mapping system 124, and the security risk scoring system 126, or a combination thereof, may be used in combination with the security analytics system 118 to perform such analyses. In various embodiments, certain data stored in the repositories of security risk scoring 660, event 670, security analytics 680, and EBC 690 data, or a combination thereof, may be used by the security analytics system 118 to perform the analyses. As likewise described in greater detail herein, the security analytics system 118, the EBC system 120, the anomalous event detection system 122, the security analytics mapping system 124, and the security risk scoring system 126, or a combination thereof, may be used in combination with one another in certain embodiments to perform an anomalous event detection operation. Likewise, certain data stored in the repositories of security risk scoring 660, event 670, security analytics 680, and EBC 690 data, or a combination thereof, may be used in various embodiments to perform the anomalous event detection operation.

In certain embodiments, the entity behavior of analytic utility may be identified at a particular point in time, during the occurrence of an event, the enactment of a user or non-user entity behavior, or a combination thereof. As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 702 or 'B' 772, a group, an organization, or a government. In certain embodiments, a non-user entity may likewise be an item, a device, such as endpoint 304 and edge 202 devices, a network, such as an internal 744 and external 746 networks, a domain, an operation, or a process. In certain embodiments, a non-user entity may be a resource 750, such as a geographical location or formation, a physical facility 752, such as a venue, various physical security devices 754, a system 756, shared devices 758, such as printer, scanner, or copier, a data store 760, or a service 762, such as a service 762 operating in a cloud environment.

As likewise used herein, an event broadly refers to the occurrence of an action performed by an entity. In certain embodiments, the action may be directly associated with an entity behavior, described in greater detail herein. As an example, a first user may attach a binary file infected with a virus to an email that is subsequently sent to a second user. In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

In various embodiments, certain user authentication factors 606 may be used to authenticate the identity of a user entity. In certain embodiments, the user authentication factors 606 may be used to ensure that a particular user entity, such as user 'A' 702 or 'B' 772, is associated with their corresponding user entity profile 602, rather than a user entity profile 602 associated with another user. In certain embodiments, the user authentication factors 606 may include a user's biometrics 706 (e.g., a fingerprint or retinal scan), tokens 708 (e.g., a dongle containing cryptographic keys), user identifiers and passwords (ID/PW) 710, and personal identification numbers (PINs).

In certain embodiments, information associated with such user entity behavior may be stored in a user entity profile 602, described in greater detail herein. In certain embodiments, the user entity profile 602 may be stored in a repository of entity behavior catalog (EBC) data 690. In certain embodiments, as likewise described in greater detail herein, the user entity profile 602 may include user profile attributes 604, user behavior factors 610, user mindset factors 622, or a combination thereof. As used herein, a user profile attribute 604 broadly refers to data or metadata that can be used, individually or in combination with other user profile attributes 604, user behavior factors 610, or user mindset factors 622, to ascertain the identity of a user entity. In various embodiments, certain user profile attributes 604 may be uniquely associated with a particular user entity.

As likewise used herein, a user behavior factor 610 broadly refers to information associated with a user's behavior, whether the behavior occurs within a physical realm or cyberspace. In certain embodiments, the user behavior factors 610 may include the user's access rights 612, the user's interactions 614, and the date/time/frequency 616 of those interactions 614. In certain embodiments, the user behavior factors 610 may likewise include the user's location 618 when the interactions 614 are enacted, and the user gestures 620 used to enact the interactions 614.

In various embodiments, certain date/time/frequency 616 user behavior factors 610 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 604, user behavior factors 610, user mindset factors 622, or a combination thereof, to one or more instants in time. As an example, user 'A' 702 may access a particular system 756 to download a customer list at 3:47 PM on Nov. 3, 2017. Analysis of their user behavior profile indicates that it is not unusual for user 'A' 702 to download the customer list on a weekly basis. However, examination of their user behavior profile also indicates that user 'A' 702 forwarded the downloaded customer list in an email message to user 'B' 772 at 3:49 PM that same day. Furthermore, there is no record in their user behavior profile that user 'A' 702 has ever communicated with user 'B' 772 in the past. Moreover, it may be determined that user 'B' 872 is employed by a competitor. Accordingly, the correlation of user 'A' 702 downloading the customer list at one point in time, and then forwarding the customer list to user 'B' 772 at a second point in time shortly thereafter, is an example of societal time.

In a variation of the prior example, user 'A' 702 may download the customer list at 3:47 PM on Nov. 3, 2017. However, instead of immediately forwarding the customer list to user 'B' 772, user 'A' 702 leaves for a two week vacation. Upon their return, they forward the previously-downloaded customer list to user 'B' 772 at 9:14 AM on Nov. 20, 2017. From an ontological time perspective, it has been two weeks since user 'A' 702 accessed the system 756 to download the customer list. However, from a societal time perspective, they have still forwarded the customer list to user 'B' 772, despite two weeks having elapsed since the customer list was originally downloaded.

Accordingly, the correlation of user 'A' 702 downloading the customer list at one point in time, and then forwarding the customer list to user 'B' 772 at a much later point in time, is another example of societal time. More particularly, it may be inferred that the intent of user 'A' 702 did not change during the two weeks they were on vacation. Furthermore, user 'A' 702 may have attempted to mask an intended malicious act by letting some period of time elapse between the time they originally downloaded the customer list and when they eventually forwarded it to user 'B' 772. From the foregoing, those of skill in the art will recognize that the use of societal time may be advantageous in determining whether a particular entity behavior is of analytic utility. As used herein, mindset factors 622 broadly refer to information used to infer the mental state of a user at a particular point in time, during the occurrence of an event, an enactment of a user behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular operation in a physical realm, cyberspace, or a combination thereof. In certain embodiments, such entity behavior elements may be associated with a user/device 730, a user/network 742, a user/resource 748, a user/user 770 interaction, or a combination thereof.

As an example, user 'A' 702 may use an endpoint device 304 to browse a particular web page on a news site on an external system 776. In this example, the individual actions performed by user 'A' 702 to access the web page are entity behavior elements that constitute an entity behavior, described in greater detail herein. As another example, user 'A' 702 may use an endpoint device 304 to download a data file from a particular system 756. In this example, the individual actions performed by user 'A' 702 to download the data file, including the use of one or more user authentication factors 606 for user authentication, are entity behavior elements that constitute an entity behavior. In certain embodiments, the user/device 730 interactions may include an interaction between a user, such as user 'A' 702 or 'B' 772, and an endpoint device 304.

In certain embodiments, the user/device 730 interaction may include interaction with an endpoint device 304 that is not connected to a network at the time the interaction occurs. As an example, user 'A' 702 or 'B' 772 may interact with an endpoint device 304 that is offline, using applications 732, accessing data 734, or a combination thereof, it may contain. Those user/device 730 interactions, or their result, may be stored on the endpoint device 304 and then be accessed or retrieved at a later time once the endpoint device 304 is connected to the internal 744 or external 746 networks. In certain embodiments, an endpoint agent 306 may be implemented to store the user/device 730 interactions when the user device 304 is offline.

In certain embodiments, an endpoint device 304 may be implemented with a device camera 728. In certain embodiments, the device camera 728 may be integrated into the endpoint device 304. In certain embodiments, the device camera 728 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 728 may be implemented to capture and provide user/device 730 interaction information to an endpoint agent 306. In various embodiments, the device camera 728 may be implemented to provide surveillance information related to certain user/device 730 or user/user 770 interactions. In certain embodiments, the surveillance information may be used by the security analytics system 118 to detect entity behavior associated with a user entity, such as user 'A' 702 or user 'B' 772 that may be of analytic utility.

In certain embodiments, the endpoint device 304 may be used to communicate data through the use of an internal network 744, an external network 746, or a combination thereof. In certain embodiments, the internal 744 and the external 746 networks may include a public network, such as the Internet, a physical private network, a virtual private network (VPN), or any combination thereof. In certain embodiments, the internal 744 and external 746 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 770 interactions may include interactions between two or more user entities, such as user 'A' 702 and 'B' 772. In certain embodiments, the user/user interactions 770 may be physical, such as a face-to-face meeting, via a user/device 730 interaction, a user/network 742 interaction, a user/resource 748 interaction, or some combination thereof. In certain embodiments, the user/user 770 interaction may include a face-to-face verbal exchange. In certain embodiments, the user/user 770 interaction may include a written exchange, such as text written on a sheet of paper. In certain embodiments, the user/user 770 interaction may include a face-to-face exchange of gestures, such as a sign language exchange.

In certain embodiments, temporal event information associated with various user/device 730, user/network 742, user/resource 748, or user/user 770 interactions may be collected and used to provide real-time resolution of the identity of an entity at a particular point in time. Those of skill in the art will recognize that many such examples of user/device 730, user/network 742, user/resource 748, and user/user 770 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically convey a document to a second user, which is captured by a video surveillance system. In this example, the physical conveyance of the document from the first user to the second user is the action. Likewise, the video record of the conveyance makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 754, a system 756, a shared device 758, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 756 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 736. In certain embodiments, the endpoint device 304 may be configured to receive such location data 736, which is used as a data source for determining the user's location 618. In certain embodiments, the location data 736 may include Global Positioning System (GPS) data provided by a GPS satellite 738. In certain embodiments, the location data 736 may include location data 736 provided by a wireless network, such as from a cellular network tower 740. In certain embodiments (not shown), the location data 736 may include various Internet Protocol (IP) or other network address information assigned to the endpoint 304 or edge 202 device. In certain embodiments (also not shown), the location data 736 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 752, physical security device 754, system 756, or shared device 758. As an example, the endpoint device 304 may be directly connected to an ingress/egress system, such as an electronic lock on a door or an access gate of a parking garage. As another example, the endpoint device 304 may be indirectly connected to a physical security device 754 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

In certain embodiments, various information associated with a user entity profile 602, likewise described in greater detail herein, may be used to perform the risk-adaptive protection operations. In certain embodiments, the user entity profile 602 may include user profile attributes 604, user behavior factors 610, user mindset factors 622, or a combination thereof. In these embodiments, the information associated with a user entity profile 602 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 764. In certain embodiments, the security analytics service 764 may be implemented in a cloud environment familiar to those of skill in the art. In various embodiments, the security analytics system 118 may use data stored in a repository of security analytics data 680, entity behavior catalog data 690, entity identifier data 670, and event data 672, or a combination thereof, in the performance of certain security analytics operations, described in greater detail herein. Those of skill in the art will recognize that many such embodiments are possible. Accordingly, the foregoing is not intended to limit the spirit, scope or intent of the invention.

Figure 8:
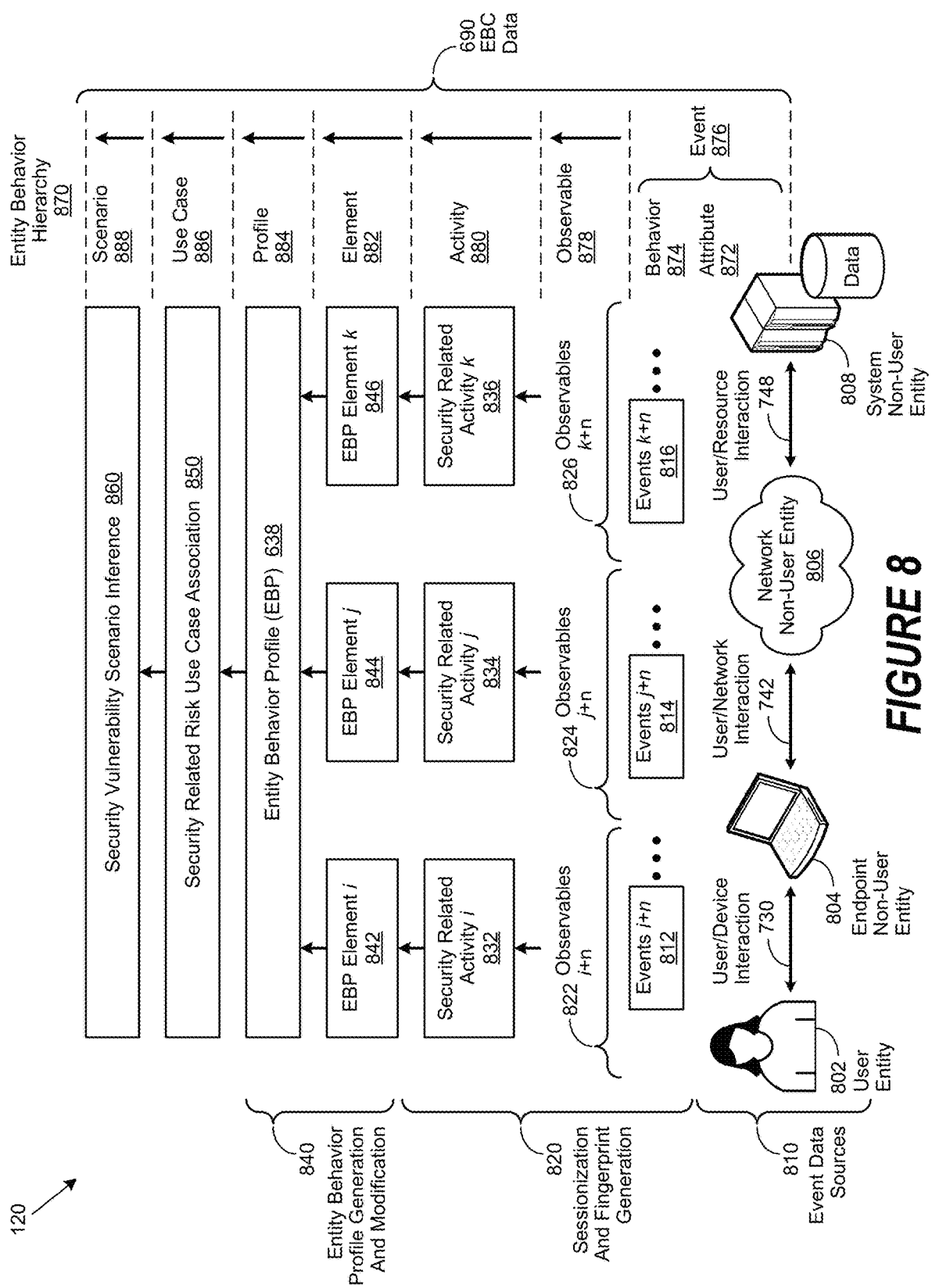
FIG. 8 is a simplified block diagram showing the mapping of an event to a security vulnerability scenario.

FIG. 8 is a simplified block diagram showing the mapping of an event to a security vulnerability scenario implemented in accordance with an embodiment of the invention. In certain embodiments, an entity behavior catalog (EBC) system 120 may be implemented to identify a security related activity, described in greater detail herein. In certain embodiments, the security related activity may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the event data sources 810 shown in FIGS. 8 and 14.

In certain embodiments, as likewise described in greater detail herein, the EBC system 120 may be implemented to identify a particular event of analytic utility by analyzing an associated security related activity. In certain embodiments, the EBC system 120 may be implemented to generate entity behavior catalog data based upon an identified event of analytic utility associated with a particular security related activity. In various embodiments, the EBC system 120 may be implemented to associate certain entity behavior data it may generate with a predetermined abstraction level, described in greater detail herein.

In various embodiments, the EBC system 120 may be implemented to use certain EBC data 690 and an associated abstraction level to generate a hierarchical set of entity behaviors 870, described in greater detail herein. In certain embodiments, the hierarchical set of entity behaviors 870 generated by the EBC system 120 may represent an associated security risk, likewise described in greater detail herein. Likewise, as described in greater detail herein, the EBC system 120 may be implemented in certain embodiments to store the hierarchical set of entity behaviors 870 and associated abstraction level information within a repository of EBC data 690. In certain embodiments, the repository of EBC data 690 may be implemented to provide an inventory of entity behaviors for use when performing a security operation, likewise described in greater detail herein.

Referring now to FIG. 8, the EBC system 120 may be implemented in various embodiments to receive certain event information, described in greater detail herein, corresponding to an event associated with an entity interaction. As used herein, event information broadly refers to any information directly or indirectly related to an event. As likewise used herein, an event broadly refers to the occurrence of at least one action performed by an entity. In certain embodiments, the at least one action performed by an entity may include the enactment of an entity behavior, described in greater detail herein. In certain embodiments, the entity behavior may include an entity's physical behavior, cyber behavior, or a combination thereof, as likewise described in greater detail herein.

Likewise, as used herein, an entity interaction broadly refers to an action influenced by another action enacted by an entity. In certain embodiments, an entity interaction includes when an event enacted by a first entity is correlated with an event enacted by another entity. As an example, a first user entity may perform an action, such as sending a text message to a second user entity, who in turn replies with a response. In this example, the second user entity's action of responding is influenced by the first user entity's action of sending the text message. In certain embodiments, an entity interaction may include the occurrence of at least one event enacted by one entity when interacting with another, as described in greater detail herein. In certain embodiments, an event associated with an entity interaction may include at least one entity attribute, described in greater detail herein, and at least one entity behavior, likewise described in greater detail herein.

In certain embodiments, an entity attribute and an entity behavior may be respectively abstracted to an entity attribute 872 and an entity behavior 874 abstraction level. In certain embodiments, an entity attribute 872 and an entity behavior 874 abstraction level may then be associated with an event 876 abstraction level. In certain embodiments, the entity attribute 872, entity behavior 874, and event 876 abstraction levels may in turn be associated with a corresponding entity behavior hierarchy 870, as described in greater detail herein.

In various embodiments, the event information may be received from certain event data sources 810, such as a user 802 entity, an endpoint 804 non-user entity, a network 806 non-user entity, or a system 808 non-user entity. In certain embodiments, one or more events may be associated with a particular entity interaction. As an example, as shown in FIG. 8, one or more events i+n 812 may be associated with a user/device 730 interaction between a user 802 entity and an endpoint 804 non-user entity. Likewise, one or more events j+n 814 may be associated with a user/network 742 interaction between a user 802 entity and a network 806 non-user entity. As likewise shown in FIG. 8, one or more events k+n 916 816 may be associated with a user/resource 748 interaction between a user 802 entity and a system 808 non-user entity.

In certain embodiments, details of an event, such as events i+n 812, j+n 814, and k+n 816, may be included in their associated event information. In various embodiments, as described in greater detail herein, analytic utility detection operations may be performed on such event information to identify events of analytic utility. In various embodiments, certain event information associated with an event determined to be of analytic utility may be used to derive a corresponding observable. As used herein, an observable broadly refers to an event of analytic utility whose associated event information may include entity behavior that may be anomalous, abnormal, unexpected, malicious, or some combination thereof, as described in greater detail herein.

As an example, the details contained in the event information respectively corresponding to events i+n 812, j+n 814, and k+n 816 may be used to derive observables i+n 822, j+n 824, and k+n 826. In certain embodiments, the resulting observables i+n 822, j+n 824, and k+n 826 may then be respectively associated with a corresponding observable 878 abstraction level. In certain embodiments, the observable 878 abstraction level may in turn be associated with a corresponding entity behavior hierarchy 870, as described in greater detail herein.

In certain embodiments, the resulting observables may in turn be processed to generate an associated security related activity. As used herein, a security related activity broadly refers to an abstracted description of an interaction between two entities, described in greater detail herein, which may represent anomalous, abnormal, unexpected, or malicious entity behavior. For example, observables i+n 822, j+n 824, and k+n 826 may in turn be processed to generate corresponding security related activities i 832, j 834, and k 836. In certain embodiments, the resulting security related activities, i 832, j 834, and k 836 may then be respectively associated with a corresponding security related activity 880 abstraction level. In certain embodiments, the security related activity 880 abstraction level may in turn be associated with a corresponding entity behavior hierarchy 870, as described in greater detail herein.

In various embodiments, sessionization and fingerprint generation operations 820, described in greater detail herein, may be performed to associate certain events, observables, and security related activities, or a combination thereof, with a corresponding session, likewise described in greater detail herein. As an example, events i+n 812, j+n 814, k+n 816, observables i+n 822, j+n 824, k+n 826, and security related activities i 832, j 834, k 836 may be associated with corresponding sessions. In certain embodiments, a security related activity may be processed with associated contextual information, described in greater detail herein, to generate a corresponding EBP element.

For example, security related activities i 832, j 834, and k 836 may be processed with associated contextual information to generate corresponding EBP elements i 842, j 844, and k 846. In various embodiments, the resulting EBP elements i 842, j 844, and k 846 may then be associated with a corresponding EBP element 882 abstraction level. In certain embodiments, the EBP element 882 abstraction level may in turn be associated with a corresponding entity behavior hierarchy 870, as described in greater detail herein.

In certain embodiments, EBP generation and modification 840 operations may be performed to associate one or more EBP elements with a particular EBP 638. As an example, EBP elements i 842, j 844, and k 946 may be associated with a particular EBP 638, which may likewise be respectively associated with the various entities involved in the user/device 730, user/network 742, or user/resource 748 interactions. In these embodiments, the method by which the resulting EBP elements i 842, j 844, and k 846 are associated with a particular EBP 638 is a matter of design choice. In certain embodiments, the EBP 638 may likewise associated with an EBP 884 abstraction level. In certain embodiments, the EBP 884 abstraction level may in turn be associated with a corresponding entity behavior hierarchy 870, as described in greater detail herein.

In various embodiments, the resulting EBP 638 may be used in the performance of security risk use case association 850 operations to identify one or more security risk use cases that match certain entity behavior information stored in the EBP 638. As used herein, a security risk use case broadly refers to a set of security related activities that create a security risk narrative that can be used to adaptively draw inferences, described in greater detail herein, from entity behavior enacted by a particular entity. In certain of these embodiments, the entity behavior information may be stored within the EBP 638 in the form of an EBP element, a security related activity, an observable, or an event, or a combination thereof. In certain embodiments, identified security risk use cases may then be associated with a security risk use case 886 abstraction level. In certain embodiments, the security risk use case 886 abstraction level may in turn be associated with a corresponding entity behavior hierarchy 870, as described in greater detail herein.

In certain embodiments, the results of the security risk use case association 850 operations may in turn be used to perform security vulnerability scenario inference 860 operations to associate one or more security risk use cases with one or more security vulnerability scenarios. As used herein, a security vulnerability scenario broadly refers to a grouping of one or more security risk use cases that represent a particular class of security vulnerability. In certain embodiments, the associated security vulnerability scenarios may then be associated with a security vulnerability scenario 888 abstraction level. In certain embodiments, the security vulnerability scenario 888 abstraction level may in turn be associated with a corresponding entity behavior hierarchy 870, as described in greater detail herein.

In various embodiments, certain event information associated with events i+n 812, j+n 814, and k+n 816 and certain observable information associated with observables i+n 822, j+n 824, and k+n 826 may be stored in a repository of EBC data 690. In various embodiments, certain security related activity information associated with security related activities i 832, j 834, and k 836 and EBP elements i 842, j 844, and k 846 may likewise be stored in the repository of EBC data 690. Likewise, in various embodiments, certain security risk use case association and security vulnerability scenario association information respectively associated with the performance of security risk use case association 850 and security vulnerability scenario inference 860 operations may be stored in the repository of EBC data 690.

Figure 9:
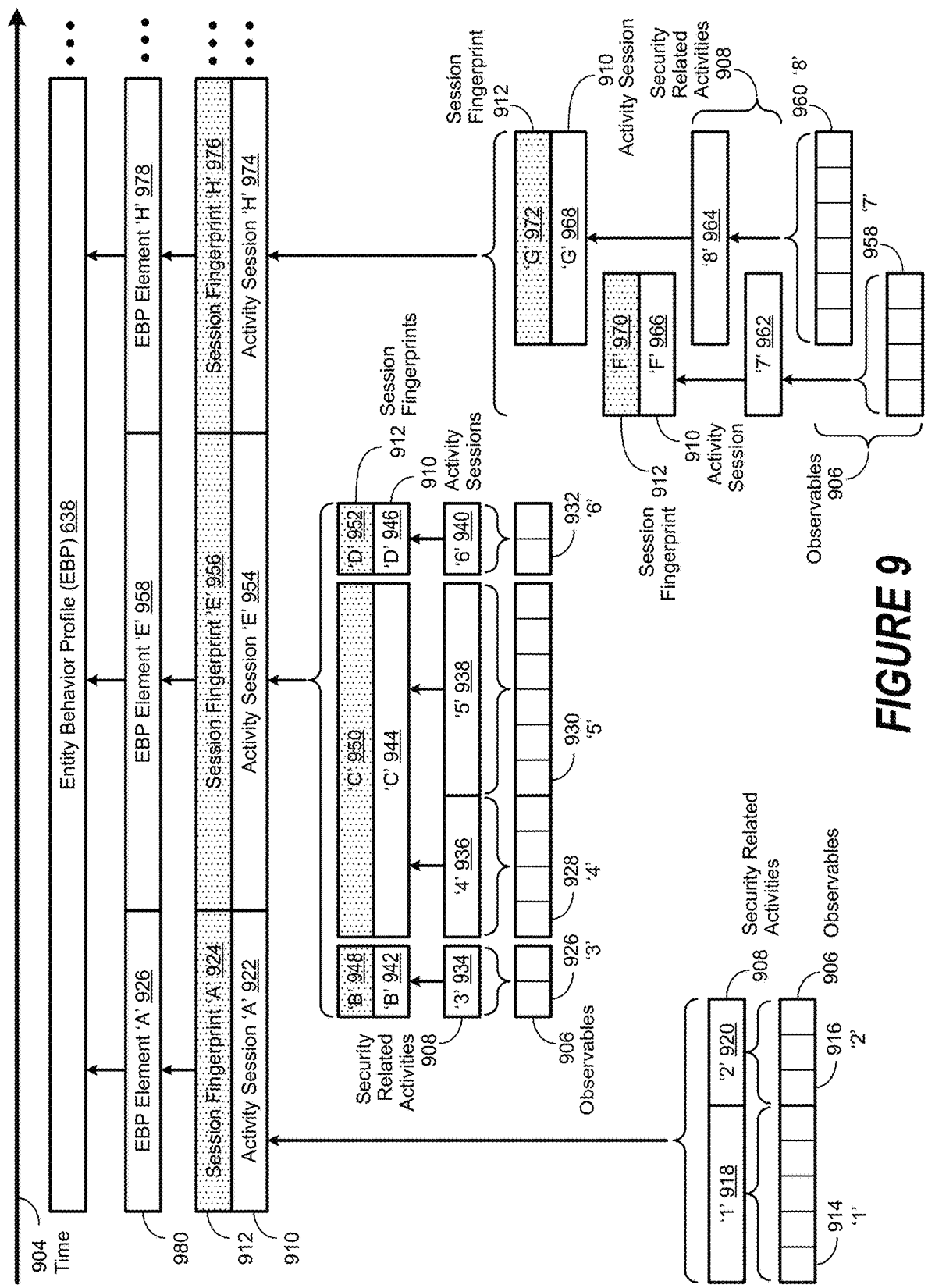
FIG. 9 is a simplified block diagram of the generation of a session and a corresponding session-based fingerprint.

FIG. 9 is a simplified block diagram of the generation of a session and a corresponding session-based fingerprint implemented in accordance with an embodiment of the invention. In certain embodiments, an observable 906 may be derived from an associated event, as described in greater detail herein. In certain embodiments, one or more observables 906 may be processed to generate a corresponding security related activity 908. In certain embodiments, one or more security related activities 908 may then be respectively processed to generate a corresponding activity session 910. In turn, the session 910 may be processed in certain embodiments to generate a corresponding session fingerprint 912. In certain embodiments, the resulting activity session 910 and its corresponding session fingerprint 912, individually or in combination, may then be associated with a particular entity behavior profile (EBP) element 980. In certain embodiments the EBP element 980 may in turn be associated with an EBP 638.

In certain embodiments, intervals in time 904 respectively associated with various security related activities 908 may be contiguous. For example, as shown in FIG. 9, the intervals in time 904 associated with observables 906 '1' 914 and '2' 916 may be contiguous. Accordingly, the intervals in time 904 associated with the security related activities 908 '1' 918 and '2' 920 respectively generated from observables 906 '1' 914 and '2' 916 would likewise be contiguous.

As likewise shown in FIG. 9, the resulting security related activities 908 '1' 918 and '2' 920 may be processed to generate an associated activity session 'A' 922, which then may be processed to generate a corresponding session fingerprint 'A' 924. In certain embodiments, activity session 'A' 922 and its corresponding session fingerprint 'A' 924 may be used to generate a new entity behavior profile (EBP) element 980 'A' 926. In certain embodiments, EBP element 980 'A' 926 generated from activity session 910 'A' 922 and its corresponding session fingerprint 912 'A' 924 may be associated with an existing EBP 638.

To provide an example, a user may enact various observables 906 '1' 914 to update sales forecast files, followed by the enactment of various observables 906 '2' 1016 to attach the updated sales forecast files to an email, which is then sent to various co-workers. In this example, the enactment of observables 906 '1' 914 and '2' 916 result in the generation of security related activities 908 '1' 918 and '2' 920, which in turn are used to generate activity session 910 'A' 922. In turn, the resulting activity session 910 'A' 922 is then used to generate its corresponding session-based fingerprint 912 'A' 924. To continue the example, activity session 910 'A' 922 is associated with security related activities 908 '1' 918 and '2' 920, whose associated intervals in time 904 are contiguous, as they are oriented to the updating and distribution of sales forecast files via email.

Various aspects of the invention reflect an appreciation that a user may enact certain entity behaviors on a recurring basis. To continue the preceding example, a user may typically update sales forecast files and distribute them to various co-workers every morning between 8:00 AM and 10:00 AM. Accordingly, the activity session 910 associated with such a recurring activity may result in a substantively similar session fingerprint 912 week-by-week. However, a session fingerprint 912 for the same session 910 may be substantively different should the user happen to send an email with an attached sales forecast file to a recipient outside of their organization. Consequently, a session fingerprint 912 that is inconsistent with session fingerprints 912 associated with past activity sessions 910 may indicate anomalous, abnormal, unexpected or malicious behavior.

In certain embodiments, two or more activity sessions 910 may be noncontiguous, but associated. In certain embodiments, an activity session 910 may be associated with two or more sessions 910. In certain embodiments, an activity session 910 may be a subset of another activity session 910. As an example, as shown in FIG. 9, the intervals in time 904 respectively associated with observables 906 '3' 914 and '6' 932 may be contiguous. Likewise, the intervals in time 904 associated with observables 906 '4' 936 and '5' 938 may be contiguous.

Accordingly, the intervals in time 904 associated with the security related activities 908 '4' 936 and '5' 938 respectively generated from observables 906 '4' 928 and '5' 930 would likewise be contiguous. However, the intervals in time 904 associated with security related activities 908 '4' 936 and '5' 938 would not be contiguous with the intervals in time respectively associated with security related activities 908 '3' 934 and '6' 940.

As likewise shown in FIG. 9, the resulting security related activities 908 '3' 934 and '6' 940 may be respectively processed to generate corresponding sessions 'B' 942 and 'D' 946, while security related activities 908 '4' 936 and '5' 938 may be processed to generate activity session 910 'C' 944. In turn, activity sessions 910 'B' 942, 'C' 944, and 'D' 946 are then respectively processed to generate corresponding session-based fingerprints 912 'B' 948, 'C' 950 and 'D' 952.

Accordingly, the intervals of time 904 respectively associated with activity sessions 910 'B' 942, 'C' 944, and 'D' 946, and their corresponding session fingerprints 912 'B'

948, 'C' 950 and 'D' 952, are not contiguous. Furthermore, in this example activity sessions 910 'B' 942, 'C' 944, and 'D' 946, and their corresponding session fingerprints 912 'B' 948, 'C' 950 and 'D' 952, are not associated with the EBP 638. Instead, as shown in FIG. 9, activity sessions 910 'B' 942, 'C' 944, and 'D' 946 are processed to generate activity session 910 'E' 954 and session fingerprints 912 'B' 948, 'C' 950 and 'D' 952 are processed to generate session fingerprint 912 'E' 956. In certain embodiments, activity session 'E' 954 and its corresponding session fingerprint 'E' 956 may be used to generate a new EBP element 980 'E' 958. In certain embodiments, EBP element 980 'E' 958 generated from activity session 910 'E' 954 and its corresponding session fingerprint 912 'E' 956 may be associated with an existing EBP 638.

Accordingly, session 910 'E' 1054 is associated with activity sessions 910 'B' 942, 'C' 944, and 'D' 946. Likewise, sessions 910 'B' 942, 'C' 944, and 'D' 946 are subsets of session 910 'E' 954. Consequently, while the intervals of time respectively associated with activity sessions 910 'B' 942, 'C' 944, and 'D' 946, and their corresponding session fingerprints 912 'B' 948, 'C' 950 and 'D' 952 may not be contiguous, they are associated as they are respectively used to generate session 910 'E' 954 and its corresponding session fingerprint 912 'E' 1056.

To provide an example, a user plans to attend a meeting scheduled for 10:00 AM at a secure facility owned by their organization to review a project plan with associates. However, the user wishes to arrive early to prepare for the meeting. Accordingly, they arrive at 9:00 AM and use their security badge to authenticate themselves and enter the facility. In this example, the enactment of observables 906 '3' 926 may correspond to authenticating themselves with their security badge and gaining access to the facility. As before, observables 906 '3' 926 may be used to generate a corresponding security related activity 908 '3' 934. In turn, the security related activity 908 '3' 934 may then be used to generate session 910 'B' 942, which is likewise used in turn to generate a corresponding session fingerprint 912 'B' 948.

The user then proceeds to a conference room reserved for the meeting scheduled for 10:00 AM and uses their time alone to prepare for the upcoming meeting. Then, at 10:00 AM, the scheduled meeting begins, followed by the user downloading the current version of the project plan, which is then discussed by the user and their associate for a half hour. At the end of the discussion, the user remains in the conference room and spends the next half hour making revisions to the project plan, after which it is uploaded to a datastore for access by others.

In this example, observables 906 '4' 928 may be associated with the user downloading and reviewing the project plan and observables 906 '5' 930 may be associated with the user making revisions to the project plan and then uploading the revised project plan to a datastore. Accordingly, behavior elements 906 '4' 928 and '5' 930 may be respectively used to generate security related activities 908 '4' 936 and '5' 938. In turn, the security related activities 908 '4' 936 and '5' 938 may then be used to generate session 910 'C' 944, which may likewise be used in turn to generate its corresponding session-based fingerprint 912 'C' 950.

To continue the example, the user may spend the next half hour discussing the revisions to the project plan with a co-worker. Thereafter, the user uses their security badge to exit the facility. In continuation of this example, observables 906 '6' 932 may be associated with the user using their security badge to leave the secure facility. Accordingly, observables 906 '6' 932 may be used to generate a corresponding security related activity 908 '6' 940, which in turn may be used to generate a corresponding session 910 'D' 946, which likewise may be used in turn to generate a corresponding session fingerprint 912 'D' 952.

In this example, the intervals of time 904 respectively associated with activity sessions 910 'B' 942, 'C' 944, and 'D' 946, and their corresponding session fingerprints 912 'B' 948, 'C' 950, and 'D' 952, are not contiguous. However they may be considered to be associated as their corresponding observables 906 '3' 926, '4' 928, '5' 930, and '6' 932 all have the common attribute of having been enacted within the secure facility. Furthermore, security related activities 908 '4' 936 and '5' 938 may be considered to be associated as their corresponding observables 906 have the common attribute of being associated with the project plan.

Accordingly, while the intervals of time 904 respectively associated with activity sessions 910 'B' 942, 'C' 944, and 'D' 946, and their corresponding session-based fingerprints 912 'B' 948, 'C' 950, and 'D' 952, may not be contiguous, they may be considered to be associated. Consequently, sessions 910 'B' 942, 'C' 944, and 'D' 946 may be considered to be a subset of session 910 'E' 954 and session-based fingerprints 912 'B' 948, 'C' 950, and 'D' 952 may be considered to be a subset of session-based fingerprint 912 'E' 956.

In certain embodiments, the interval of time 904 corresponding to a first activity session 910 may overlap an interval of time 904 corresponding to a second activity session 910. For example, observables 906 '7' 958 and '8' 960 may be respectively processed to generate security related activities 908 '7' 962 and '8' 964. In turn, the resulting security related activities 908 '7' 962 and '8' 964 are respectively processed to generate corresponding activity sessions 910 'F' 966 and 'G' 968. Sessions The resulting activity sessions 910 'F' 966 and 'G' 968 are then respectively processed to generate corresponding session-based fingerprints 912 'F' 970 and 'G' 972.

However, in this example activity sessions 910 'F' 966 and 'G' 968, and their corresponding session fingerprints 912 'F' 970 and 'G' 972, are not associated with the EBP 638. Instead, as shown in FIG. 9, activity sessions 910 'F' 966 and 'G' 968 are processed to generate activity session 910 'E' 954 and session fingerprints 912 'F' 970 and 'G' 972 are processed to generate session fingerprint 912 'H' 976. In certain embodiments, activity session 'H' 974 and its corresponding session fingerprint 'H' 976 may be used to generate a new EBP element 980 'H' 978. In certain embodiments, EBP element 980 'H' 978 generated from activity session 910 'E' 974 and its corresponding session fingerprint 912 'E' 976 may be associated with an existing EBP 638.

Accordingly, the time 904 interval associated with activity session 910 'F' 966 and its corresponding session fingerprint 912 'F' 970 overlaps with the time interval 904 associated with activity session 910 'G' 968 and its corresponding session fingerprint 912 'G' 972. As a result, activity sessions 910 'F' 966 and 'G' 968 are subsets of activity session 910 'H' 974. Consequently, while the intervals of time respectively associated with activity sessions 910 'F' 966 and 'G' 968, and their corresponding session fingerprints 912 'F' 970 and 'G' 972 may overlap, they are associated as they are respectively used to generate activity session 910 'H' 974 and its corresponding session fingerprint 912 'H' 976.

To provide an example, a user may decide to download various images for placement in an online publication. In this example, observables 906 '7' 958 may be associated with the user iteratively searching for, and downloading, the images they wish to use in the online publication. However, the user may not begin placing the images into the online publication until they have selected and downloaded the first few images they wish to use.

To continue the example, observables 906 '8' may be associated with the user placing the downloaded images in the online publication. Furthermore, the placement of the downloaded images into the online publication may begin a point in time 904 subsequent to when the user began to download the images. Moreover, the downloading of the images may end at a point in time 904 sooner than when the user completes the placement of the images in the online publication.

In continuance of the example, observables 906 '7' 958 and '8' 960 may be respectively processed to generate security related activities 908 '7' 962 and '8' 964, whose associated intervals of time 904 overlap one another. Accordingly, the intervals in time 904 associated with activity sessions 910 'F' 966 and 'G' 968 will likewise overlap one another as they are respectively generated from security related activities 908 '7' 962 and '8' 964.

Consequently, while the intervals of time 904 respectively associated with activity sessions 910 'F' 966 and 'G' 968, and their corresponding session fingerprints 912 'F' 970 and 'G' 972, may overlap, they may be considered to be associated as they both relate to the use of images for the online publication. Accordingly, activity sessions 910 'F' 1066 and 'G' 968 may be considered to be a subset of activity session 910 'H' 974 and session fingerprints 912 'F' 970 and 'G' 972 may be considered to be a subset of session fingerprint 912 'H' 976.

Figure 10:
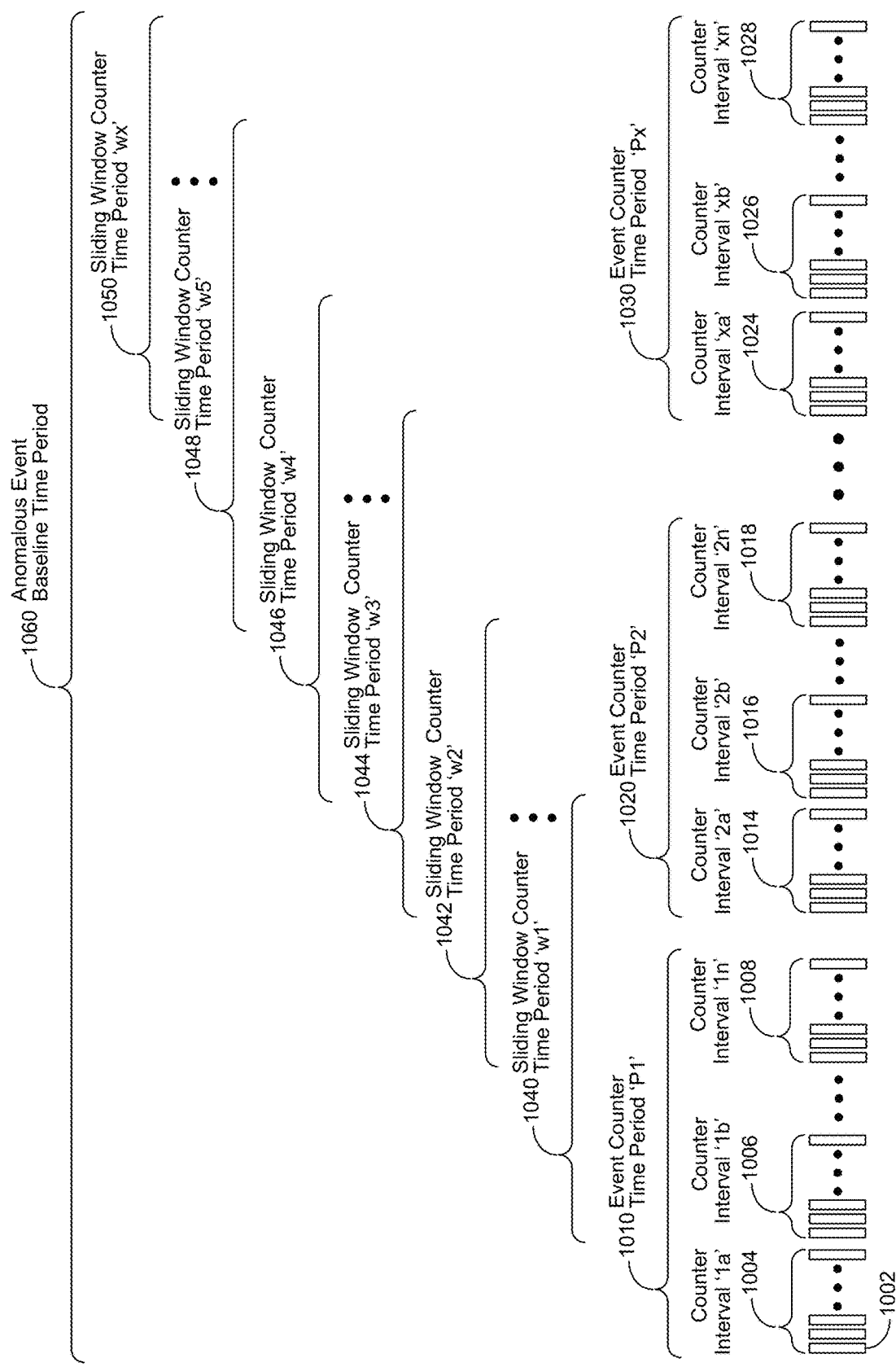
FIG. 10 is a simplified block diagram showing a plurality of event counter time periods used to detect an anomalous event.

FIG. 10 is a simplified block diagram showing a plurality of event counter time periods used in accordance with an embodiment of the invention to detect an anomalous event. As used herein, an event counter broadly refers to a numeric representation of the number of occurrences of a particular event, or class of endpoint events. Likewise, as used herein, an event counter time period broadly refers to a period of time during which an event counter counts, or otherwise tracks, the occurrence of a particular event, or class of events. As likewise used herein, an anomalous event broadly refers to any event whose occurrence may be out of the ordinary, unanticipated or otherwise unexpected.

In various embodiments, certain anomalous event detection operations, described in greater detail herein, may be performed during an anomalous event baseline time period 1060 to detect an anomalous event. As used herein, an anomalous event baseline time period 1060 broadly refers to a period of time during which anomalous event detection operations are performed. In these embodiments, the duration of the anomalous event baseline time period 1060 is a matter of design choice. As an example, the anomalous event baseline time period 1060 may be a sliding window implemented for a predetermined period of time to identify and omit false positives of anomalous behavior by an associated entity. In certain embodiments, the predetermined period of time is a matter of design choice. As an example, it may be one or more hours, one or more days, one or more weeks, one or more months, and so forth.

In certain embodiments, an anomalous event baseline time period 1060 may be associated with one or more event counter time periods. In certain embodiments, an event counter time period may be implemented to be a period of time that is less than, or equal to, an associated anomalous event baseline time period 1060. In certain embodiments, two or more event counter periods associated with a particular anomalous event baseline time period 1060 may be implemented to have the same duration of time (e.g., 24 hours, one week, and so forth).

In various embodiments, a certain sequence of event counter time periods may be selected for association with a particular anomalous event baseline time period 1060. In certain embodiments, the sequence of event counter time periods may be consecutive, or contiguous, or a combination thereof. In these embodiments, the event counter time periods selected to be associated with a particular anomalous event baseline time period, and the duration of their corresponding periods of time, is a matter of design choice.

In certain embodiments, an event counter time period (e.g. 'P1' 1010 and 'P2' 1020 through 'Px' 1030) may be implemented to be respectively associated with one or more event counter intervals. In certain embodiments, an event counter interval may be implemented to be an interval of time that is less than, or equal to, an associated event counter time period. In certain embodiments, two or more event counter intervals associated with a particular event counter time period may be implemented to have the same duration of time (e.g., one minute, one hour, one day, and so forth.).

In various embodiments, a certain sequence of event counter intervals may be selected for association with a particular event counter time period. In certain embodiments, the sequence of event counter intervals may be consecutive, or contiguous, or a combination thereof. In these embodiments, the event counter intervals selected to be associated with a particular event counter time period, and the duration of their corresponding intervals of time, is a matter of design choice.

For example, as shown in FIG. 10, event counter time period 'P1' 1010 may be associated with event counter intervals '1a' 1004 and '1b' 1006 through '1n' 1008. Likewise, event counter time periods 'P2' 1020 through 'Px' 1030 may respectively be associated with event counter intervals '2a' 1014 and '2b' 1016 through '2n 1018, through intervals 'xa' 1024 and 'xb' 1026 through 'xn 1028. In this example, event counter time periods 'P1' 1010 and 'P2' 1020 through 'Px' 1030 may each have an associated time period of twenty four hours. Likewise, event counter intervals '1a' 1004 and '1b' 1006 through '1n' 1008, as well as intervals '2a' 1014 and '2b' 1016 through '2n 1018, through intervals 'xa' 1024 and 'xb' 1026 through 'xn 1028 may each have an associated time interval of one hour.

To continue the example, event counter intervals '1a' 1004, and '1b' 1006 through '1n' 1008, where 'n'=24, may correlate to hours one through twenty four of a corresponding twenty four hour time period. Likewise, event counter intervals '2a' 1014, and '2b' 1016 through '2n' 1018, through 'xa' 1024, and 'sb' 1026 through 'xn' 1028, where 'n'=24, may respectively correlate to hours one through twenty four of corresponding twenty four hour time periods. Accordingly, the time period associated with event counter time periods 'P1' 1010, and 'P2' 1020 through 'Px' 1030 would be 24 hours, or one day.

In certain embodiments, event counter time periods may be implemented as a sequence of event counter time periods. In certain embodiments, the sequence of event counter time periods may be consecutive, or contiguous, or a combination thereof. As an example, event counter time period 'P1' 1010 may be associated with a Monday of a particular week. Likewise counter time periods 'P2' 1020 through 'Px' 1030, where 'x'=7, may respectively associated with Tuesday through Sunday of the same week.

In certain embodiments, a counter interval may be implemented to be associated with one or more counter increments 1002 of time. As used herein, an event counter increment 1002 of time broadly refers to an increment of time that is less than, or equal to, an associated event counter interval. In certain embodiments, two or more event counter increments 1002 associated with a particular event counter interval may be implemented to have the same duration of time. As an example, an event counter increment 1002 of time may be one or more milliseconds, one or more seconds, one or more minutes, one or more hours, and so forth.

In various embodiments, a certain sequence of counter increments 1002 of time may be selected for association with a particular event counter interval. For example, as shown in FIG. 10, a first set of counter increments 1002 of time may be associated with event counter interval '1a' 1004, a second set with interval '1b' 1006, and so forth through interval '1n' 1008. In these embodiments, the sequence of counter increments 1002 of time selected to be associated with a particular event counter time interval, and the duration of their corresponding increments of time, is a matter of design choice. In certain embodiments, the sequence of counter increments 1002 of time may be consecutive, or contiguous, or a combination thereof.

As an example, sixty consecutive counter increments 1002 of time, each with a duration of one minute, may be selected to be associated with counter interval '1a' 1004. Accordingly, the duration of event counter interval '1a' 1004 would be sixty minutes, or one hour. In this example, the same number of consecutive counter increments 1002 of time, each with the same duration of time, may be selected for counter intervals '1b' 1006 through '1n' 1008. Likewise the same number of consecutive counter increments 1002 of time, each with the same duration of time, may be selected for counter intervals '2a' 1014, and '2b' 1016 through '2n' 1018, through 'xa' 1024, and 'xb' 1026 through 'xn' 1028. Accordingly counter intervals '1a' 1004, and '1b' 1006 through '1n' 1008, '2a' 1014, and '2b' 1016 through '2n' 1018, through 'xa' 1024, and 'xb' 1026 through 'xn' 1028, would all have a duration of 60 minutes, or one hour.

Accordingly, in this example the anomalous event baseline time period 1060 may be implemented to be associated with a particular week corresponding to counter time periods 'P1' 1010, and 'P2' 1020 through 'Px' 1030. Likewise, the occurrence of individual events, or classes of events, respectively associated with event counter time periods 'P1' 1010, and 'P2' 1020 through 'Px' 1030 can be counted, or otherwise tracked, over the week corresponding to the anomalous event baseline time period 1060. Furthermore, the occurrence of a particular event, or class of events, can be counted, or otherwise tracked by its associated event counter time period, event counter interval, and event counter increment, or a combination thereof.

Certain embodiments of the invention reflect an appreciation that an event may span two or more event counter time periods. As an example, the enactment of an event may be initiated at the end of one event counter time period (e.g., 11:58 PM) and conclude at the beginning of a second (e.g., 12:02 AM). Certain embodiments of the invention likewise reflect an appreciation that the occurrence of such an event may be anomalous and its detection may be challenging due to it spanning two or more event counter time periods.

Accordingly, in certain embodiments an event counter may be implemented as a sliding window counter time period. As used herein, a sliding window counter time period broadly refers to a period of time during which an event counter counts, or otherwise tracks, a particular event, or class of events, that occur in an event counter interval associated with one of two or more discrete event counter time periods. In certain embodiments, a series of sliding window counter time periods may be implemented to incrementally span a plurality of event counter intervals respectively associated with two or more event counter time periods. In these embodiments, the event counter intervals selected to be associated with a particular sliding window counter time period is a matter of design choice.

For example, as shown in FIG. 10, sliding window counter time period 'w1' 1040 has been implemented to span event counter intervals '1b' 1006 through '2a 1014. As likewise shown in FIG. 10, sliding window counter time period 'w2' 1042 has been implemented to span event counter intervals prior to, and including, counter intervals '1n' 1008 and '2n' 1018. Likewise, as shown in FIG. 10, sliding window counter time period 'w3' 1044 has been implemented to iteratively span event counter intervals '2a' 1014, and so forth, up to counter interval 'xa' 1024.

Likewise, sliding window counter time period 'w4' 1046 has been implemented to iteratively span event counter intervals '2b' 1016, and so forth, up to event counter interval 'xb 1026. Sliding window counter time period 'w5' 1048 has likewise been implemented to span event counter intervals '2n' 1018, and so forth, up to event counter interval 'xn' 1028. Likewise, sliding window counter time period 'w6' 1050 has been implemented to span event counter intervals 'xa' 1024, and so forth, through event counter interval 'xn' 1028.

In certain embodiments, numeric and other data related to the occurrence of individual events, or classes of events, during a particular anomalous event baseline time period 1060 may be used in the performance of an anomalous event detection operation. As used herein, an anomalous detection operation broadly refers to any operation performed, as described in greater detail herein, to detect an anomalous event. In various embodiments, certain information corresponding to one or more entities associated with a particular event, or class of events, may likewise be used in the performance of an anomalous event detection operation. As an example, the amount of data conveyed between two or more entities during the occurrence of a particular event, or class of events, may be used to detect the occurrence of an anomalous event.

In certain embodiments, as described in greater detail herein, one or more event counters may be implemented on one or more devices, within an anomalous event detection system, or a combination thereof. In certain embodiments, event data collected by an event counter may be persisted in a repository of event data. In certain embodiments, as likewise described in greater detail herein, the event data collected by a particular event counter may be persistently stored in a repository of event data. In certain embodiments, the repository of event data may be centralized or distributed. In these embodiments, the method by which the event data is collected, the format in which it is stored, the location where it is stored, and the duration of time it is persisted is a matter of design choice.

Certain embodiments of the invention reflect an appreciation that event data collected by an event counter and temporarily stored in volatile memory, such as an endpoint device's RAM memory, may be lost if the endpoint device is rebooted. Certain embodiments of the invention likewise reflect an appreciation that losing such event data as a result of an endpoint device reboot, regardless of whether the reboot was intentional or not, may mask anomalous behavior enacted by an associated entity. Accordingly, in certain embodiments event data collected by a particular event counter may be stored to non-volatile memory, such as a hard drive or a memory card, as it is collected.

In various embodiments the notation of an event counter may be implemented to include certain properties or attributes associated with an event. In certain embodiments, such event properties or attributes may be represented in a JavaScript Object Notation (JSON) document, such as:

```
{
  "message_type": "counter",
  "counter_type": "raw_activites",
  "user_principal_name": or other form of user identification
    like user_email_address
    "full_computer_name": "LT-12345.websense.com",
    "data_channel": "email",
    "activity": "email_sent",
    "destination": "external_recipients", in some cases the
  destination is omitted
    "total_number_of_events": 12,
    "total_size_of_data_kb": 3254
    "period_type": "hour",
    "hour_in_the_day": 21,
    "day_in_the_month": 3,
    "month_in_the_year": 12,
    "day_in_the_year": 337,
    "period_start_time": "2019-12-03 21:00:00",
    "period_end_time": "2019-12-03 22:00:00",
    "reporting_product": "endpoint_protection_for_windows",
    "period_end_time": "20.05"
}
```

In certain embodiments, notation of an event counter may be implemented in an abbreviated, or abstracted, format, such as:

DD.hh data_channel/activity/destination <occurrences> <size_kb>

As an example, notation of an event counter implemented to track emails sent to external recipients may be abbreviated, or abstracted as follows:

03.21, email/email_sent/external_recipients, 12, 3254

As another example, notation of event counters implemented to track more than one class of events associated with an endpoint device's local hard drive may be abbreviated, or abstracted as follows:

03.21, local_hard_drive/data_copied_from_removable_storage, 13, 4342
03.21, local_hard_drive/data_copied_from_network_share 612, 643254

In this example, a data_copied_from_removable_storage event notation may indicate a potential security-related activity, described in greater detail herein, such as possible infection by virus files. Likewise, the data_copied_from_network_share event notation may indicate a data stockpiling security-related activity.

As yet another example, notation of event counters implemented to track events associated with conveying data to certain cloud or web applications may be abbreviated, or abstracted, as follows:

| | | | |
|---|---|---|---|
| 03.21 web/data_transmission/mail.google.com | 3, | 5242 |
| 03.21 web/data_transmission/drive.google.co.il | 12, | 3254 |
| 03.21 web/data_transmission/dropbox.com | 7, | 1274 |
| 03.21 web/data_transmission/web.whatsapp.com | 2, | 345 |

Various embodiments of the invention reflect an appreciation that implementing an event counter for tracking web-oriented events may involve certain considerations that may not be applicable for certain other event counters or associated data channels. As used herein, a data channel broadly refers to a method of transmitting or receiving data to or from an endpoint device. Examples of data channels include networks, network shares, an endpoint device's local storage, and removable storage. In certain embodiments, a data channel may refer to a destination, rather than a method of transmitting or receiving data.

As an example, a web data channel may have hundreds of destinations per user, and thousands for an organization. In this example, individual web site event counters are not necessary for anomalous event detection as such anomalies are typically based upon categories, or classes, of URLs. Accordingly, web-oriented event counters may be implemented in various embodiments to track endpoint device interactions with certain URL categories, or classes, such as gambling sites, social networks, private email services, shopping sites, private cloud repositories, business cloud repositories, job search sites, and so forth.

Various embodiments of the invention reflect an appreciation that there are certain situations, such as providing support for shadow information technology (IT) use cases, or investigating a particular user, that may require tracking interactions with individual web sites or URLs. Accordingly, event counters for individual web sites or URLs may be implemented in various embodiments, in addition to event counters tracking a particular endpoint device's interaction with certain classes of web sites or URLs.

In various embodiments, the event data collected by an event counter may be stored on a recurring (e.g., every hour), or near-real-time basis. In certain of these embodiments, the collected event data may be stored in the following event counter format:

data_channel/activity/destination

Examples of the implementation of such an event counter format include:

```
removable_storage/copy_file_to_removable_storage
local_hard_drive/copy_file_from_removable_storage_to_local_drive
local_hard_drive/copy_file_from_network_share_to_local_drive
printing/all_activities/all_destinations
printing/printing_file/local_printer
printing/printing_file/network_printer
printing/printing_file/file_printers
printing/printing_data/network_printer
printing/printing_data/local_printer
printing/printing_data/file_printer
web/data_upload/all_destinations
web/data_upload/mail.google.com
web/data_upload/drive.google.co.il
web/data_upload/dropbox.com
web/data_upload/web.whatsapp.com
web/data_uplod/category_shopping_web_sites
network_communication/outgoing_traffic/192.168.0.11
network_communication/incoming_traffic/192.168.0.11
```

In certain embodiments, individual event counters may be correlated to an entity hierarchy. As an example, an event counter may be implemented to track the number of files copied to removable storage on a daily basis for all users who are direct reports of Vitaly, an IT manager, and in turn, for all users who are direct reports of Asi, an IT director, and likewise in turn for all users who are direct reports of Ofir, a VP of IT. In various embodiments, the sums of certain event counters associated with decedents within an entity hierarchy. For example, the daily sums of event counters associated with tracking the number of files copied to removable media per day may be aggregated for Asi, where Asi is an individual user with eight direct reports. In this example, the nine event counters respectively associated with Asi and his eight direct reports are aggregated.

In certain embodiments, one or more event counters may be associated with a particular class of users. In various embodiments, such a class of users may belong to the same organizational hierarchy. In certain of these embodiments, the class of users may have the same job title, organizational responsibilities, or exhibit substantively similar entity behaviors, described in greater detail herein, or a combination thereof. In various embodiments, such a class of users may be individual users, or belong to different organizational hierarchies, or a combination thereof. In certain of these embodiments, such a class of users may be crowd-sourced.

In certain embodiments, data associated with one or more event counters respectively associated with individual members of a particular class of users may be averaged to generate a representative event counter. In certain embodiments, one or more such representative event counters may be implemented to establish an initial behavior model. In certain embodiments, the initial behavior model may be used to detect anomalous behavior associated with a new member of a particular class of user. In certain embodiments, such an initial behavior model may be implemented to detect anomalous behavior of a user without the necessity of observing the behavior of a new member of a particular class of users, or the use of a new endpoint device by a particular member of such a class of users, during a learning period, such as twenty to thirty days. Certain embodiments of the invention reflect an appreciation that detection of such "day zero" anomalous behavior may prove advantageous when no a priori knowledge of a particular user's behavior is available.

As an example, a software engineering group may have five software engineers, all of which have similar job responsibilities. In this example, each of the software engineers may have one or more associated event counters. To continue the example, data associated with certain event counters that are of the same type, or class, may be averaged to generate a representative event counter. In certain embodiments, one or more such representative event counters may be combined to generate an initial behavior model. To continue the example further, the initial behavior model may then be associated with a new software engineer when they join the group. Accordingly, certain behaviors associated with the new software engineer may be considered anomalous if it is not consistent with the initial behavior model. Skilled practitioners of the art will recognize that many such embodiments and examples are possible. Accordingly, the foregoing is not intended to limit the spirit, scope, or intent of the invention.

Figure 11:
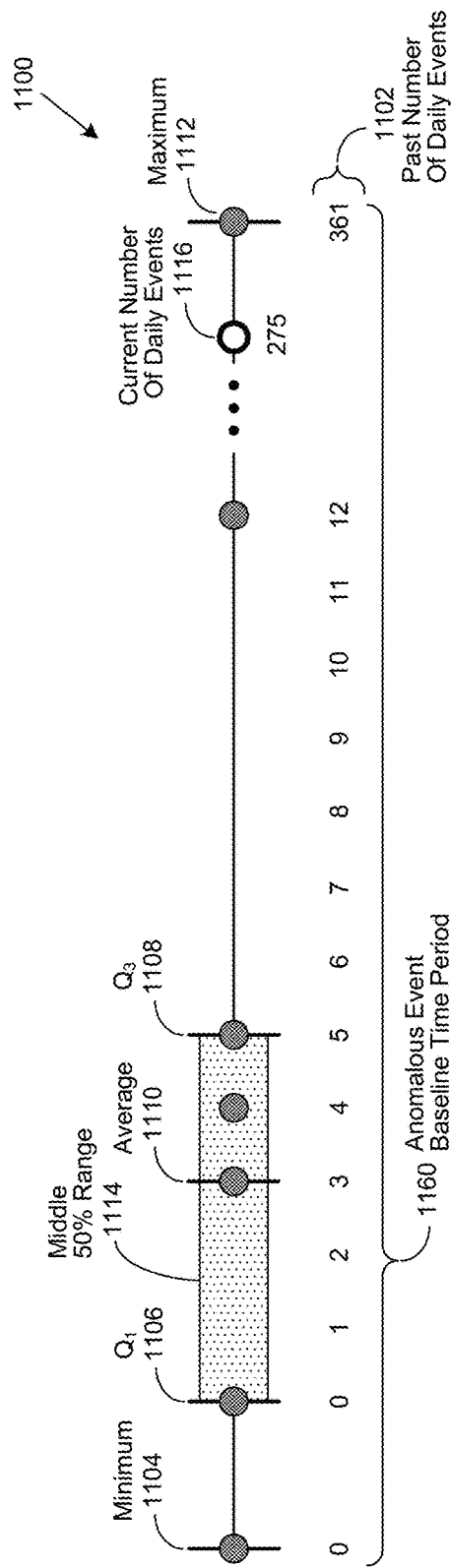
FIG. 11 shows a box and whisker plot used to detect an anomalous event.

FIG. 11 shows a box and whisker plot implemented in accordance with an embodiment of the invention to detect an anomalous event. Skilled practitioners of the art will be familiar with a box and whisker plot, also referred to as a box plot, which in the field of statistics is an approach for displaying a five-number statistical summary of an associated set of data. As typically displayed, the five-number statistical summary includes the dataset's minimum, its first quartile, its median, its third quartile, and its maximum. In certain embodiments, a set of event data collected during a particular time period by an event counter, as described in greater detail herein, may be processed to display an associated five-number statistical summary. In certain embodiments, the resulting five-number statistical summary may be used to detect an anomalous event, such as a suspicious number of files, or a suspicious total size of files, copied to removable storage on a daily basis.

For example, as shown in FIG. 11, an event counter may be implemented to count, or otherwise track, the number of files, and their aggregate size, copied from a particular endpoint device to removable storage each day during a particular ten day time period. In this example, each day in the ten day time period may be considered an individual event counter time period and the ten day time period may likewise be considered an anomalous event baseline time period 1160, as described in the descriptive text associated with FIG. 10. To continue the example, the number of files copied to removable storage each day during the anomalous event baseline time period may respectively be '3', '4', '0', '0', '5', '3', '12', '361', '3', and '0' for days one through ten, with a corresponding daily total file size of '4,007', '200', '0', '0', '125', '3,456', '541', '5,698', '20', and '0'.

To continue the example further, a numeric representation of the normal, or typical, number of files copied from the endpoint device to removable storage on a daily basis is determined by first removing outlier values in the set of event data. In this example, the first step in doing so is to reorder the number of files copied to removable storage from lowest to highest, as follows:

0 0 3 3 3 4 5 12 361

Once the event data set has been reordered, numbers whose numeric value do not fall in the 25% to 75% range of the data set, also referred to as the middle 50% range, are disregarded. Assuming 2n, or 2n+1, numbers in the reordered dataset of event data, then:

$Q_1$ represents the 25% point, which is the median of the n smallest numbers, and $Q_3$ represents the 75% point, which is the median of the n largest numbers Accordingly, Q1, the median of then smallest numbers (0 0 <u>0</u> 3 3)=0, and Q3, the median of then largest numbers (3 4 <u>5</u> 12 361)=5 likewise, the middle 50% range (0 0 <u>0 3 3 3 4 5</u> 12 361) is 0 3 3 3 4 5:

Next, the average of the middle 50% range of the reordered data set of event data is calculated as follows:

the average=(0+3+3+3+4+5)/6=18/6=3, and by using the formula known to those of skill in the art for determining a population standard deviation:

the standard deviation=1.67

Certain embodiments of the invention reflect an appreciation that the standard deviation identifies the dispersion, or spread, of the observations around the average of the middle 50% range of the reordered data set of event data. Accordingly, it can provide a reasonable indication of how well the average represents the normal, or typical, number of files copied to removable storage on a daily basis.

Referring now to the box and whiskers plot 1100 shown in FIG. 11, the numeric value of the minimum 1104 number of daily events 1102 during the anomalous event baseline time period 1160 is 0. Likewise, the maximum 1112 number of daily events 1102 during the same anomalous event baseline time period 1160 is 361. As likewise shown in FIG. 11, the middle 50% range 1114 of the reordered data set is defined by Q1 1106, which has a numeric value of 0, and Q3, which has a numeric value of 5. Accordingly, the average 1110 of the middle 50% range 1114 has a numeric value of 3.

In this example, the foregoing may be used as a baseline set of numbers to statistically detect anomalous events in subsequent event counter time periods, such as the current number of daily events 1116 shown in FIG. 11. In certain embodiments, the number of deviations of the number of events counted, or otherwise tracked, during a particular event counter period from the average of the middle 50% range 1114 may be used to detect an anomalous event.

To continue the preceding example, 275 files may have been copied to removable media in the current 24 hour event counter time period 1116. Accordingly:
number of files copied=275
middle 50% range average=3
standard deviation=1.67
files copied in current event counter time period=275
number of deviations=(275−3)/1.67=162

Accordingly, 162 deviations from the mean likely indicates the occurrence of an anomalous event in the current 24 hour event counter time period 1116. Certain embodiments of the invention reflect an appreciation that the number of such deviations from the average of the middle 50% range indicating the occurrence of an anomalous event is a matter of design choice. As an example, an observation of 15 files copied to removable storage during a particular 24 hour event counter time period, which is 7.2 deviations from the average (15−3)/1.67=7.2 may simply be considered a fluctuation in entity behavior.

Figure 12:
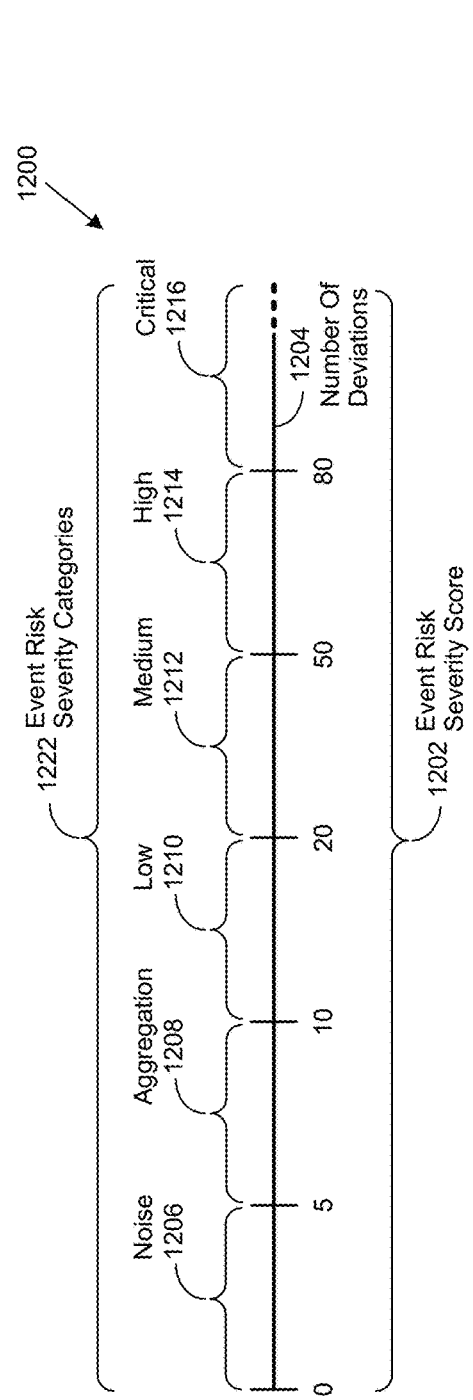
FIG. 12 shows an event risk severity scale used in the performance of security risk scoring operations.

FIG. 12 shows an event risk severity scale used in the performance of security risk scoring operations implemented in accordance with an embodiment of the invention. As used herein, a security risk scoring operation broadly refers to any operation associated with the generation of a risk score associated with the occurrence of a particular anomalous event. In various embodiments the risk score may be implemented as a risk severity score. In certain of these embodiments the risk severity score may be used to provide a quantitative indicator of the risk corresponding to the occurrence of a particular anomalous event at a particular point in time. In certain of these embodiments, the risk severity score may be used to provide a quantitative indicator of the security risk associated with a particular entity at a particular point in time.

Certain embodiments of the invention reflect an appreciation that it is likely that different organizations will have correspondingly different tolerances for risk. A risk level that is acceptable for one organization may not be acceptable for another, and vice-versa. Various embodiments of the invention likewise reflect an appreciation that the number of deviations of a particular event from the average of the middle 50% range of a particular anomalous event baseline time period may prove helpful in detecting the occurrence of an anomalous event. Accordingly, in certain embodiments, an event risk severity scale 1200 may be implemented to use the number of such deviations to indicate the risk severity of a particular event.

For example, as shown in FIG. 12, the event risk severity score 1202 of a particular event may be graphically correlated to the number of its deviations from the average of the middle 50% range of an associated anomalous event baseline time period. To continue the example, as likewise shown in FIG. 12, event risk severity categories 1222 of noise 1206, aggregation 1208, low 1210, medium 1212, high 1214, and critical 1216 may respectively correspond to 5, 10, 20, 50, and 80 deviations 1204. In these embodiments, the nomenclature used to describe the event risk severity score 1202 of a particular event risk severity category 1222, the number of such categories 1222, and the number of deviations 1204 associated with each, is a matter of design choice.

Figure 13:
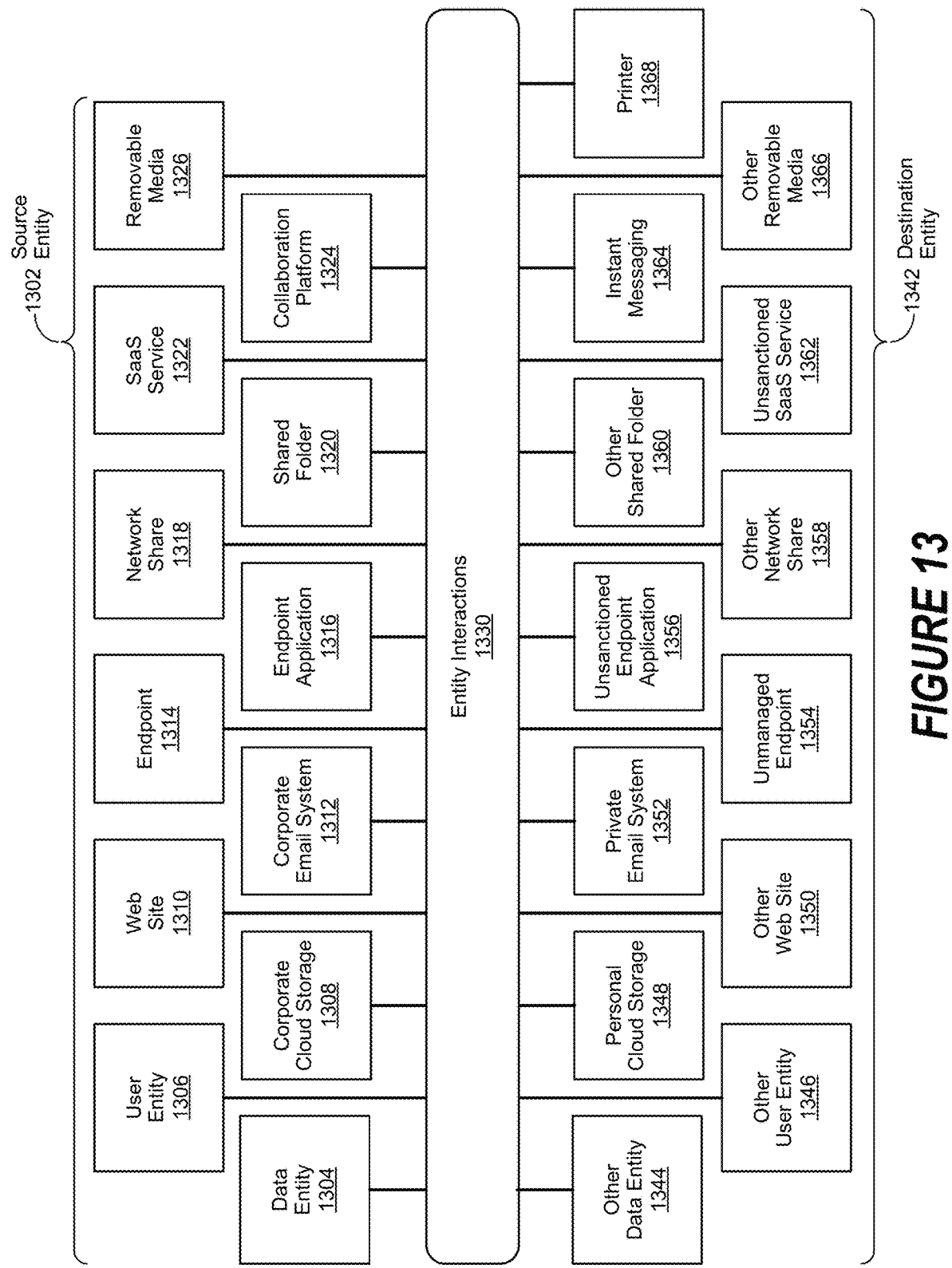
FIG. 13 shows a simplified block diagram of example source entities and destination entities associated with certain entity interactions.

FIG. 13 shows a simplified block diagram of example source entities and destination entities associated with certain entity interactions performed in accordance with an embodiment of the invention. In certain embodiments, an entity interaction may entail the occurrence of one or more events, as described in greater detail herein. In certain embodiments, the source 1302 entity and destination 1342 entity may be either a user entity, a non-user entity, or a data entity, as likewise described in greater detail herein.

For example, as shown in FIG. 13, the source 1302 entity may be a data entity 1304 or a user entity 1306. Likewise, the source 1302 entity may be a non-user entity such as corporate cloud storage 1308, a web site 1310, a corporate email system 1312, an endpoint 1314 device, an endpoint application 1316, a network share 1318, a shared folder 1320, a Software as a Service (SaaS) service 1322, a collaboration platform 1324, or removable media 1326. To continue the example, the destination 1342 entity may be another data entity 1344 or another user entity 1346. Likewise, the destination 1342 entity may be a non-user entity such as personal cloud storage 1348, another web site 1350, a private email system 1352, an unmanaged endpoint 1354, an unsanctioned endpoint application 1356, another network share 1358, another shared folder 1360, an unsanctioned SaaS service 1362, an instant messaging system 1364, another removable media 1366. or a printer 1368. Skilled practitioners of the art will recognize that many such examples of source 1302 and destination 1342 entities are possible. Accordingly, the foregoing is not intended to limit the spirit, scope, or intent of the invention.

FIGS. 14a through 14f show examples of entity interaction maps resulting from the performance of one or more security analytics mapping operations implemented in accordance with an embodiment of the invention. In certain embodiments, one or more security analytics mapping operations may be performed to generate an entity interaction map, such as those shown in FIGS. 14a through 14f. As used herein, an entity interaction map broadly refers to a representation of the concatenation of two or more correlated entity interactions, described in greater detail herein.

In certain embodiments, an entity interaction map may be implemented such that each of its associated entity interactions entail interaction with a common data entity, or a derivative thereof. In certain embodiments, an entity interaction map may be implemented such that each of its associated entity interactions include at least one user or non-entity entity associated with the previous user entity interaction of the entity interaction map. In certain embodiments, the representation of correlated entity interactions may be implemented as a data mapping structure. In certain embodiments, the data mapping structure may be implemented as a two-dimensional graph-like structure.

In certain embodiments, an entity interaction map may be implemented to provide a historical mapping of the conveyance of data from one entity to another over a predetermined period of time. In certain embodiments, the historical mapping may show the conveyance of data from a source entity to one or more intermediate entities before it is eventually conveyed to a destination entity. As used herein, conveyance of data broadly refers to the transfer of data, or a derivative thereof, from one entity to another. In certain embodiments, an entity interaction map may be implemented, as described in greater detail herein, to detect the occurrence of one or more anomalous events associated with the conveyance of data from one entity to another.

In certain embodiments, an entity interaction map may be implemented to establish a chain of data custody. As used herein, a chain of data custody broadly refers to a chronological record of the sequence of custody, control, and disposition of data, or a derivative thereof, as it is conveyed from one entity to another over time. As likewise used herein, data custody broadly refers to a state of possession of the data by a user or non-user entity, whether such a state of possession is direct or indirect. As an example, data may be directly stored in a non-user entity, such as a cloud storage facility or removable media, or indirectly stored in a non-user entity, such as the main memory of an endpoint device.

In certain embodiments, an entity interaction map may be implemented to track the conveyance of data from one entity to another as each conveyance occurs. In certain embodiments, an entity interaction map may be implemented to provide a historical mapping of the conveyance of data from one entity to another after such conveyances have occurred. In certain embodiments, data conveyed from a first entity to a second entity during an entity interaction may include associated information, described in greater detail herein, that uniquely identifies the data.

In certain embodiments, the information that uniquely identifies the data may be entity reference information, described in greater detail herein. In certain embodiments, data conveyed from a first entity to a second entity during an entity interaction may not be altered. In certain embodiments, data conveyed from a first entity to a second entity during an entity interaction may be altered by the first entity prior to it being conveyed to the second entity. In certain embodiments, data conveyed from a first entity to a second entity during an entity interaction may be altered by the second entity after it has been conveyed by the first entity.

In various embodiments, data conveyed from a first entity to a second entity during an entity interaction may not be conveyed in its entirety. Instead, only a predetermined portion of the data may be conveyed from the first entity to the second entity. In certain of these embodiments, the portion of data conveyed during an entity interaction may be implemented to include at least one data element of the data available to be conveyed from the first entity to a second entity. In various embodiments, two or more sets of data may be combined by a first entity prior to its conveyance to a second entity during an entity interaction. In certain of these embodiments, the two or more sets of data may individually be a complete set of data, or respectively a portion thereof.

In certain embodiments, data conveyed from a first entity to a second entity during an entity interaction may be renamed by the first entity prior to its conveyance to a second entity. In various embodiments, data received by a second entity from a first entity may be used as input data. In certain of these embodiments, the input data may be processed to generate output data. In certain embodiments, the resulting output data may not include any of the input data. In certain embodiments, the resulting output data may be named differently than the input data.

In various embodiments, certain identifying information associated with one or more data elements of the input data may be included in the output data, even if the resulting output data is named differently than the input data, contain none of the input data, or a combination thereof. Certain embodiments of the invention reflect an appreciation that the ability to include such identifying information in the output data is advantageous when tracking the source of data conveyed, directly or indirectly, from one entity to another, even if the original input data is not present in the output data.

In certain embodiments, the data provided by a first entity to a second entity during an entity interaction may be in the form of structured content, unstructured content, or a combination thereof. In certain embodiments, the data may be parsed to identify associated terms. In certain embodiments, the identified terms may be of analytical utility, described in greater detail herein.

As used herein, a term broadly refers to a word, compound word, phrase expression, numeric value, or alphanumeric string, which in certain contexts is associated with a particular meaning. As likewise used herein, a phrase broadly refers to a sequence of terms, or multi-words, familiar to skilled practitioners of the art. In certain embodiments, a term may be associated with an event, a feature of an event, a classification label, a metadata tag label, or a combination thereof.

As used herein, a feature, as it relates to an event, broadly refers to a property, characteristic, or attribute of a particular event. As an example, features associated with a text-oriented messages (e.g., SMS, email, social network messages, etc.) may be generated by removing low-value words (i.e., stopwords), using certain size blocks of words (i.e., n-grams), or applying various text processing rules. Examples of features associated with an event may include the number of bytes uploaded, the time of day, the presence of certain terms in unstructured content, the respective domains associated with senders and recipients of information, and the Uniform Resource Locator (URL) classification of certain web page visits.

In certain embodiments, such features may be used, individually or in combination, as identifying information associated with one or more data elements of input data. In certain embodiments, such features may likewise be associated with anomalous, abnormal, unexpected or malicious user behavior enacted by a particular entity, as described in greater detail herein. Likewise, such features may be used in certain embodiments to identify one or more entities involved in a particular entity interaction. In certain embodiments, such features may likewise be used, individually or in combination, to generate an entity interaction map, such as those shown in FIGS. 14*a* through 14*f*.

In certain embodiments, such entity information may include entity feature information, entity attribute information, or a combination thereof. As used herein, entity feature information broadly refers to information commonly used to perform analysis operations associated with entity models. As likewise used herein, entity attribute information broadly refers to structured information associated with a particular entity. In certain embodiments, entity attribute information may include one or more attribute types. An attribute type, as likewise used herein, broadly refers to a class of attributes, such as a Boolean attribute type, a double attribute type, a string attribute type, a date attribute type, and so forth.

As used herein, a Boolean attribute type broadly refers to a type of Boolean operator, familiar to those of skill in the art, associated with a particular event or associated entity. Known examples of such Boolean operator types include conjunction, disjunction, exclusive disjunction, implication, biconditional, negation, joint denial, and alternative denial. In certain embodiments, a Boolean event attribute type may be implemented to simplify data management operations. As an example, it may be more efficient to associate a biconditional Boolean event attribute having values of "true" and "false" to an event data field named "Privileges," rather than assigning the values "Privileged" and "Nonprivileged."

As used herein, a double attribute type broadly refers to a type of attribute that includes a numeric value associated with a particular entity or event. In certain embodiments, a double attribute type may be implemented for the performance of range searches for values, such as values between 10 and 25. In certain embodiments, a double attribute type may be implemented to configure numeric data field features, such as identifying unusually high or unusually low numeric values. In certain embodiments, a double attribute type may be implemented to create event models that aggregate by the max or sum of various event attribute values.

As used herein, a string attribute type broadly refers to a type of attribute that includes a string of characters associated with an entity or an event. In certain embodiments, a string attribute type may include text characters, numeric values, mathematical operators (e.g., '+', '*', etc.), or a combination thereof. As an example, a string attribute may for an entity data field named "Participants" may include the character string "2 hosts+3 assistants+37 attendees." In certain embodiments, a string attribute type may be implemented to search for partial matches of a particular value, such as a reference to a "java" file.

As used herein, a date attribute type broadly refers to a type of attribute that contains a natural date associated with an entity or an event. In certain embodiments, the representation or format of a particular date (e.g., Mar. 15, 2018, 3/15/2018, etc.), or time (e.g., 1:07 PM, 13:07:23, etc.) is a matter of design choice. In certain embodiments, a date attribute type may be implemented to perform searches for a particular date, a particular time, or a combination thereof. In certain embodiments, a date attribute type may be implemented to perform searches for a range of dates, a range of time, or a combination thereof.

In certain embodiments, the event information may include event content information, event timestamp information, event attachment information, event reference information, or a combination thereof. As used herein, event content information broadly refers to an unstructured body of text associated with a particular event. As an example, the main body of a communication, such as an email, a Short Message Service (SMS) text, a Chat communication, or a Twitter™ Tweet™ contains event content information.

In various embodiments, search operations may be performed on certain event content information to identify particular information. In certain embodiments, such search operations may include the use of lexicon features familiar to skilled practitioners of the art. In certain embodiments, extraction operations may be performed on the event content information to extract such identified information. In certain embodiments, the event content information may be processed to generate structured data. In certain embodiments, the event content information may be processed to generate an event summary, described in greater detail herein. In these embodiments, the method by which the event content information is processed, and the form of the resulting structured data or event summary is generated, is a matter of design choice.

As used herein, event timestamp information broadly refers to time and date information associated with the time and date a particular event occurred. Examples of such timestamp information include the time and date an email was sent, the time and date a user entity logged-in to a system, the time and date a user entity printed a file, and so forth. Other examples of such timestamp information include the time and date a particular Data Loss Prevention (DLP) alert was generated, as well as the time and date the DLP event occurred. Yet other examples of such timestamp information include the actual time and date of a particular event, and the publically-reported time and date of the occurrence of the event.

As used herein, event attachment information broadly refers to a separate body of content having an explicit association with a particular event. One example of such event attachment information includes a file. In certain embodiments, such a file may be an unstructured text file, a structured data file, an audio file, an image file, a video file, and so forth. Another example of such event attachment information includes a hypertext link, familiar to those of skill in the art, to a separate body of content. In certain embodiments, the linked body of content may include unstructured text, structured data, image content, audio content, video content, additional hypertext links, or a combination thereof.

In certain embodiments, event attachment information may be ingested and processed to identify associated entity and event information, as described in greater detail herein. In various embodiments, the event attachment information may be processed to determine certain metadata, such as the size of an attached file, the creator of the event attachment information, the time and date it was created, and so forth. In certain embodiments, search operations may be performed on the event attachment information to identify certain information associated with a particular event.

As used herein, event reference information broadly refers to information related to commonalities shared between two or more events. As an example, two events may have a parent/child, or chain, relationship, such as that represented by the entity interaction maps shown in FIGS. 14a through 14f. To further the example, the sending of a first email may result in the receipt of a second email. In turn, a third email may be sent from the receiver of the second email to a third party. In this example, the event reference information would include the routing information associated with the first, second and third emails, which form an email chain.

In certain embodiments, event information may be processed to generate an event summary. As used herein, an event summary broadly refers to a brief, unstructured body of text that summarizes certain information associated with a particular event. In certain embodiments, the event summary may be implemented to summarize information associated with an event. As an example, the subject line of an email may include such an event summary. In various embodiments, a group of event summaries may be searched during the performance of certain security analytics operations, described in greater detail herein, to identify associated event information.

In certain embodiments, natural language processing (NLP) and other approaches familiar to skilled practitioners of the art may be used to perform the parsing. As an example, event information associated with a particular training event may include an audio recording of human language being spoken. In this example, the event information may be processed to generate a digital transcript of the recording, which in turn may be parsed to identify certain words it may contain. As another example, the event information may include hand-written text. In this example, image recognition approaches familiar to those of skill in the art may be used to convert the hand-written content into a digital form, which in turn may be parsed to identify certain words it may contain.

As yet another example, the event information may include a segment of unstructured text. In this example, various NLP approaches may be used to process the unstructured text to extract certain words it may contain and then determine synonyms, antonyms, or associated concepts for those words. Skilled practitioners of the art will recognize that many such embodiments are possible. Accordingly, the foregoing is not intended to limit the spirit, scope, or intent of the invention.

For example, the entity interaction map 1402 shown in FIG. 14*a* depicts a source data file 1404 stored 1406 in cloud storage 1408. In this example, the source data file 1404 is first shared by 1410 the cloud storage 1408 to user '1' 1412, who in turn shares 1414 it with user '2' 1416. To continue the example, the data file 1402 is a data entity, the cloud storage 1406 is a non-user entity, and users '1' 1412 and '2' 1416 are both user entities.

To continue the example further, the event of the data file 1402 being stored 1404 in cloud storage 1406 is a first entity interaction of the entity interaction map 1402. Likewise, the event of the data file 1402 being shared 1410 by the cloud storage 1406 with user '1' 1412 is a second entity interaction of the entity interaction map 1402. To continue the example yet further, the event of user '1' 1412 sharing 1414 the data file 1402 with user entity '2' 1414 is a third entity interaction of the entity interaction map 1402.

As another example, the entity interaction map 1418 shown in FIG. 14*b* depicts a source data file 1420 stored 1422 in a network share 1424. In this example, the source data file 1420 is first downloaded 1426 by user '1' 1428, who then renames 1430 the source data file 1420 to a renamed data file 1432 prior to saving 1434 it to their user device 1436. To continue the example, the source data file 1420 and the renamed data file 1432 are both data entities, the network share 1424 and user '1' device 1436 are both non-user entities, and user '1' 1428 is a user entity.

To continue the example further, the event of the source data file 1420 being stored 1422 in the network share 1424 is a first entity interaction of the entity interaction map 1418. Likewise, the event of the source data file 1420 being downloaded 1426 by user '1' 1428 from the network share 1424 is a second entity interaction of the entity interaction map 1418. To continue the example yet further, the event of user '1' 1428 renaming 1430 the source data file 1420 to a renamed data file 1432 is a third entity interaction of the entity interaction map 1418. Likewise, the event of user '1' 1428 saving 1434 the renamed data file 1432 to their user device 1436 is a fourth entity interaction of the entity interaction map 1402.

As yet another example, the entity interaction map 1438 shown in FIG. 14*c* depicts a source data file 1440 stored 1442 in a device 1444 associated with user '1'. In this example, the source data file 1440 is first attached 1446 to an email 1448, which is then sent 1450 to user '2' 1452, who in turn saves 1454 it to an associated device 1456. To continue the example, the data file 1440 is a data entity, the email 1448 and the devices 1444, 1456 respectively associated with user '1' and '2' 1452 are non-user entity, and user '2' 1452 is a user entity.

To continue the example further, the event of the source data file 1440 being stored 1442 in the device 1444 associated with user '1' is a first entity interaction of the entity interaction map 1438. Likewise, the event of the source data file 1440 being attached 1446 to the email 1448 is a second entity interaction of the entity interaction map 1438. To continue the example yet further, the event of the email 1448 being sent 1450 to user '2' 1452 is a third entity interaction of the entity interaction map 1438. Likewise, the event of user '2' 1452 saving 1454 the email 1448 to their associated device 1456 is a fourth entity interaction of the entity interaction map 1438.

As yet still another example, the entity interaction map 1458 shown in FIG. 14*d* depicts a source data file 1460 stored 1462 in a device 1464 associated with user '1'. In this example, the source data file 1460 is uploaded 1466 to another entity 1468, which in turn saves 1470 the source data file to a renamed file 1472. To continue the example, the source data file 1462 and the renamed data file 1472 are both data entities, while the device 1464 associated with user '1' and the other entity 1468 are both non-user entities. Those of skill in the art will recognize that many examples of the other entity 1468 are possible, such as a cloud host, a network share, a website, a social media platform, other platforms such as those used for collaboration, other devices, and so forth.

To continue the example further, the event of the source data file 1460 being stored 1462 in a device 1464 associated with user '1' is a first entity interaction of the entity interaction map 1458. Likewise, the event of the source data file 1460 being uploaded 1466 to another entity 1468 is a second entity interaction of the entity interaction map 1458. To continue the example yet further, the event of the other entity 1468 saving 1470 the source data file 1460 as a renamed data file 1472 is a third entity interaction of the entity interaction map 1402.

To provide another example, the entity interaction map 1474 shown in FIG. 14*e* depicts a source data file 1476 stored 1478 in a device 1480 associated with user '1'. In this example, the source data file 1460 is accessed 1482 by a software application 1484. To continue the example, the source data file 1476 is a data entity, while the device 1480 associated with user '1' and the software application 1484 are both non-user entities. To continue the example further, the event of the source data file 1476 being stored 1478 in the device 1480 associated with user '1' is a first entity interaction of the entity interaction map 1474. Likewise, the event of the source data file 1476 being accessed 1482 by the software application 1484 is a second entity interaction of the entity interaction map 1474.

To provide yet another example, the entity interaction map 1486 shown in FIG. 14*f* depicts a source data file 1488 stored 1490 in a device 1492 associated with user '1'. In this example, the source data file 1488 is viewed 1482 by a software application 1496. To continue the example, the source data file 1488 is a data entity, while the device 1492 associated with user '1' and the software application 1496 are both non-user entities. To continue the example further, the event of the source data file 1488 being stored 1490 in the device 1492 associated with user '1' is a first entity interaction of the entity interaction map 1486. Likewise, the event of the source data file 1476 being viewed 1494 by the software application 1496 is a second entity interaction of the entity interaction map 1486. Skilled practitioners of the art will recognize that many such examples of an entity interaction map are possible. Accordingly, the foregoing is not intended to limit the spirit, scope, or intent of the invention.

Figure 15:
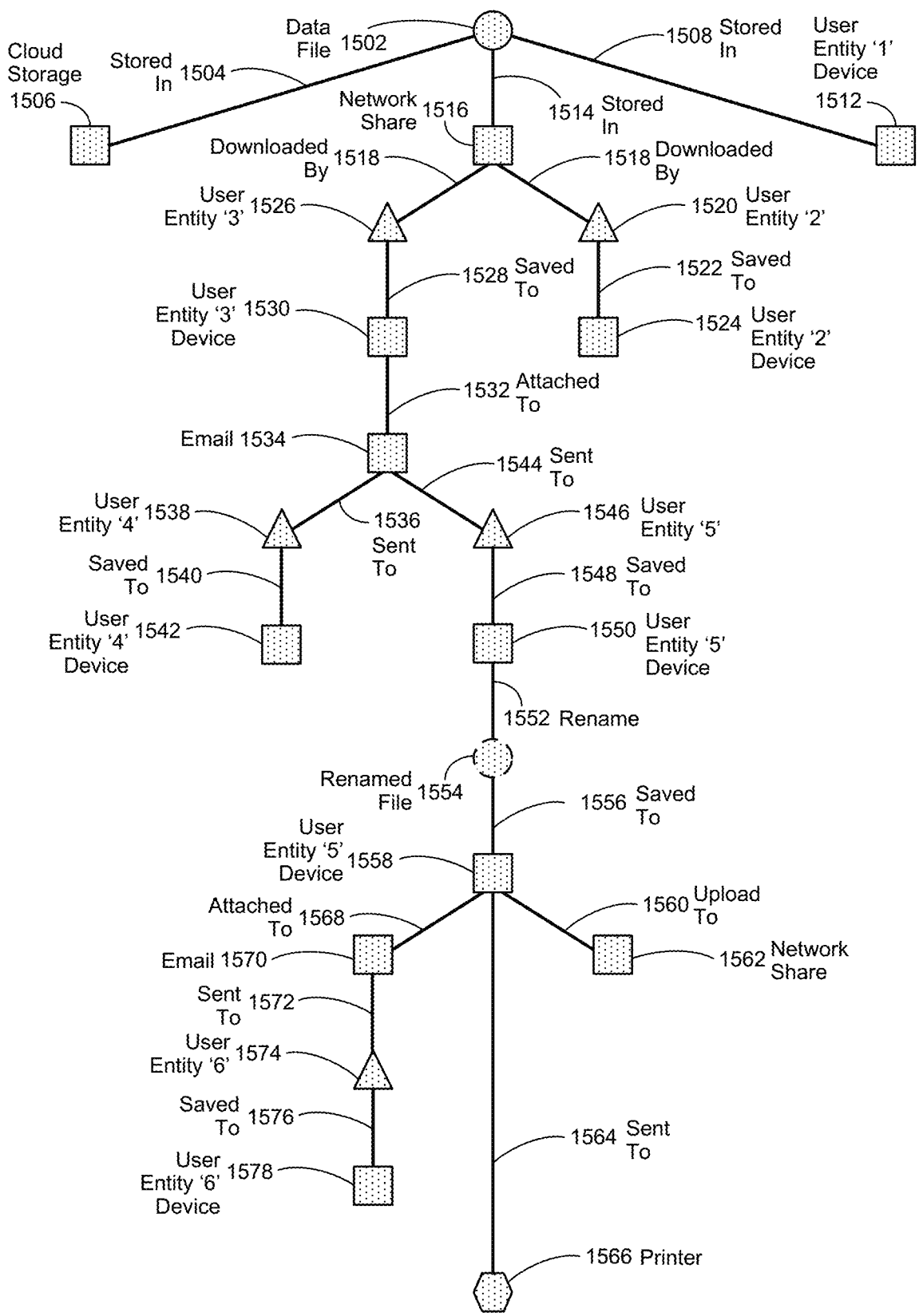
FIG. 15 shows a plurality of example entity interactions used to generate an associated entity interaction map.

FIG. 15 shows a plurality of example entity interactions implemented in accordance with an embodiment of the invention to generate an associated entity interaction map. As described in greater detail herein, two or more user interactions may be concatenated to generate an associated entity interaction map. In certain embodiments, an entity interaction map may be implemented to show individual user interactions that are not concatenated. For example, as shown in FIG. 15, a first entity interaction may be performed to store 1504 a source data file 1502 in cloud storage 1506. Likewise, a second entity interaction may be performed to store 1508 the same source data file 1502 in a device 1512 associated with user entity '1'. In this example, the first and second user interactions are shown as individual user interactions.

However, as likewise shown in FIG. 15, a third entity interaction may be performed to store 1514 the source data file 1502 in a network share 1516. Likewise, a fourth entity interaction may be performed by user entity '2' to download 1518 the source data file 1502 from the network share 1516. In turn, a fifth entity interaction may be performed by user entity '2' 1520 to save 1522 the source data file 1502 to an associated device 1524. In this example, the fifth entity interaction is concatenated to the fourth entity interaction, which in turn is concatenated to the third entity interaction.

To continue the example, a sixth entity interaction may be performed by user entity '3' 1526 to download 1518 the source data file 1502 from the network share 1516. Likewise, a seventh entity interaction may be performed by user entity '3' 1526 when the save 1528 the source data file 1502 to an associated device 1530. In turn, an eighth entity interaction may be performed when the user entity '3' 1526 attaches 1532 the source data file 1502 to an email. As likewise shown in FIG. 15, the eighth entity interaction is concatenated to the seventh entity interaction, which in turn is concatenated to the fourth entity interaction.

To continue the example further, a ninth entity interaction may be performed when the email 1534 is sent 1536 to user entity '4' 1538. Likewise, a tenth entity interaction may be performed when user entity '4' 1538 saves 1540 the source data file 1502 to an associated device 1542. As shown in FIG. 15, the tenth entity interaction is concatenated to the ninth entity interaction, which in turn is concatenated to the eighth entity interaction.

As likewise shown in FIG. 15, an eleventh entity interaction may be performed when the email 1534 is sent 1544 to user entity '5' 1546. Likewise, a twelfth entity interaction may be performed by user entity '5' 1546 when it saves 1548 the email 1534 to an associated device 1550. To further continue the example, a thirteenth entity interaction may be performed when user entity '5' 1546 renames 1552 the source data file 1502 attached to the email 1534, to generate a renamed data file 1554. Likewise, a fourteenth entity interaction may be performed to save 1556 the renamed data file 1554 a device 1558 associated with user entity '5' 1546. As shown in FIG. 15, the fourteenth entity interaction is concatenated to the thirteenth entity interaction, which is concatenated to the twelfth entity interaction, which in turn is concatenated to the eleventh entity interaction, which is likewise concatenated to the tenth entity interaction.

To continue the example further, a fifteenth entity interaction may be performed when the device 1558 associated with user entity '5' 1546 is used to upload 1560 the renamed data file 1554 to a network share 1562. Likewise, a sixteenth entity interaction may be performed when the same device 1558 is used to send 1564 the renamed data file 1554 to a printer 1566 so it can be printed. As likewise shown in FIG. 15, both the fifteenth and the sixteenth entity interaction is concatenated to the fourteenth entity interaction.

To continue the example even further, a seventeenth entity interaction may be performed when the device 1558 associated with user entity '5' 1546 is used to attach 1568 the renamed data file 1554 to an email 1570. Likewise, an eighteenth entity interaction may be performed when the resulting email 1570 is sent 1572 with its attached renamed data file 1554 to user entity '6' 1574. As before, a nineteenth entity interaction may be performed when user entity '6' 1574 saves 1576 the renamed data file 1554 attached 1568 to the email 1570 to an associated device 1578. As shown in FIG. 15, the nineteenth entity interaction is concatenated to the eighteenth entity interaction, which is concatenated to the seventeenth entity interaction, which in turn is concatenated to the fourteenth entity interaction. Certain embodiments of the invention reflect an appreciation that the concatenation of certain entity interactions to other entity interactions can provide an entity interaction map that depicts which user and non-user entities have interacted with a particular data entity, and in which sequence.

Figure 16:
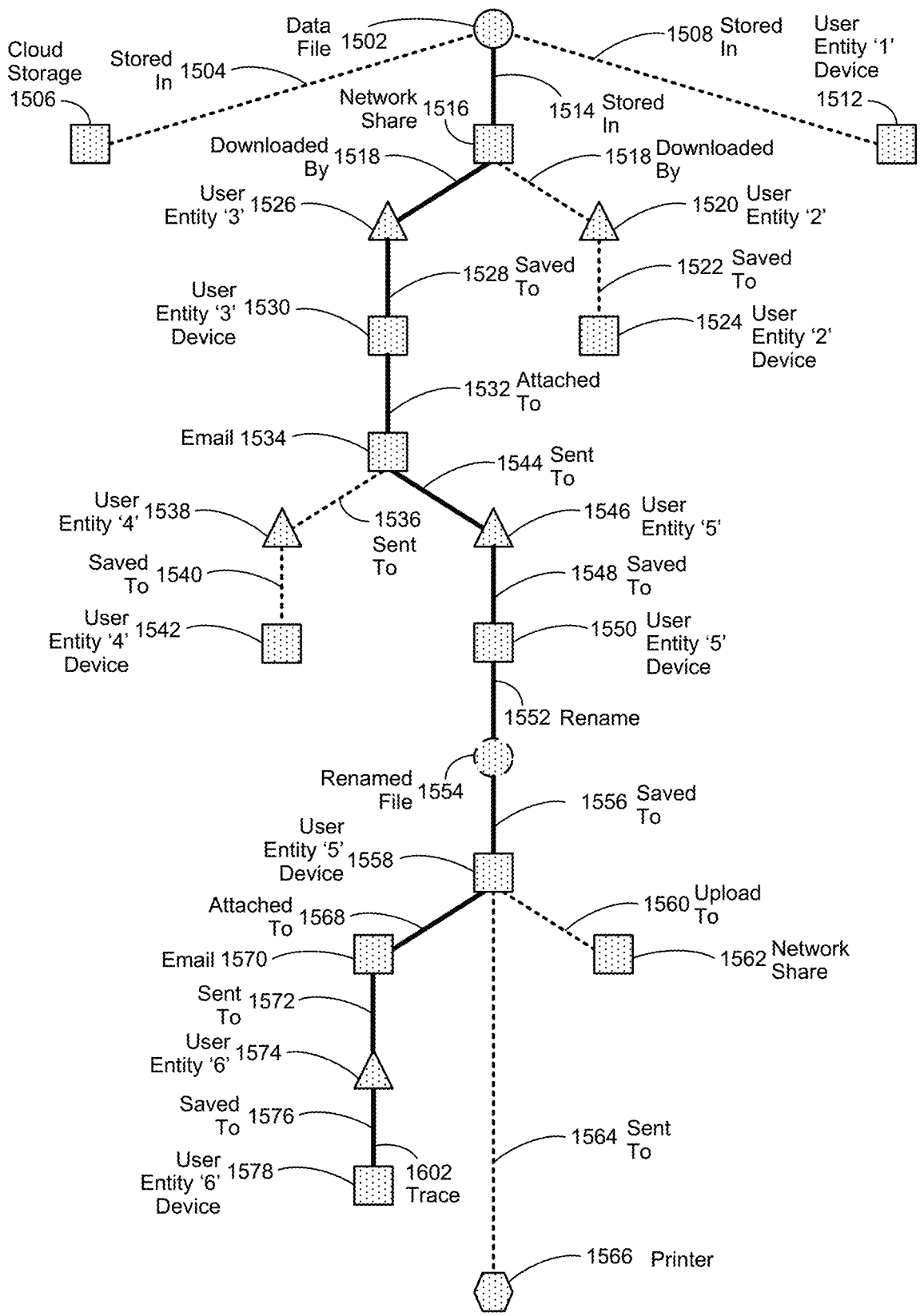
FIG. 16 shows an entity interaction map used to trace which entities have previously interacted with data associated with the occurrence of an anomalous event.

FIG. 16 shows an entity interaction map implemented in accordance with an embodiment of the invention to trace which entities have previously interacted with data associated with the occurrence of an anomalous event. In various embodiments, a security analytics mapping operation may be performed to generate an entity interaction trace 1602. In certain of these embodiments, the resulting entity interaction trace 1602 may be implemented to determine which user and non-user entities have previously interacted with a particular data entity, described in greater detail herein, associated with the occurrence of an anomalous event.

For example, as described in the descriptive text associated with FIG. 15, a nineteenth entity interaction may be performed when user entity '6' 1574 saves 1576 the renamed data file 1554 attached 1568 to the email 1570 to an associated device 1578. In this example, the saving 1576 of the renamed data file 1554 attached 1568 to the email 1570 to an associated device 1578 may be determined to be anomalous. Accordingly, one or more security analytics mapping operations may be performed to generate an entity interaction trace 1602 to determine which other user and non-user entities have previously interacted with the renamed data file 1554.

As shown in FIG. 16, the entity interaction trace 1602 resulting from performance of associated security analytics mapping operations shows that the nineteenth, eighteenth, seventeenth, fourteenth, thirteenth, twelfth, eleventh, eighth, seventh, sixth, and third entity interactions are sequentially concatenated to one another. Accordingly, the entity interaction trace 1602 shown in FIG. 16 shows that entities 1578, 1574, 1570, 1558, 1554, 1550, 1546, 1534, 1530, 1526, and 1516 have previously interacted with the source data file 1502 prior to the detection of it being associated with the detection of an anomalous event. Likewise, such interaction raises the possibility that those entities that previously interacted with the source data file 1502 may be directly or indirectly involved in the occurrence of the anomalous event.

Figures 17, 18:
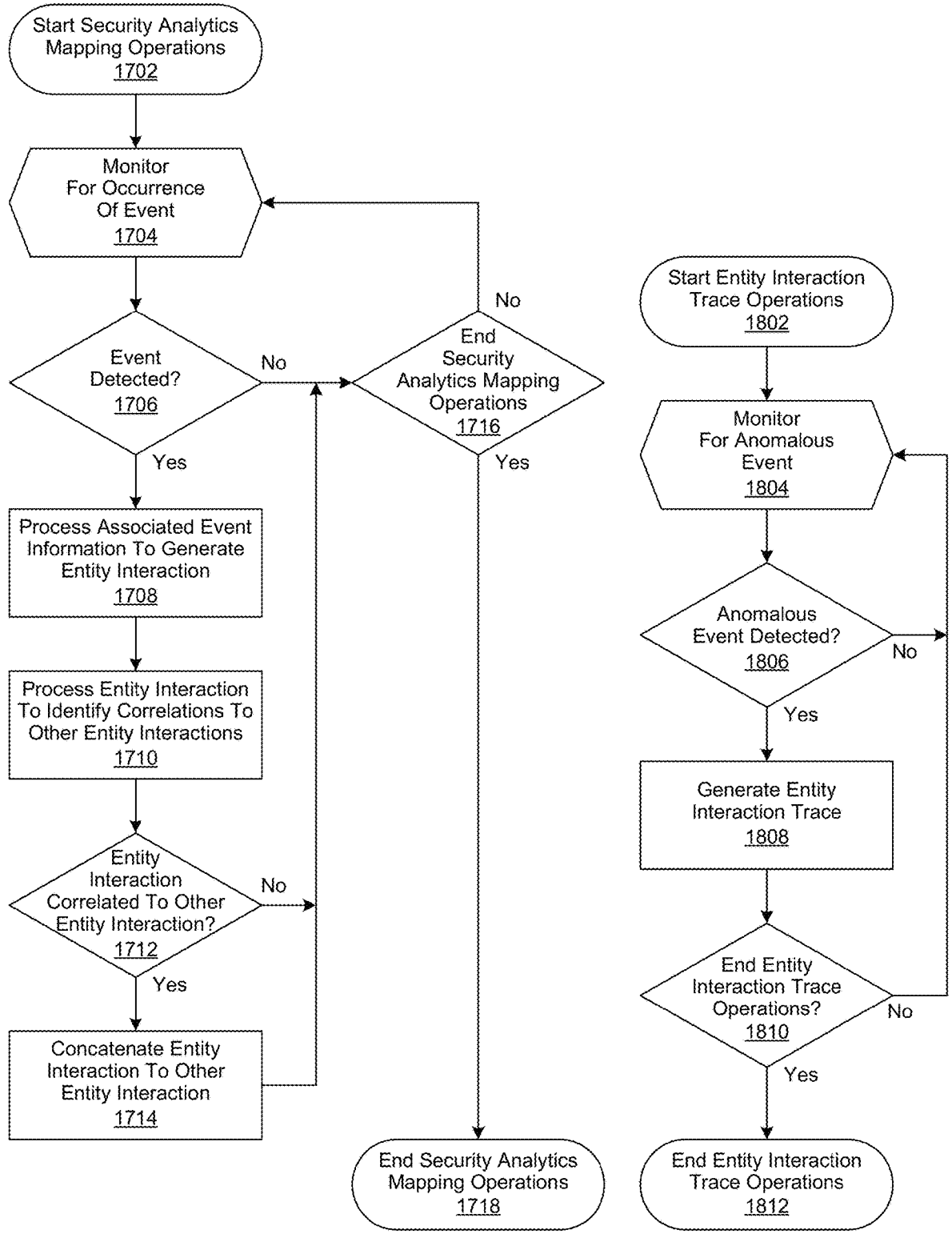
FIG. 17 is a flowchart showing the performance of security analytics mapping operations to generate an entity interaction map.
FIG. 18 is a flowchart showing the performance security analytics mapping operations to generate an entity interaction trace.

FIG. 17 is a flowchart showing the performance of security analytics mapping operations performed in accordance with an embodiment of the invention to generate an entity interaction map. In this embodiment, security analytics mapping operations are begun in step 1702, followed by monitoring operations being performed in step 1704 to detect the occurrence of an event. A determination is then made in step 1706 whether an event has been detected. If not, a determination is made in step 1716 whether to end security analytics mapping operations. If not, then the process is continued, proceeding with step 1704. Otherwise, security analytics mapping operations are ended in step 1718.

However, if it was determined in step 1706 that an event was detected, then event information associated with the detected event is processed in step 1708 to generate an associated entity interaction, described in greater detail herein. The resulting entity interaction and associated event information is then processed in step 1710 to identify its correlation to any other entity interaction. A determination is then made in step 1712 whether the newly-generated entity interaction correlates to any other entity interaction. If so, then the newly-generated entity interaction is concatenated to the identified entity interaction in step 1714 to generate a new entity interaction map, or further extend an existing one. Thereafter, or if it was determined in step 1712 that the resulting entity interaction does not correlate to any other entity interaction, then the process is continued, proceeding with step 1716.

FIG. 18 is a flowchart showing the performance security analytics mapping operations performed in accordance with an embodiment of the invention to generate an entity interaction trace. In this embodiment, entity interaction trace operations are begun in step 1802, followed by monitoring operations being performed in step 1804 to detect the occurrence of an anomalous event. A determination is then made in step 1806 whether an anomalous event has been detected. If not, then the process is continued, proceeding with step 1804.

Otherwise an entity interaction trace is generated in step 1808, as described in greater detail herein. A determination is then made in step 1810 whether to end entity interaction trace operations. If not, then the process is continued, proceeding with step 1804. Otherwise entity interaction trace operations are ended in step 1812.

Figure 19:
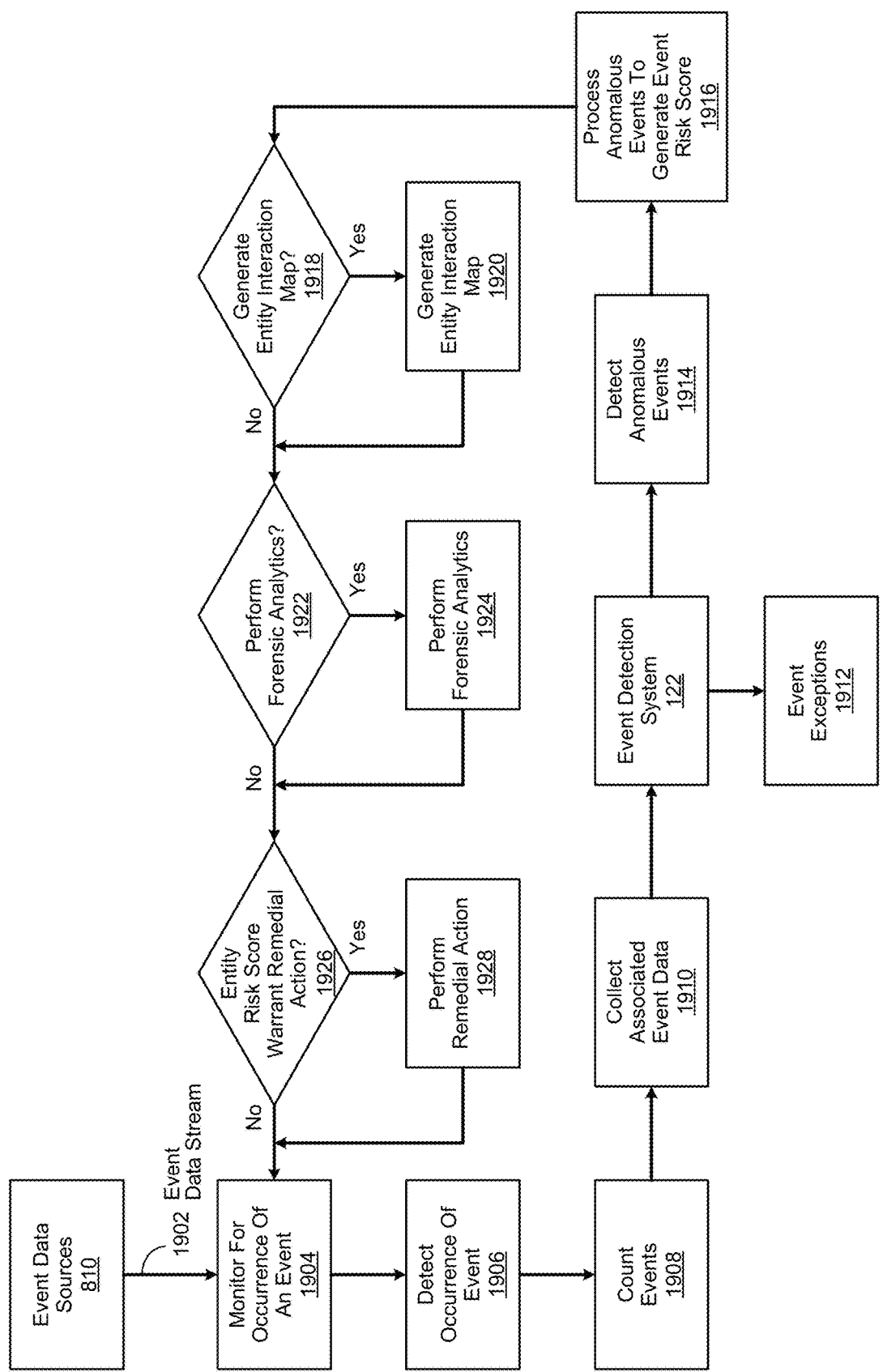
FIG. 19 shows a simplified process flow of the performance of security analytics mapping operations.

FIG. 19 shows a simplified process flow of the performance of security analytics mapping operations implemented in accordance with an embodiment of the invention. In certain embodiments, a stream of event data 1902 provided by one or more event data sources 810, described in greater detail herein, is monitored in step 1904 for the occurrence of a particular event. If an event is detected in step 1906, then it is counted, or otherwise tracked, in step 1908, followed by its associated data being collected in step 1910.

The data collected in step 1910 is then provided an anomalous event detection system 122 for processing. Once received, the event data collected in step 1910 is processed by the anomalous event detection system 122 to determine whether its associated event adheres to one or more security policies. If it does, then the event data collected in step 1910 is marked as an event exception in step 1912. However, if it does not, then the data collected in step 1910 is processed in step 1914 by the anomalous event detection system 122 to detect anomalous events of analytic utility, described in greater detail herein. If an anomalous event is detected in step 1914, then it is processed in step 1916 to generate a corresponding event risk severity score.

A determination is then made in step 1918 whether to process the previously collected event data to generate an entity interaction map. If so, then an entity interaction map is generated in step 1920, as described in greater detail herein. Thereafter, or if it was determined in step 1918 not to generate an entity interaction map, then a determination is made in step 1922 whether to perform forensic analytics related to the detection of an anomalous event. If so, then they are performed in step 1924. In certain embodiments, performance of the forensic analytics may involve analysis of one or more related entity interaction maps, one or more related individual interactions, or a combination thereof, as described in greater detail herein. In certain embodiments, performance of the forensic analytics may involve the generation of an entity interaction trace, likewise described in greater detail herein.

Once the forensic analytics are performed in step 1924, or if it was determined in step 1922 to not perform forensic analytics, then a determination is then made in step 1926 whether the entity risk severity score warrants the performance of a remedial action. If so, then it is performed in step 1928. Thereafter, or if it was determined in step 1926 that the entity risk severity score does not warrant performance of a remedial action, then the process is continued, proceeding with step 1904.

Figure 20A:
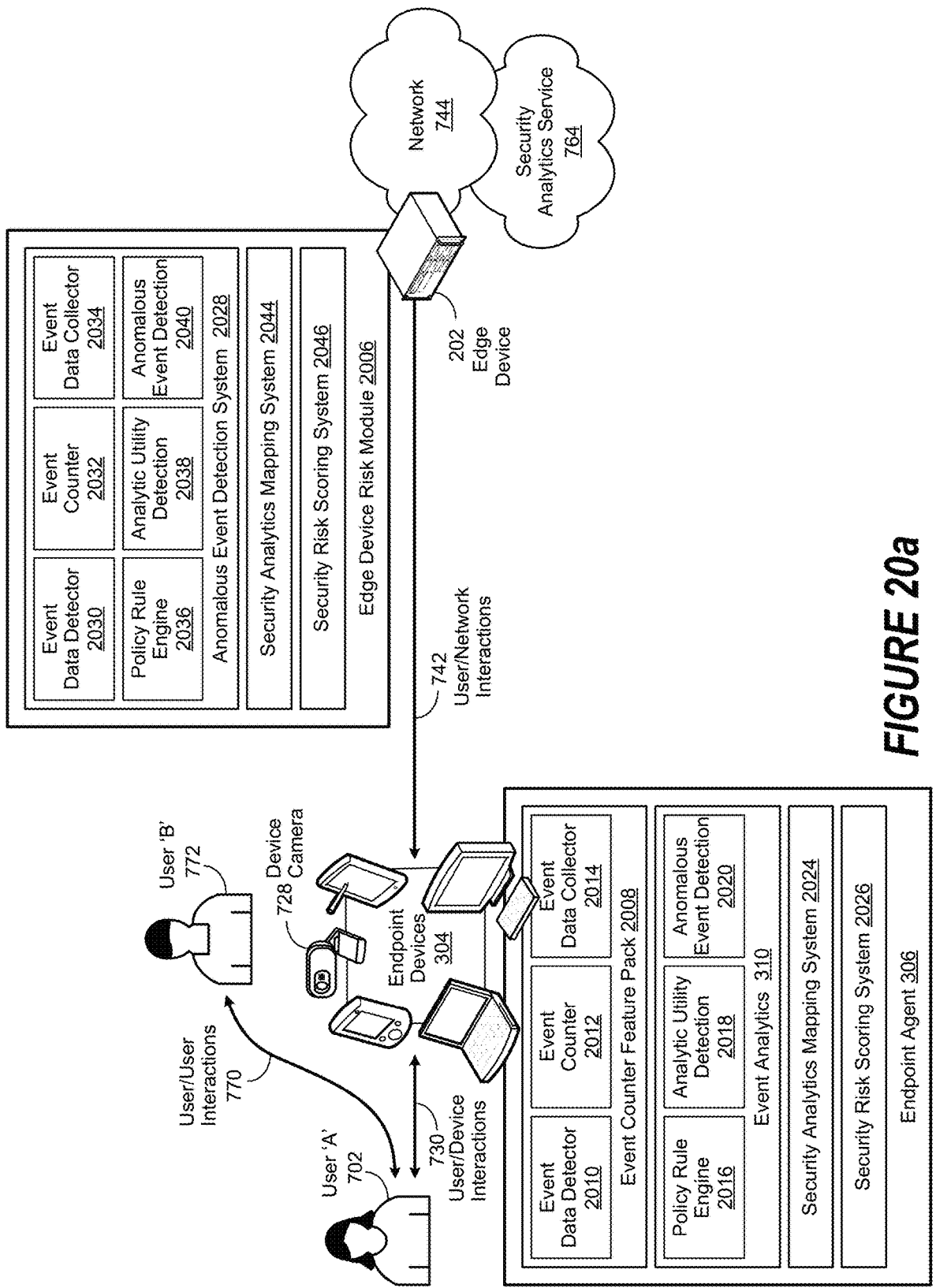
FIGS. 20a and 20b show a simplified block diagram of a distributed security analytics mapping system environment.
Figure 20B:
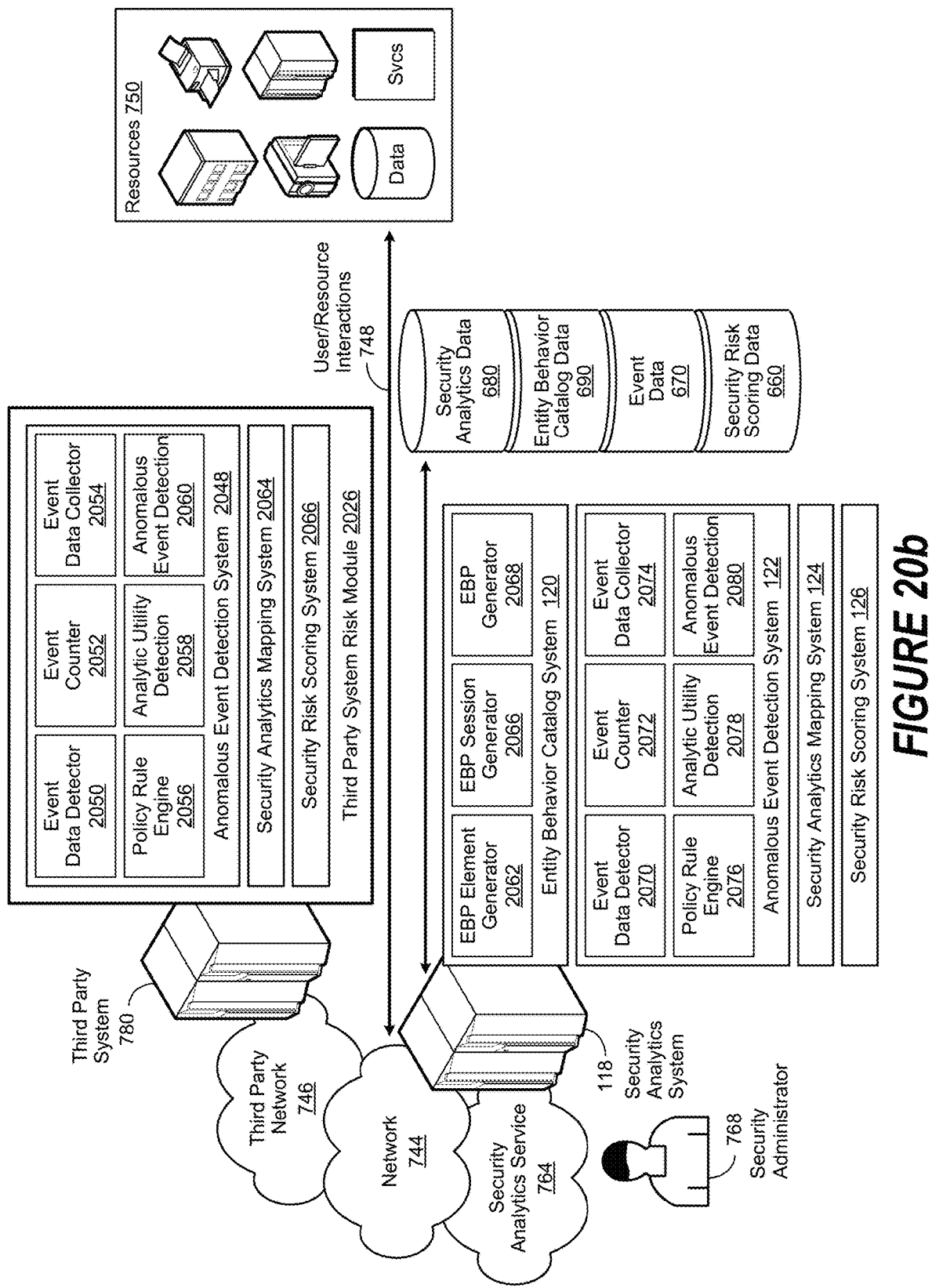

FIGS. 20*a* and 20*b* show a simplified block diagram of a distributed security analytics mapping system environment implemented in accordance with an embodiment of the invention. In certain embodiments, the distributed security analytics mapping system environment may be implemented to map the occurrence of associated events, as described in greater detail herein. In various embodiments, the distributed security analytics mapping system environment may be implemented to use certain event data to determine which events are associated with one another, as likewise described in greater detail herein. In certain embodiments, the distributed security analytics mapping system environment may be implemented to include a security analytics system 118, described in greater detail herein. In certain embodiments, the security analytics system 118 may be implemented to include an entity behavior catalog (EBC) system 120, an anomalous event detection system 122, and a security analytics mapping system 124, and a security risk scoring system 126, or a combination thereof.

In various embodiments, the security analytics mapping system 124 may be implemented to provide certain event mapping information to the security analytics system 118. In various embodiments, the security analytics system 118 may be implemented to use such event mapping information to perform certain analyses, described in greater detail herein. In various embodiments, certain analyses performed by the security analytics system 118 may be used to detect an anomalous event that may be of analytic utility, as described in greater detail herein. In certain embodiments, the anomalous event may be associated with one or more user or non-user entities, likewise described in greater detail herein.

In certain embodiments, as likewise described in greater detail herein, the EBC system 120, the anomalous event detection system 122, and the security analytics mapping system 124, or a combination thereof, may be used in combination with the security analytics system 118 to perform such analyses. In various embodiments, certain data stored in a repository of security analytics 680 data, a repository of EBC 690 data, a repository of event 670 data, or a repository of security risk scoring data 660, or a combination thereof, may be used by the security analytics system 118, the EBC system 120, the anomalous event detection system 122, or the security analytics mapping system 124, or some combination thereof, to perform the analyses.

In certain embodiments, the EBC system 120, as described in greater detail herein, may be implemented to use entity behavior information and associated event data, to generate an entity behavior profile (EBP), as described in greater detail herein. In various embodiments, the security analytics system 118 may be implemented to use one or more session-based fingerprints to perform security analytics operations to detect certain user or non-user entity behavior, as likewise described in greater detail herein. In certain embodiments, the security analytics system 118 may be implemented to monitor entity behavior associated with a user entity, such as a user 'A' 702 or user 'B' 772. In certain embodiments, the user or non-user entity behavior may be monitored during user/device 730, user/network 742, user/resource 748, and user/user 770 interactions. In certain embodiments, the user/user 770 interactions may occur between a first user, such as user 'A' 702 and user 'B' 772.

In certain embodiments, the anomalous event detection system 122 may be implemented to perform an anomalous event detection operation, described in greater detail herein. In various embodiments, as likewise described in greater detail herein, the anomalous event detection system 122 may be implemented to use certain associated event information to perform the anomalous event detection operation. In certain embodiments, the event information may be stored in a repository of event 670 data. In various embodiments, the security analytics mapping system 124 may be implemented to provide certain event mapping information stored in the repository of event 670 data to the security analytics system 118 for use by the anomalous event detection system 122.

In various embodiments, the security analytics mapping system 124 may be implemented, as described in greater detail herein, to manage certain event mapping information relevant to the occurrence of an event. In various embodiments, as likewise described in greater detail herein, the security analytics mapping system 124 may be implemented to provide certain event mapping information relevant to a particular event to the anomalous event detection system 122. In certain embodiments, the event mapping information provided by the security analytics mapping system 124 to the anomalous event detection system 122 may be used to determine whether a particular event is anomalous.

In certain embodiments, as described in greater detail herein, an endpoint agent 306 may be implemented on an endpoint device 304 to perform user or non-user entity behavior monitoring. In certain embodiments, the user or non-user entity behavior may be monitored by the endpoint agent 306 during user/device 730 interactions between a user entity, such as user 'A' 702, and an endpoint device 304. In certain embodiments, the user or non-user entity behavior may be monitored by the endpoint agent 306 during user/network 742 interactions between user 'A' 702 and a network, such as an internal 744 or external 746 network. In certain embodiments, the user or non-user entity behavior may be monitored by the endpoint agent 306 during user/resource 748 interactions between user 'A' 702 and a resource 750, such as a facility, printer, surveillance camera, system, datastore, service, and so forth. In certain embodiments, the monitoring of user or non-user entity behavior by the endpoint agent 306 may include the monitoring of electronically-observable actions respectively enacted by a particular user or non-user entity. In certain embodiments, the endpoint agent 306 may be implemented in combination with the security analytics system 118, the EBC system 120, the anomalous event detection system 122, the security analytics mapping system 124, and the security risk scoring system 126, or a combination thereof, to detect entity behavior of analytic utility and perform a security operation to mitigate risk.

In certain embodiments, the endpoint agent 306 may be implemented to include an event counter feature pack 2008, an event analytics 310 module, a security analytics mapping system 2024, and a security risk scoring system 2026, or a combination thereof. In certain embodiments, the event counter feature pack 2008 may be further implemented to include an event data detector 2010 module, an event counter 2012 module, and an event data collector 2014 module, or a combination thereof. In certain embodiments, the event analytics 310 module may be implemented to include a security policy rule 2016 engine, an event of analytic utility 2018 module, and an anomalous event detection 2020 module, or a combination thereof.

In certain embodiments, the event data detector 2010 module may be implemented to detect event data associated with a particular endpoint device 304, as described in greater detail herein, resulting from user/device 730, user/network 742, user/resource 748, and user/user 770 interactions. In various embodiments, the event counter 2012 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2014 module may be implemented to collect certain event data associated with the user/device 730, user/network 742, user/resource 748, and user/user 770 interactions. In certain embodiments, the security policy 2016 engine may be implemented to manage security policy information relevant to determining whether a particular event is of analytic utility, anomalous, or both. In certain embodiments, the event of analytic utility detection 2018 module may be implemented to detect an event of analytic utility associated with events corresponding to the user/device 730, user/network 742, user/resource 748, and user/user 770 interactions. In various embodiments, the event of analytic utility detection 2018 module may be implemented to use certain security policy information provided by the security policy 2016 engine to determine whether a particular event associated with an endpoint device 304 is of analytic utility. In certain embodiments, the security policy 2016 engine may be implemented to determine whether a particular event of analytic utility associated with an endpoint device 304 is anomalous.

In various embodiments, the anomalous event detection 2020 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2018 module may be implemented to provide certain information associated with one or more events of analytic utility to the anomalous event detection 2020 module. In certain embodiments, the event of analytic utility detection 2018 module may be implemented to determine whether the one or more events of analytic utility are associated with one another.

In various embodiments, the anomalous event detection 2020 module may be implemented to use such information in the performance of certain anomalous event detection operations, which in turn may result in the detection of an anomalous event. In certain embodiments, the endpoint agent 306 may be implemented to communicate the event and associated event counter data collected by the event data collector 2014 module, data associated with the events of analytic utility detected by the event of analytic utility detection 2018 module, and the anomalous events detected by the anomalous event detection 2020 module, or a combination thereof, to the security analytics 118 system or another component of the distributed security analytics mapping system environment.

In certain embodiments, the security analytics mapping system 2024 may be implemented to generate an entity interaction map, as described in greater detail herein. In various embodiments, the security analytics mapping system 2024 may be implemented to provide certain entity interaction mapping information to one or more other components of the security analytics mapping system environment. In certain embodiments, the security risk scoring system 2026 may be implemented to generate an event risk severity score, likewise described in greater detail, for an anomalous event detected by the anomalous event detection 2020 module. In certain embodiments, the security risk scoring system 2026 may be implemented to generate an event risk severity score corresponding to an anomalous event when it is first detected, as likewise described in greater detail herein. In certain embodiments, the endpoint agent 306 may be implemented to provide one or more event risk severity scores to one or more other components of the security analytics mapping system environment.

In certain embodiments, an edge device 202 may be implemented to include an edge device risk module 2006. In certain embodiments, the edge device risk module 2006 may be implemented to include an anomalous event detection 2028 system, a event security analytics mapping system 2044, a security risk scoring system 2026, or a combination thereof. In certain embodiments, the anomalous event detection 2028 system may be implemented to include an event data detector 2030 module, an event counter 2032 module, an event data collector 2034 module, a security policy rule 2036 engine, an event of analytic utility 2038 module, and an anomalous event detection 2040 module, or a combination thereof.

In certain embodiments, the event data detector 2030 module may be implemented to detect event data associated with a particular edge device 202, as described in greater detail herein, resulting from user/device 730, user/network 742, user/resource 748, and user/user 770 interactions. In various embodiments, the event counter 2032 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2034 module may be implemented to collect certain event data associated with the user/device 730, user/network 742, user/resource 748, and user/user 770 interactions. In certain embodiments, the security policy 2036 engine may be implemented to manage security policy information relevant to determining whether a particular event is of analytic utility, anomalous, or both. In certain embodiments, the event of analytic utility detection 2038 module may be implemented to detect an event of analytic utility associated with events corresponding to the user/device 730, user/network 742, user/resource 748, and user/user 770 interactions. In various embodiments, the event of analytic utility detection 2038 module may be implemented to use certain security policy information provided by the security policy 2036 engine to determine whether a particular event associated with an edge device 202 is of analytic utility. In certain embodiments, the security policy 2036 engine may be implemented to determine whether a particular event of analytic utility associated with an edge device 202 is anomalous.

In various embodiments, the anomalous event detection 2040 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2038 module may be implemented to provide certain information associated with one or more events of analytic utility to the anomalous event detection 2040 module. In certain embodiments, the event of analytic utility detection 2038 module may be implemented to determine whether the one or more events of analytic utility are associated with one another.

In various embodiments, the anomalous event detection 2040 module may be implemented to use such information in the performance of certain anomalous event detection operations, which in turn may result in the detection of an anomalous event. In certain embodiments, the edge device risk module 2006 may be implemented to communicate the event and associated event counter data collected by the event data collector 2034 module, data associated with the events of analytic utility detected by the event of analytic utility detection 2038 module, and the anomalous events detected by the anomalous event detection 2040 module, or a combination thereof, to the security analytics 118 system or another component of the distributed security analytics mapping system environment.

In certain embodiments, the security analytics mapping system 2044 may be implemented to generate an entity interaction map, as described in greater detail herein. In various embodiments, the security analytics mapping system 2044 may be implemented to provide certain entity interaction mapping information to one or more other components of the security analytics mapping system environment. In certain embodiments, the security risk scoring system 2046 may be implemented to generate an event risk severity score, likewise described in greater detail, for an anomalous event detected by the anomalous event detection 2040 module. In certain embodiments, the security risk scoring system 2046 may be implemented to generate an event risk severity score corresponding to an anomalous event when it is first detected, as likewise described in greater detail herein. In certain embodiments, the edge device risk module 2006 may be implemented to provide one or more event risk severity scores to one or more other components of the security analytics mapping system environment.

In certain embodiments, a third party system 780 may be implemented to include a third party system risk module 2026. In certain embodiments, the third party system risk module 2026 may be implemented to include an anomalous event detection 2048 system, a security analytics mapping system 2064, and a security risk scoring system 2066, or a combination thereof. In certain embodiments, the anomalous event detection 2048 system may be implemented to include an event data detector 2050 module, an event counter 2052 module, an event data collector 2054 module, a security policy rule 2056 engine, an event of analytic utility 2058 module, and an anomalous event detection 2060 module, or a combination thereof.

In certain embodiments, the event data detector 2050 module may be implemented to detect event data associated with a particular third party system 780 resulting from user/device 730, user/network 742, user/resource 748, and user/user 770 interactions. In various embodiments, the event counter 2052 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2054 module may be implemented to collect certain event data associated with the user/device 730, user/network 742, user/resource 748, and user/user 770 interactions. In certain embodiments, the security policy 2056 engine may be implemented to manage security policy information relevant to determining whether a particular event is of analytic utility, anomalous, or both. In certain embodiments, the event of analytic utility detection 2058 module may be implemented to detect an event of analytic utility associated with events corresponding to the user/device 730, user/network 742, user/resource 748, and user/user 770 interactions. In various embodiments, the event of analytic utility detection 2058 module may be implemented to use certain security policy information provided by the security policy 2056 engine to determine whether a particular event associated with a third party system 780 is of analytic utility. In certain embodiments, the security policy 2056 engine may be implemented to determine whether a particular event of analytic utility associated with a third party system 780 is anomalous.

In various embodiments, the anomalous event detection 2060 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2058 module may be implemented to provide certain information associated with one or more events of analytic utility to the anomalous event detection 2060 module. In certain embodiments, the event of analytic utility detection 2058 module may be implemented to determine whether the one or more events of analytic utility are associated with one another.

In various embodiments, the anomalous event detection 2060 module may be implemented to use such information in the performance of certain anomalous event detection operations, which in turn may result in the detection of an anomalous event. In certain embodiments, the third party system risk module 2026 may be implemented to communicate the event and associated event counter data collected by the event data collector 2054 module, data associated with the events of analytic utility detected by the event of analytic utility detection 2058 module, and the anomalous events detected by the anomalous event detection 2060 module, or a combination thereof, to the security analytics 118 system or another component of the distributed security analytics mapping system environment.

In certain embodiments, the security analytics mapping system 2064 may be implemented to generate an entity interaction map, as described in greater detail herein. In various embodiments, the security analytics mapping system 2064 may be implemented to provide certain entity interaction mapping information to one or more other components of the security analytics mapping system environment. In certain embodiments, the security risk scoring system 2066 may be implemented to generate an event risk severity score, likewise described in greater detail, for an anomalous event detected by the anomalous event detection 2060 module. In certain embodiments, the security risk scoring system 2066 may be implemented to generate an event risk severity score corresponding to an anomalous event when it is first detected, as likewise described in greater detail herein. In certain embodiments, the third party system risk module 2026 may be implemented to provide one or more event risk severity scores to one or more other components of the security analytics mapping system environment.

In certain embodiments, the security analytics system 118 may be implemented to receive the event data, the event counter data, the data associated with the detected events of analytic utility and anomalous events, or a combination thereof, provided by the endpoint agent 306, the edge device risk module 2006, and the third party system risk module 2026, or a combination thereof. In certain embodiments, the security analytics system 118 may be implemented to provide the event data and event counter data, the data associated with the detected endpoint events of analytic utility and anomalous events, or a combination thereof, to the EBC system 120, the anomalous event detection system 122, and the security analytics mapping system 124 for processing.

In certain embodiment, the EBC system 120 may be implemented to include an EBP element generator 2062 module, an EBP session generator 2066 module, an EBP generator 2068 module, or a combination thereof. In various embodiments, the EBP element generator 2062 module may be implemented to process event and event counter data, along with data associated with events of analytic utility and anomalous events, provided by the endpoint agent 306 to generate EBP elements, described in greater detail herein. In certain embodiments, the EBP session generator 2066 may be implemented to use the event and endpoint event counter, data associated with events of analytic utility and anomalous events provided by the endpoint agent 306, to generate session information. In certain embodiments, the EBP session generator 2066 may be implemented to use the resulting session information to generate an activity session, described in greater detail herein. In various embodiments, as likewise described in greater detail herein, certain EBP management operations may be performed to associate EBP elements generated by the EBP element generator 2062 module with a corresponding EBP. Likewise, certain EBP management operations may be performed to use the session information generated by the EBP session generator 2066 module to associate a particular EBP element with a particular EBP.

In certain embodiments, the anomalous event detection system 122 may be implemented to include an event data detector 2070 module, an event counter 2072 module, an event data collector 2074 module, a security policy rule 2076 engine, an event of analytic utility 2078 module, and an anomalous event detection 2080 module, or a combination thereof. In certain embodiments, the event data detector 2070 module may be implemented to detect event data associated with a particular endpoint device 304, edge device 202, or third party system 780, as described in greater detail herein, resulting from user/device 730, user/network 742, user/resource 748, and user/user 770 interactions. In various embodiments, the event counter 2072 module may be implemented to collect, or otherwise track, the occurrence of certain events, or classes of events, as described in greater detail herein, resulting from user/device 730, user/network 742, user/resource 748, and user/user 770 interactions.

In various embodiments, the event data collector 2074 module may be implemented to collect certain event data associated with the user/device 730, user/network 742, user/resource 748, and user/user 770 interactions. In certain embodiments, the security policy 2076 engine may be implemented to manage security policy information relevant to determining whether a particular event is of analytic utility, anomalous, or both. In certain embodiments, the event of analytic utility detection 2078 module may be implemented to detect an event of analytic utility associated with events corresponding to the user/device 730, user/network 742, user/resource 748, and user/user 770 interactions. In various embodiments, the event of analytic utility detection 2078 module may be implemented to use certain security policy information provided by the security policy 2076 engine to determine whether a particular event associated with a particular endpoint device 304, edge device 202, or third party system 780 is of analytic utility. In certain embodiments, the security policy 2076 engine may be implemented to determine whether a particular event of analytic utility associated with an endpoint device, edge device 202, or third party system 780 is anomalous.

In various embodiments, the anomalous event detection 2080 module may be implemented to perform anomalous event detection operations, described in greater detail herein, associated with events of analytical utility corresponding to the user/device 730, user/network 742, user/resource 748, and user/user 770 interactions. In various embodiments, the event of analytic utility detection 2078 module may be implemented to provide certain information associated with one or more events of analytic utility to the anomalous event detection 2080 module. In certain embodiments, the event of analytic utility detection 2078 module may be implemented to determine whether the one or more events of analytic utility are associated with one another.

In various embodiments, the anomalous event detection 2080 module may be implemented to use such information in the performance of certain anomalous event detection operations, which in turn may result in the detection of an anomalous event. In certain embodiments, the anomalous event detection system 122 may be implemented to communicate the event and associated event counter data collected by the event data collector 2074 module, data associated with the events of analytic utility detected by the event of analytic utility detection 2078 module, and the anomalous events detected by the anomalous event detection 2080 module, or a combination thereof, to another component of the distributed security analytics mapping environment.

In certain embodiments, the security analytics mapping system 124 may be implemented to generate an entity interaction map, as described in greater detail herein. In various embodiments, the security analytics mapping system 124 may be implemented to provide certain entity interaction mapping information to one or more other components of the security analytics mapping system environment. In certain embodiments, the security risk scoring system 126 may be implemented to generate an event risk severity score, likewise described in greater detail, for an anomalous event detected by the anomalous event detection 2080 module. In certain embodiments, the security risk scoring system 126 may be implemented to generate an event risk severity score corresponding to an anomalous event when it is first detected, as likewise described in greater detail herein. In certain embodiments, the anomalous event detection system 122 may be implemented to provide one or more event risk severity scores to one or more other components of the security analytics mapping system environment. Those of skill in the art will recognize that many such implementations are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a security operation, comprising:
   monitoring a plurality of electronically-observable actions of a first entity, the plurality of electronically-observable actions of the first entity corresponding to a respective first plurality of events enacted by the first entity;
   monitoring a plurality of electronically-observable actions of a second entity, the plurality of electronically-observable actions of the second entity corresponding to a respective second plurality of events enacted by the second entity;
   determining whether a first event of the respective first plurality of events and a second event of the respective second plurality of events comprise an entity interaction between the first entity and the second entity;
   generating an entity interaction map, the entity interaction map providing a representation of the entity interaction between the first entity and the second entity;
   using the entity interaction map to trace the entity interaction between the first entity and the second entity; and,
   performing, via a security analytics system, a security analytics operation, the security analytics operation using the trace of the entity interaction between the first entity and the second entity to determine when the first entity and the second entity are directly or indirectly involved in an occurrence of an anomalous event, the anomalous event comprising an interaction with a particular data file by the first entity and the second entity, the security analytics operation using the trace to identify when the first entity and the second entity interact with the particular data file prior to detection of the particular data file being associated with the occurrence of the anomalous event.

2. The method of claim 1, further comprising:
   identifying when the first event of the respective first plurality of events and the second event of the respective second plurality of events are correlated.

3. The method of claim 1, wherein:
   the mapping comprises concatenating the first event of the respective first plurality of events and the second event of the respective second plurality of events; and,
   concatenation of the first event of the respective first plurality of events and the second event of the respective second plurality of events is included within the representation of the entity interaction.

4. The method of claim 1, wherein:
   the entity interaction between the first entity and the second entity comprises a conveyance of data.

5. The method of claim 1, further comprising:
   providing the data with an associated unique identifier; and,
   maintaining the associated unique identifier within the entity interaction map.

6. The method of claim 4, wherein:
   the entity interaction map provides a representation of a historical conveyance of data between the first entity and the second entity;
   the security analytics operation uses the historical conveyance of data between the first entity and the second entity when detecting the occurrence of the anomalous event.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      monitoring a plurality of electronically-observable actions of a first entity, the plurality of electronically-observable actions of the first entity corresponding to a respective first plurality of events enacted by the first entity;
      monitoring a plurality of electronically-observable actions of a second entity, the plurality of electronically-observable actions of the second entity corresponding to a respective second plurality of events enacted by the second entity;
      determining whether a first event of the respective first plurality of events and a second event of the respective second plurality of events comprise an entity interaction between the first entity and the second entity;
      generating an entity interaction map, the entity interaction map providing a representation of the entity interaction between the first entity and the second entity;
      using the entity interaction map to trace the entity interaction between the first entity and the second entity; and,
      performing, via a security analytics system, a security analytics operation, the security analytics operation using the trace of the entity interaction between the first entity and the second entity to determine when the first entity and the second entity are directly or indirectly involved in an occurrence of an anomalous event, the anomalous event comprising an interaction with a particular data file by the first entity and the second entity, the security analytics operation using the trace to identify when the first entity and the second entity interact with the particular data file prior to detection of the particular data file being associated with the occurrence of the anomalous event.

8. The system of claim 7, wherein the instructions executable by the processor are further configured for:
   identifying when the first event of the respective first plurality of events and the second event of the respective second plurality of events are correlated.

9. The system of claim 7, wherein:
   the mapping comprises concatenating the first event of the respective first plurality of events and the second event of the respective second plurality of events; and,
   concatenation of the first event of the respective first plurality of events and the second event of the respective second plurality of events is included within the representation of the entity interaction.

10. The system of claim 7, wherein:
the entity interaction between the first entity and the second entity comprises a conveyance of data.

11. The system of claim 7, wherein the instructions executable by the processor are further configured for:
providing the data with an associated unique identifier; and,
maintaining the associated unique identifier within the entity interaction map.

12. The system of claim 10, wherein the instructions executable by the processor are further configured for:
the entity interaction map provides a representation of a historical conveyance of data between the first entity and the second entity;
the security analytics operation uses the historical conveyance of data between the first entity and the second entity when detecting the occurrence of the anomalous event.

13. A non-transitory, computer-readable storage medium embodying computer program code, the computer program code comprising computer executable instructions configured for:
monitoring a plurality of electronically-observable actions of a first entity, the plurality of electronically-observable actions of the first entity corresponding to a respective first plurality of events enacted by the first entity;
monitoring a plurality of electronically-observable actions of a second entity, the plurality of electronically-observable actions of the second entity corresponding to a respective second plurality of events enacted by the second entity;
determining whether a first event of the respective first plurality of events and a second event of the respective second plurality of events comprise an entity interaction between the first entity and the second entity;
generating an entity interaction map, the entity interaction map providing a representation of the entity interaction between the first entity and the second entity;
using the entity interaction map to trace the entity interaction between the first entity and the second entity; and,
performing, via a security analytics system, a security analytics operation, the security analytics operation using the trace of the entity interaction between the first entity and the second entity to determine when the first entity and the second entity are directly or indirectly involved in an occurrence of an anomalous event, the anomalous event comprising an interaction with a particular data file by the first entity and the second entity, the security analytics operation using the trace to identify when the first entity and the second entity interact with the particular data file prior to detection of the particular data file being associated with the occurrence of the anomalous event.

14. The non-transitory, computer-readable storage medium of claim 13, wherein the computer executable instructions are further configured for:
identifying when the first event of the respective first plurality of events and the second event of the respective second plurality of events are correlated.

15. The non-transitory, computer-readable storage medium of claim 13, wherein:
the mapping comprises concatenating the first event of the respective first plurality of events and the second event of the respective second plurality of events; and,
concatenation of the first event of the respective first plurality of events and the second event of the respective second plurality of events is included within the representation of the entity interaction.

16. The non-transitory, computer-readable storage medium of claim 13, wherein:
the entity interaction between the first entity and the second entity comprises a conveyance of data.

17. The non-transitory, computer-readable storage medium of claim 13, wherein the computer executable instructions are further configured for:
providing the data with an associated unique identifier; and,
maintaining the associated unique identifier within the entity interaction map.

18. The non-transitory, computer-readable storage medium of claim 16, wherein the computer executable instructions are further configured for:
the entity interaction map provides a representation of a historical conveyance of data between the first entity and the second entity;
the security analytics operation uses the historical conveyance of data between the first entity and the second entity when detecting the occurrence of the anomalous event.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *